United States Patent
Suzuki et al.

(10) Patent No.: US 6,173,013 B1
(45) Date of Patent: Jan. 9, 2001

(54) METHOD AND APPARATUS FOR ENCODING ENHANCEMENT AND BASE LAYER IMAGE SIGNALS USING A PREDICTED IMAGE SIGNAL

(75) Inventors: Teruhiko Suzuki, Chiba; Yoichi Yagasaki, Tokyo, both of (JP)

(73) Assignee: Sony Corporation, Tokyo (JP)

( * ) Notice: Under 35 U.S.C. 154(b), the term of this patent shall be extended for 0 days.

(21) Appl. No.: 08/965,597

(22) Filed: Nov. 6, 1997

(30) Foreign Application Priority Data

Nov. 8, 1996 (JP) .................................................. 8-312807
Jul. 14, 1997 (JP) .................................................. 9-188117

(51) Int. Cl.[7] .................................................. H04N 7/12
(52) U.S. Cl. .................................................. 375/240.16
(58) Field of Search ........................ 375/240.16; 348/389, 348/402, 408, 415, 416, 420; H04N 7/12

(56) References Cited

U.S. PATENT DOCUMENTS

| | | | |
|---|---|---|---|
| 5,270,813 | * 12/1993 | Puri et al. .............................. | 348/415 |
| 5,414,469 | * 5/1995 | Gonzales et al. ..................... | 348/408 |
| 5,635,985 | * 6/1997 | Boyce et al. .......................... | 348/402 |
| 5,742,343 | * 4/1998 | Haskell et al. ........................ | 348/389 |
| 5,936,673 | * 8/1999 | Agarwal ................................ | 348/420 |

* cited by examiner

*Primary Examiner*—Young Lee
(74) *Attorney, Agent, or Firm*—Frommer Lawrence & Haug, LLP.; William S. Frommer; Glenn F. Savit

(57) ABSTRACT

The invention provides an encoding apparatus capable of encoding an image signal in a scalable fashion and also provides a decoding apparatus corresponding to the encoding apparatus. In particular, the invention provides an image signal encoding apparatus for encoding a plurality of image signals, wherein at least one of the plurality of image signals is an image signal representing a moving image object, and the plurality of image signals are encoded together with a signal used to combine the image signal representing the moving image object with other image signals. The encoded signal is decoded by the decoding apparatus according to the invention. The invention is characterized in that the apparatus includes: an image supplier for supplying a base layer image signal and an enhancement layer image signal scalably representing the image signal of the moving image object; an enhancement layer encoder for encoding the enhancement layer image signal thereby generating an encoded enhancement layer signal; and a base layer encoder for encoding the base layer image signal thereby generating an encoded base layer signal. In the above encoding process, a reference image signal used to calculate a motion vector of the enhancement layer image signal to be encoded is generated by replacing the values of pixels outside the image object of the enhancement layer image signal with the values of predetermined pixels of the base layer image signal.

13 Claims, 54 Drawing Sheets

ENHANCAMENT LAYER

BASE LAYER

ENHANCAMENT LAYER

BASE LAYER

ENHANCAMENT LAYER

BASE LAYER

FIG. 22

| Syntax | No. of bits | Mnemonic |
|---|---|---|
| Video Session(){<br>    video_session_start_code<br>    do*{<br>      Video Object()<br>    } while(nextbits_bytealigned()==<br>        video_object_start_code)<br>    next_start_code()<br>    video_session_end_code<br>} | sc+8=32<br><br><br><br><br><br><br>sc+8=32 | |

*concurrent loop solution to be provided by MSDL

FIG. 23

| Syntax | No. of bits | Mnemonic |
|---|---|---|
| Video Object(){<br>    video_object_start_code<br>    video_object_id<br>    do{<br>      Video Object Layer()<br>    }<br>    while(nextbits_bytealigned()==<br>        video_object_layer_start_code)<br>    next_start_code() | sc+3=27<br>5 | |
| } | | |

FIG. 24

| Syntax | No.of bits | Mnemonic |
|---|---|---|
| Video Object Layer(){ | | |
|     video_object_layer_start_code | sc+4=28 | |
|     video_object_layer_id | 4 | |
|     video_object_layer_shape | 2 | |
|     if(video_object_layer_shape= '00' ){ | | |
|       video_object_layer_width | 10 | |
|       video_object_layer_height | 10 | |
|     } | | |
|     video_object_layer_quant_type | 1 | |
|     if(video_object_layer_quant_type){ | | |
|       load_intra_quant_mat | 1 | |
|       if(load_intra_quant_mat) | | |
|         intra_quant_mat[64] | 8*64 | |
|       load_nonintra_quant-mat | 1 | |
|       if(load_nonintra_quant_mat) | | |
|         nonintra_quant_mat[64] | 8*64 | |
|     } | | |
|     error_resilient_disable | 1 | |
|     intra_acdc_pred_disable | 1 | |
|     deblocking_filter_disable | 1 | |
|     video_object_layer_fcode_forward | 2 | |
|     video_object_layer_fcode_backward | 2 | |
|     separate_motion_shape_texture | 1 | |
|     scalability | 1 | |
|     if(scalability){ | | |
|       ref_layer_id | 4 | |
|       ref_layer_sampling_direc | 1 | |
|       hor_sampling_factor_n | 5 | |
|       hor_sampling_factor_m | 5 | |
|       vert_sampling_factor_n | 5 | |
|       vert_sampling_factor-m | 5 | |
|       fill_mode | 1 | |
|     } | | |
|     do{ | | |
|       Video Object Plane() | | |
|     }while(nextbits_bytealigned()== | | |
|       video_object_plane_start_code) | | |
|     next_start_code() | | |
| } | | |

FIG. 25

| Syntax | No.of bits | Mnemonic |
|---|---|---|
| Video Object Plane(){ | | |
|     VOP_start_code | sc+8=32 | |
|     do{ | | |
|         modulo_time_base | 1 | |
|     }while(modulo_time_base_!= "0" | | |
|     VOP_time_increment | 10 | |
|     VOP_prediction_type | 2 | |
|     if(video_object_layer_shape!= "0" )( | | |
|         VOP_width | 10 | |
|         VOP_height | 10 | |
|         VOP_horizontal_mc_spatial_red | 10 | |
|         marker_bit | 1 | |
|         VOP_vertical_mc_spatial_ref | 10 | |
|         if(scalability && enhancement_type) | | |
|             background_composition | 1 | |
|     } | | |
|     if(VOP_prediction_type== '10' ) | | |
|         VOP_dbquant | 2 | |
|     else | | |
|         VOP_quant | 5 | |
|     if(!scalability)( | | |
|         if(!separate_motion_shape_texture) | | |
|         if(error_resilience_disable) | | |
|             combined_motion_shape_texture_coding() | | |
|         else( | | |
|             do( | | |
|                 do{ | | |
|                       combined_motion_shape_texture_coding() | | |
|                 } while (nextbits_bytealigned() != 0000 0000 0000 0000) | | |
|                 if (nextbits_bytealigned() != 000 0000 0000 0000 0000 0000) { | | |
|                       next_resync_marker0 | | |
|                       resync_marker | 17 | |
|                       macroblock_number | 1-12 | |
|                       quant_scale | 5 | |
|                 } | | |
|             )while(nextbits_bytealigned() != 000 0000 0000 0000 0000 0000) | | |

FIG. 26

| Syntax | No.of bits | Mnemonic |
|---|---|---|
| ```
    else {
        if(video_object_layer_shape != "00" ){
        do {
            first_MMR_code
        } while (count of macroblocks !=
total number of macroblocks)
        }
            if (error_resilience_disable)
                motion_coding()
            if (video_object_layer_shape != "00" )
                shape_coding()
                texture_coding()
        else
            do{
                motion_coding()
            if (video_object_layer_shape != "00" )
                shape_coding()
                texture_coding()
                if (nextbits_bytealigned() != 000 0000
0000 0000 0000 0000)   {
                    next_resync_marker()
                    resync_marker
                    macroblock_number
                    quant_scale
                }
            } while   (nextbits_bytealigned() != 000 0000
0000 0000 0000 0000)
            }
        }
        else {
            if   (background_composition){
                load_backward_shape){
                if (load_backward_shape){
                    backward_shape_coding()
                    load_forward_shape)
                    if (load_forward_shape)
                      forward_shape_coding()
                }
            }
            ref_select_code
``` | 1-2<br><br><br><br><br><br><br><br><br><br><br><br><br><br><br><br>17<br>1-12<br>5<br><br><br><br><br><br><br><br>1<br><br><br>1<br><br><br><br><br>2 | |

FIG. 27

| Syntax | No.of bits | Mnemonic |
|---|---|---|
| if (VOP_prediction_type== "01" II VOP_prediction_type= = "10" ) { | | |
|     forward_temporal_ref | 10 | |
|     if (VOP_prediction_type== "10" ){ | | |
|       marker_bit | 1 | |
|       backward_temporal_ref | 10 | |
|     } | | |
| } | | |
|     combined_motion_shape_texture_coding() | | |
| } | | |
| next_start_code() | | |
| } | | |

FIG. 29
ENHANCEMENT
LAYER 2
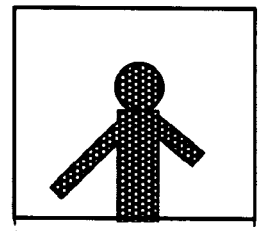
ENHANCEMENT
LAYER 1
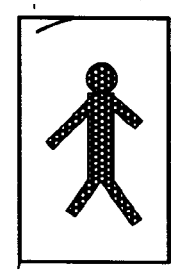
BASE LAYER
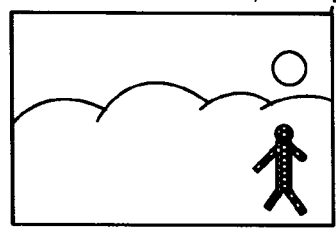

FIG. 43

| Syntax | No. of bits | Mnemonic |
|---|---|---|
| Video Object Layer(){ | | |
|     video_object_layer_start_code | sc+4=28 | |
|     video_object_layer_id | 4 | |
|     video_object_layer_shape | 2 | |
|     if(video_object_layer_shape= '00' )( | | |
|       video_object_layer_width | 10 | |
|       video_object_layer_height | 10 | |
|     } | | |
|     video_object_layer_quant_type | 1 | |
|     if(video_object_layer_quant_type)( | | |
|       load_intra_quant_mat | 1 | |
|       if(load_intra_quant_mat) | | |
|         intra_quant_mat[64] | 8*64 | |
|       load_nonintra_quant-mat | 1 | |
|       if(load_nonintra_quant_mat) | | |
|         nonintra_quant_mat[64] | 8*64 | |
|     } | | |
|     error_resilient_disable | 1 | |
|     intra_acdc_pred_disable | 1 | |
|     deblocking_filter_disable | 1 | |
|     video_object_layer_fcode_forward | 2 | |
|     video_object_layer_fcode_backward | 2 | |
|     separate_motion_shape_texture | 1 | |
|     scalability | 1 | |
|     if(scalability){ | | |
|       ref_layer_id | 4 | |
|       ref_layer_sampling_direc | 1 | |
|       hor_sampling_factor_n | 5 | |
|       hor_sampling_factor_m | 5 | |
|       vert_sampling_factor_n | 5 | |
|       vert_sampling_factor-m | 5 | |
|       enhancement_type | 1 | |
|       fill_mode | 1 | |
|     } | | |
|     do{ | | |
|       Video Object Plane() | | |
|     }while(nextbits_bytealigned()== | | |
|         video_object_plane_start_code) | | |
|     next_start_code() | | |
| } | | |

METHOD AND APPARATUS FOR ENCODING ENHANCEMENT AND BASE LAYER IMAGE SIGNALS USING A PREDICTED IMAGE SIGNAL

BACKGROUND OF THE INVENTION

1. Field of the Invention

The present invention relates to an image signal encoding method and an image signal encoding apparatus, an image signal decoding method and an image signal decoding apparatus, an image signal transmission method, and a recording medium which are suitable for use in systems for recording a moving image signal on a recording medium such as an magneto-optical disk or a magnetic tape and reproducing the moving image signal from the recording medium thereby displaying the reproduced image on a display device, or systems, such as a video conference system, a video telephone system, broadcasting equipment, a multimedia database retrieving system, for transmitting a moving image signal via a transmission line from a transmitting end to a receiving end so that the transmitted moving image is displayed on a displaying device at the receiving end, and also systems for editing and recording a moving image signal.

2. Description of the Related Art

In the art of moving-image transmission systems such as video conference systems or video telephone systems, it is known to convert an image signal into a compressed code on the basis of line-to-line and/or frame-to-frame correlation of the image signal so as to use a transmission line in a highly efficient fashion.

The encoding technique according to the MPEG (Moving Picture Experts Group) standard can provide a high compression efficiency and is widely used. The MPEG technique is a hybrid technique of motion prediction encoding and DCT (discrete cosine transform) encoding techniques.

In the MPEG standard, several profiles (functions) at various levels (associated with the image size or the like) are defined so that the standard can be applied to a wide variety of applications. Of these, the most basic one is the main profile at main level (MP@ML).

Referring to FIG. 44, an example of an encoder (image signal encoder) according to the MP@ML of the MPEG standard will be described below. An input image signal is supplied to a set of frame memories 1, and stored therein in the predetermined order. The image data to be encoded is applied, in units of macroblocks, to a motion vector extraction circuit (ME) 2. The motion vector extraction circuit 2 processes the image data for each frame as an I-picture, a P-picture, or a B-picture according to a predetermined procedure. In the above procedure, the processing mode is predefined for each frame of the image of the sequence, and each frame is processed as an I-picture, a P-picture, or a B-picture corresponding to the predefined processing mode (for example frames are processes in the order of I, B, P, B, P, . . . , B, P). Basically, I-pictures are subjected to intraframe encoding, and P-pictures and B-pictures are subjected to interframe prediction encoding, although the encoding mode for P-pictures and B-pictures is varied adaptively macroblock by macroblock in accordance with the prediction mode as will be described later.

The motion vector extraction circuit 2 extracts a motion vector with reference to a predetermined reference frame so as to perform motion compensation (interframe prediction). The motion compensation (interframe prediction) is performed in one of three modes: forward, backward, and forward-and-backward prediction modes. The prediction for a P-picture is performed only in the forward prediction mode, while the prediction for a B-picture is performed in one of the above-described three modes. The motion vector extraction circuit 2 selects a prediction mode which can lead to a minimum prediction error, and generates a predicted vector in the selected prediction mode.

The prediction error is compared for example with the dispersion of the given macroblock to be encoded. If the dispersion of the macroblock is smaller than the prediction error, prediction compensation encoding is not performed on that macroblock but, instead, intraframe encoding is performed. In this case, the prediction mode is referred to as an intraframe encoding mode. The motion vector extracted by the motion vector extraction circuit 2 and the information indicating the prediction mode employed are supplied to a variable-length encoder 6 and a motion compensation circuit (MC) 12.

The motion compensation circuit 12 generates a predicted image on the basis of the motion vector. The result is applied to arithmetic operation circuits 3 and 10. The arithmetic operation circuit 3 calculates the difference between the value of the given macroblock to be encoded and the value of the predicted image. The result is supplied as a difference image signal to a DCT circuit 4. In the case of an intramacroblock, the arithmetic operation circuit 3 directly transfers the value of the given macroblock to be encoded to the DCT circuit 4 without performing any operation.

The DCT circuit 4 performs a DCT (discrete cosine transform) operation on the input signal thereby generating DCT coefficients. The resultant DCT coefficients are supplied to a quantization circuit (Q) 5. The quantization circuit 5 quantizes the DCT coefficients in accordance with a quantization step depending on the amount of data stored in a transmission buffer 7. The quantized data is then supplied to the variable-length encoder 6.

The variable-length encoder 6 converts the quantized data supplied from the quantization circuit 5 into a variable-length code using for example the Huffman encoding technique, in accordance with the quantization step (scale) supplied from the quantization circuit 5. The obtained variable-length code is supplied to a transmission buffer 7.

The variable-length encoder 6 also receives the quantization step (scale) from the quantization circuit 5 and the motion vector as well as the information indicating the employed prediction mode (the intraframe prediction mode, the forward prediction mode, the backward prediction mode, or forward-and-backward prediction mode in which the prediction has been performed) from the motion vector extraction circuit 2, and converts these received data into variable-length codes.

The transmission buffer 7 stores the received encoded image data temporarily. A quantization control signal corresponding to the amount of data stored in the transmission buffer 7 is fed back to the quantization circuit 5 from the transmission buffer 7.

If the amount of residual data stored in the transmission buffer 7 reaches an upper allowable limit, the transmission buffer 7 generates a quantization control signal to the quantization circuit 5 so that the following quantization operation is performed using an increased quantization scale thereby decreasing the amount of quantized data. Conversely, if the amount of residual data decreases to a lower allowable limit, the transmission buffer 7 generates a quantization control signal to the quantization circuit 5 so that the following quantization operation is performed using a decreased quantization scale thereby increasing the amount of quantized data. In this way, an overflow or underflow in the transmission buffer 7 is prevented.

The data stored in the transmission buffer 7 is read out at a specified time and output over a transmission line or recorded on a recording medium.

The quantized data output by the quantization circuit 5 is also supplied to an inverse quantization circuit 8. The inverse quantization circuit 8 performs inverse quantization on the received data in accordance with the quantization step given by the quantization circuit 5. The data (DCT coefficients generated by means of the inverse quantization) output by the inverse quantization circuit 8 are supplied to an IDCT (inverse DCT) circuit 9 which in turn performs an inverse DCT operation on the received data. The arithmetic operation circuit 10 adds the predicted image signal to the signal output from the IDCT circuit 9 for each macroblock, and stores the resultant signal into a set of frame memories (FM) 11 so that the stored image signal will be used as the predicted image signal. In the case of an intramacroblock, the arithmetic operation circuit 10 directly transfers the macroblock output by the IDCT circuit 9 to the set of frame memories (FM) 11 without performing any operation.

With reference to FIG. 45, an example of a decoder (image signal decoder) for performing a decoding operation according to the MP@ML standard of the MPEG will be described below. Coded image data transmitted via the transmission line is received by a receiving circuit (not shown) or is reproduced by a reproducing apparatus. Such the coded image data is stored in a receiving buffer 21 temporarily and then supplied to a variable-length decoder (IVLC) 22. The variable-length decoder 22 performs an inverse variable-length encoding operation on the data supplied from the receiving buffer 21. The variable-length decoder 22 outputs a motion vector and information indicating the associated prediction mode to a motion compensation circuit 27. The variable-length decoder 22 also supplies a quantization step -to the inverse quantization circuit 23. Furthermore, the variable-length decoded data is supplied from the variable-length decoder 22 to the inverse quantization circuit 23.

The inverse quantization circuit 23 performs an inverse quantization operation on the quantized data supplied from the variable-length decoder 22 using the quantization step supplied from the variable-length decoder 22, and supplies the resultant signal to an IDCT circuit 24. The IDCT circuit 24 performs an inverse DCT process on the data (DCT coefficients) output by the inverse quantization circuit 23, and supplies the resultant data to an arithmetic operation circuit 25.

When the image signal output by the IDCT circuit 24 is an I-picture data, the data is stored via the arithmetic operation circuit 25 in a set of frame memories 26 so that predicted image data can be produced later for use in processing an image signal input to the arithmetic operation circuit 25. The data output by the arithmetic operation circuit 25 is also output as a reproduced image signal to the outside.

In the case where the input bit stream is a P- or B-picture signal, the motion compensation circuit 27 generates a predicted image from the image signal stored in the set of frame memories 26 in accordance with the motion vector and the associated prediction mode supplied from the variable-length decoder 22, and outputs the resultant predicted image to the arithmetic operation circuit 25. The arithmetic operation circuit 25 adds the predicted image signal supplied from the motion compensation circuit 27 to the image signal received from the IDCT circuit 24 thereby creating an output image signal. In the case where the given image signal is a P-picture, the output signal of the arithmetic operation circuit 25 is stored in the set of frame memories 26 so that it can be used as a reference image signal in processing a subsequent image signal to be decoded. In the case of an intramacroblock, the signal is simply output without being subjected to any process via the arithmetic operation circuit 25.

In the MPEG standard, various profiles at various levels are also defined, and various tools are available.

For example, scalability is available as one of these tools.

The scalability of the MPEG encoding technique makes it possible to encode various image signals having different image sizes at various frame rates. For example, in the case of the spatial scalability, when only a base layer bit stream is decoded, an image signal having a small image size may be decoded, while an image signal having a large image size may be decoded if both base layer and enhancement layer bit streams are decoded.

With reference to FIG. 46, an example of an encoder having the spatial scalability will be described below. In the spatial scaling, an image signal having a small image size is given as a base layer signal, while an image signal having a large image size is given as an enhancement layer signal.

The image signal in the base layer is first stored in a set of frame memories 1, and then is encoded in a manner similar to the MP@ML signal described above except that the output signal of an arithmetic operation circuit 10 is supplied not only to a set of frame memories 11 so that it is used as a prediction reference image signal in the base layer, but also to an up sampling circuit 31. The up sampling circuit 31 expands the received image signal supplied from the arithmetic operation circuit 10 up to an image size equal to the image size in the enhancement layer so that it is used as a prediction reference image signal in the enhancement layer.

On the other hand, the image signal in the enhancement layer is first stored in a set of frame memories 51. A motion vector extraction circuit 52 extracts a motion vector and determines a prediction mode, in a manner similar to the operation according to the MP@ML.

A motion compensation circuit 62 generates a predicted image signal using the motion vector in the prediction mode determined by the motion vector extraction circuit 52. The resultant signal is supplied to a weighting circuit (W) 34. The weighting circuit 34 multiplies the predicted image signal by a weighting factor W, and outputs the resultant signal to an arithmetic operation circuit 33.

The signal output from the arithmetic operation circuit 10, as described above, has been supplied to the up sampling circuit 31. The up sampling circuit 31 expands the image signal generated by the arithmetic operation circuit 10 up to a size equal to that of the image in the enhancement layer. The expanded image signal is supplied to a weighting circuit (1-W) 32. The weighting circuit 32 multiplies the image signal output from the up sampling circuit 31 by a weighting factor 1-W, and supplies the resultant signal to the arithmetic operation circuit 33.

The arithmetic operation circuit 33 generates a predicted image signal by adding together the image signals output by the weighting circuits 32 and 34, and outputs the resultant signal to an arithmetic operation circuit 53. The image signal output by the arithmetic operation circuit 33 is also input to an arithmetic operation circuit 60. The arithmetic operation circuit 60 adds together the image signal output by the arithmetic operation circuit 33 and an image signal output by an inverse DCT circuit 59. The resultant signal is stored in a set of frame memories 61 so that it is used as a predicted reference frame for the subsequent image signal to be encoded.

The arithmetic operation circuit 53 calculates the difference between the image signal to be encoded and the image signal output from the arithmetic operation circuit 33, and outputs the result as a difference image signal. However, in the case where the macroblock is to be processed in the intraframe encoding mode, the arithmetic operation circuit 53 directly supplies the image signal to be encoded to a DCT circuit 54 without performing any operation.

The DCT circuit 54 performs a DCT (discrete cosine transform) operation on the image signal output by the arithmetic operation circuit 53 thereby generating DCT coefficients. The generated DCT coefficients are supplied to a quantization circuit 55. The quantization circuit 55 quantizes the DCT coefficients, as in the operation for the MP@ML data, using a quantization scale determined in accordance with the amount of data stored in a transmission buffer 57. The resultant quantized data is supplied to a variable-length encoder 56. The variable-length encoder 56 performs a variable-length encoding operation on the quantized data (quantized DCT coefficients), and outputs the resultant data as an enhancement layer bit stream via the transmission buffer 57.

The quantized data from the quantization circuit 55 is also supplied to an inverse quantization circuit 58. The inverse quantization circuit 58 performs an inverse quantization operation on the received data using the same quantization scale as that employed by the quantization circuit 55. The resultant data is supplied to an inverse DCT circuit 59 and is subjected to an inverse DCT process. The result is supplied to the arithmetic operation circuit 60. The arithmetic operation circuit 60 adds together the image signal output from the arithmetic operation circuit 33 and the image signal output from the inverse DCT circuit 59, and stores the resultant signal in the set of frame memories 61.

The variable-length encoder 56 also receives the enhancement layer motion vector extracted by the motion vector extraction circuit 52 and the information indicating the associated prediction mode, the quantization scale employed by the quantization circuit 55, and the weighting factor W used by the weighting circuits 32 and 34. These data are encoded by the variable-length encoder 56, and resultant data is output. Then, an enhancement layer bit stream and a base layer bit stream are multiplexed by a multiplexer (not shown) and output via a transmission line or recorded on a recording medium.

Now referring to FIG. 47, an example of a decoder having the capability of spatial scaling will be described below. The base layer bit stream input to a reception buffer 21 is decoded in a similar manner to the MP@ML signal described above except that the output image signal of an arithmetic operation circuit 25 is not only supplied as a base layer image signal to the outside but also stored in the set of frame memories 26 so that it can be used as a prediction reference image signal in processing a subsequent image signal to be decoded. Furthermore, the output image signal of the arithmetic operation circuit 25 is also supplied to an up sampling circuit 81 so as to expand the image signal to an image size equal to the image size in the enhancement layer so that it is used as a prediction reference image signal in the enhancement layer.

On the other hand, the enhancement layer bit stream is stored in a reception buffer 71, and then supplied to a variable-length decoder 72. The variable-length decoder 72 performs a variable-length decoding operation on the received data thereby generating quantized DCT coefficients, a quantization scale, an enhancement layer motion vector, prediction mode data, and a weighting factor W. The variable-length decoded data output from the variable-length decoder 72 are supplied to an inverse quantization circuit 73. The inverse quantization circuit 73 performs an inverse quantization operation on the received data using the quantization scale. The resultant data is supplied to an inverse DCT circuit 74, and is subjected to an inverse DCT process. The resultant image signal is supplied to an arithmetic apparition circuit 75.

The motion compensation circuit 77 generates a predicted image signal according to the decoded motion vector and prediction mode, and supplies the resultant signal to a weighting circuit 84. The weighting circuit 84 multiplies the output signal of the motion compensation circuit 77 by the weighting factor W decoded, and supplies the result to an arithmetic operation circuit 83.

The output image signal of the arithmetic operation circuit 25 is output as a reproduced base layer image signal, and also supplied to the set of frame memories 26. Furthermore, the image signal output from the arithmetic operation circuit 25 is also supplied to the up sampling circuit 81 so as to expand it to an image size equal to the image size in the enhancement layer. The expanded image signal is then supplied to a weighting circuit 82. The weighting circuit 82 multiplies the image signal output from the up sampling circuit 81 by a weighting factor (z1-W) decoded, and supplies the resultant signal to the arithmetic operation circuit 83.

Arithmetic operation circuit 83 adds together the output image signals of the weighting circuits 82 and 84, and supplies the result to the arithmetic operation circuit 75. The arithmetic operation circuit 75 adds the image signal output from the inverse DCT circuit 74 and the image signal output from the arithmetic operation circuit 83, thereby generating a reproduced enhancement layer image, which is supplied not only to the outside but also to a set of frame memories 76. The signal stored in the set of frame memories 76 is used as a prediction reference image signal in a later process to decode a subsequent image signal.

Although the above description deals with the operation of processing a luminance signal, the operation associated with a color difference signal is also performed in a similar manner except that the motion vector used for the luminance signal is reduced to half in both vertical and horizontal directions.

In addition to the MPEG standard, there are various standards for converting a moving image signal into a compressed code in a highly efficient manner. For example, the H.261 and H.263 standards established by the ITU-T are employed in encoding process especially for communication. Although there are some differences in the details associated with for example header information, the H.261 and H.263 standards are also based on the combination of motion compensation prediction encoding and DCT encoding, and thus an encoder and a decoder can be implemented in a similar manner to those described above.

It is also known in the art to compose an image by combining a plurality of images using a chromakey. In this technique, an image of an object is taken in front of a background having a particular uniform color such as blue.

Areas having colors other than blue are extracted from the image, and the extracted image is combined with another image. In the above process, the signal representing the extracted areas is referred to as a key signal.

FIG. 48 illustrates the method of encoding a composite image signal. In FIG. 48, a background image F1 and a foreground image F2 are combined into a single image. The foreground image F2 is obtained by taking a picture of an object in front of a background having a particular color, and then extracting the areas having colors different from the background color. The extracted areas are represented by a key signal K1. A composite image F3 is obtained by combining the foreground image F2 and the background image F1 using the key signal K1. Then the composite image F3 is encoded according to an appropriate encoding technique such as the MPEG encoding technique. When the composite image is encoded, the information of the key signal is lost. Therefore, when the decoded composite image is edited or recomposed, it is difficult to change only the background image F1 while maintaining the foreground image F2 unchanged.

Instead, as shown in FIG. 49, the background image F1, the foreground image F2, and the key signal K1 may first be encoded separately, and then the respective encoded signals may be multiplexed into a single bit stream of a composite image F3.

FIG. 50 illustrates the technique of decoding the bit stream produced in the manner shown in FIG. 49 into a composite image F3. The bit stream is subjected to a demultiplexing process and is decomposed into separate bit streams of the image F1, the image F2, and the key signal K1, respectively. These bit streams are decoded separately so as to obtain a decoded image F1', a decoded image F2', and a decoded key signal K1'. If the decoded image F1' is combined with the decoded image F2' using the decoded key signal K1', then it is possible to obtain a decoded composite image F3'. In this technique, it is possible to easily carry out re-edit or recomposition. For example it is possible to change only the background image F1 while maintaining the foreground image F2.

In the following description, a sequence of images such as images F1 and F2 constituting a composite image are referred to as a VO (video object). An image frame of a VO at a certain time is referred to as a VOP (video object plane). Each VOP consists of a luminance signal, a color difference signal, and a key signal.

An image frame refers to one image at a certain time. An image sequence is a set of image frames taken at various times. That is, each VO is a set of VOPs at various times. The size and position of each VO vary with time. That is, even if VOPs are included in the same VO, they can be differ in size and position from one another.

FIGS. 51 and 52 illustrate an encoder and decoder, respectively, according to the present technique. An image signal is first input to a VO generator 101. The VO generator 101 decomposes the input signal into a background image signal, an image signal of each object, and an associated key signal. Each VO consists of an image signal and a key signal. The respective VOs of image signals output from the VO generator 101 are input to corresponding VOP generators 102-0 to 102-n. For example, the image signal and the key signal of Vo-0 are input to the VOP generator 102-0, and the image signal and the key signal of Vo-1 are input to the VOP generator 102-1. Similarly, the image signal and the key signal of Vo-n are input to the VOP generator 102-n, When the image signal represents a background, there is no key signal.

In the case of an image signal generated using a chromakey such as that shown in FIG. 49, the image signals VO-0 to VO-n and associated key signals output from the VO generator 101 are directly used as image signals of the respective VOs and associated key signals. When an image has no key signal or the key signal of the image is lost, a key signal is generated by extracting predetermined areas by means of image area division technique thereby generating a VO.

Each VOP generator 102-0 to 102-n extracts a minimum rectangular containing an object in the image from each image frame wherein the size of the rectangular is selected such that the number of pixels in the vertical direction and that in the horizontal direction are integral multiples of 16. The respective VOP generators 102-0 to 102-n then extract an image signal (luminance signal and color difference signal) and a key signal included in the corresponding rectangles, and output the extracted signals. The VOP generators also output a flag indicating the size of the VOPs and the position of the VOPs represented in absolute coordinates.

The output signals of the respective VOP generators 102-0 to 102-n are input to corresponding VOP encoders 103-0 to 103-n and encoded. The output signals of the VOP encoders 103-0 to 103-n are input to a multiplexer 104 and combined into a single bit stream.

When the bit stream containing multiplexed signals is input to the decoder shown in FIG. 52, the input bit stream is first demultiplexed by a demultiplexer 111 into separate bit streams associated with the respective VOs. The respective VO bit streams are input to corresponding VOP decoders 112-0 to 112-n and decoded. Thus, the image signals, key signal, the flags indicating the VOP sizes, and the flags indicating the positions of VOPs represented in absolute coordinates of the respective VOPs are reproduced by the respective VOP decoders 112-0 to 112-n. The reproduced signals are input to an image reconstruction circuit 113. The image reconstruction circuit 113 generates a reproduced image using the image signals, key signals, size flags, absolute coordinate position flags associated with the respective VOPs.

Referring to FIGS. 53 and 54, examples of the constructions of the VOP encoder 103-0 and the VOP decoder 112-0 are described below. In FIG. 53, The image signal and the key signal of each VOP are input to an image signal encoder 121 and a key signal encoder 122, respectively. The image signal encoder 121 encodes the image signal according to for example the MPEG or H.263 standard. The key signal encoder 1L22 encodes the received key signal by means of for example DPCM. Alternatively, motion compensation associated with the key signal may be performed using the motion vector detected by the image signal encoder 121, and the obtained differential signal may be encoded. The amount of bits generated in the key signal encoding is input to the image signal encoder 121 and is controlled so that the bit rate is maintained at a predetermined value.

The bit stream of the encoded image signal (motion vector and texture information) and the bit stream of the encoded key signal are input to a multiplexer 123 and combined into a single bit stream. The resultant bit stream is output via a transmission buffer 124.

When the bit stream is input to the VOP decoder shown in FIG. 54, the bit stream is first applied to a demultiplexer 131. The Demultiplexer 131 demultiplexes the received bit stream into the bit stream of the image signal (motion vector and texture information) and the bit stream of the key signal, which are then decoded by an image signal decoder 132 and a key signal decoder 133, respectively. In the case where the key signal is encoded by means of motion compensation, the motion vector decoded by the image signal decoder 132 is input to the key signal decoder 133 so that the key signal decoder 133 can decode the key signal using the motion vector.

The above-described method of decoding the image VOP by VOP has a problem associated with the motion compensation which occurs when the image is decoded VOP by VOP. The VOP varies in the size and position with time. That is, VOPs belonging to the same VO are differ in size and position from one another. Therefore, when a VOP which is different in time is referred to for example in the motion compensation process, it is required to encode the flag indicating the position and size of the VOP and transmit the encoded flag signal, as will be described in detail below with reference to FIG. 55.

In FIG. 55, an image F11 corresponds to a VOP at a time t of a certain video object VO0, and an image F12 corresponds to a VOP at the same time t of a video object VO1. The images F11 and F12 are different in size from each other. The positions of the images F11 and F12 are represented by absolute coordinates OST0 and OST1, respectively.

If a VOP to be encoded and a VOP to be referred to are placed in an absolute coordinate system, and a reference position in absolute coordinates is transmitted as a motion vector, it becomes possible to realize motion compensation.

In this case, the motion compensation is performed as follows. In the following description, it is assumed that the image has an arbitrary shape. In the case where the VOP has a rectangular shape, the motion compensation can be performed according to the known method such as that defined in the H.263 standard.

FIG. 56 illustrates a current VOP to be encoded. The VOP has a rectangular shape containing an image object wherein the size of the rectangle is an integral multiple of 16 in both horizontal and vertical directions. The size of the rectangle of the VOP is selected such that the resultant rectangle is a minimum one which can contain the object. When the VOP is encoded, encoding and motion compensation are performed from one macroblock to another wherein each macroblock has a size of 16×16 pixels. The size of each macroblock may also be set to 8×8 pixels, and the motion compensation may be performed from one macroblock to another having the same size.

FIG. 57 illustrates a VOP to be referred to. The VOP is stored at a predetermined location of a frame memory in accordance with the flag indicating the position of the VOP in the absolute coordinates and the flag indication the VOP size. In the case of a VOP having an arbitrary shape, when a motion vector is extracted, a problem occurs due to the fact that the VOP has an area containing an image and an area containing no image.

First, the process performed on the reference VOP will be described below. In the case where the reference VOP has an arbitrary shape, the pixel values in the area containing no image are calculated from the pixel values in the area containing an image as described below.

1. First, the pixel values in the outside of the image object, in which there is no image, are set to 0.

2. The VOP is then scanned in the horizontal direction. Each horizontal line of the VOP is divided into line segments in which all pixel values are 0 and line segments in which all pixels have values which are not equal to 0. Those line segments in which all pixels have values not equal to 0 are not subjected to any process. The other line segments can be divided into line segments whose both ends have non-zero pixel values and line segments whose one end is an end of the VOP and the other end is a non-zero pixel value. Those line segments whose both ends have non-zero pixel values are subjected to replacement such that all pixel values on the line segments are replaced with the average of -the pixel values at both ends. In the other case, the pixel values on the line segments are all replaced with the non-zero pixel value at one end.

3. The process step 2 is also performed in the vertical direction.

4. For those pixels which are changed in value in both process steps 2 and 3, the pixel values are replaced by means values.

5. For those pixels which have a pixel value of 0 when the process 4 has been completed, the pixel values are replaced by the value of a non-zero pixel at the nearest location. If there are two nearest non-zero pixels, the mean value of these two pixel values is employed.

When a motion vector is detected, the pixel values in non-image areas of a reference VOP are set to non-zero values according to the above-described method. A prediction error relative to the reference image is calculated for a macroblock to be encoded, and a vector which gives a minimum prediction error is employed as a motion vector. In this calculation process, the VOP to be encoded can be such a VOP having an arbitrary shape, or the macroblock to be encoded can include an area containing no image. When the macroblock includes an area containing no image, those pixels in the area containing no image are neglected in the calculation of the prediction error. That is, the prediction error is calculated using only those pixels corresponding to an image.

Whether each pixel in the VOP corresponds to an image or not can be judged by referring to the corresponding key signal. If the corresponding key signal has a value of 0, the pixel is not in an image. In the other case, the pixel is in an image.

When the motion vector is detected using the technique described above, it is required to perform a great amount of computations. Thus, there is a need for a method of performing computations in a more simple fashion.

In view of the above, it is an object of the present invention to provide a technique of improving the encoding efficiency thereby reducing the computation cost.

SUMMARY OF THE INVENTION

According to an aspect of the present invention, there is provided an image signal encoding apparatus for encoding a plurality of image signals, at least one of the plurality of image signals being an image signal representing a moving image object, at least one of the plurality of image signals including a signal used to combine it with other image signal(s) of the plurality of image signals, the apparatus comprising:

an image supplier for supplying a base layer image signal and an enhancement layer image signal scalably representing the image signal representing a moving image object;

an enhancement layer encoder for encoding the enhancement layer image signal thereby generating an encoded enhancement layer signal; and a base layer encoder for encoding the base layer image signal thereby generating an encoded base layer signal;

wherein the enhancement layer encoder comprises:

a generator for generating a reference image signal used to calculate a motion vector of the enhancement layer image signal to be encoded, the reference image signal being generated by replacing the values of pixels outside the image object of the enhancement layer image signal with the values of predetermined pixels of the base layer image signal;

a detector for detecting the motion vector of the enhancement layer image signal to be encoded using the reference image signal; and an enhancement layer encoder for encoding the enhancement layer image signal to be encoded using a predicted image signal of the enhancement layer image signal to be encoded, the predicted image signal being generated by performing motion compensation using the motion vector detected.

According to another aspect of the invention, there is provided an image signal encoding method for encoding a plurality of image signals, at least one of the plurality of image signals being an image signal representing a moving image object, at least one of the plurality of image signals including a signal used to combine it with other image signal(s) of the plurality of image signals, the method comprising the steps of:

supplying a base layer image signal and an enhancement layer image signal scalably representing the image signal representing a moving image object;

encoding the enhancement layer image signal thereby generating an encoded enhancement layer signal; and encoding the base layer image signal thereby generating an encoded base layer signal;

wherein the step of encoding the enhancement layer image signal comprises the steps of:

generating a reference image signal used to calculate a motion vector of the enhancement layer image signal to be encoded, the reference image signal being generated by replacing the values of pixels outside the image object of the enhancement layer image signal with the values of predetermined pixels of the base Layer image signal;

detecting the motion vector of the enhancement layer image signal to be encoded using the reference image signal; and encoding the enhancement layer image signal to be encoded using a predicted image signal of the enhancement layer image signal to be encoded, the predicted image signal being generated by performing motion compensation using the motion vector detected.

According to still another aspect of the invention, there is provided an image signal transmission method for encoding a plurality of image signals and then transmitting the encoded signals, at least one of the plurality of image signals being an image signal representing a moving image object, at least one of the plurality of image signals including a signal used to combine it with other image signal(s) of the plurality of image signals, the method comprising the steps of:

supplying a base layer image signal and an enhancement layer image signal scalably representing the image signal representing a moving image object;

encoding the enhancement layer image signal thereby generating an encoded enhancement layer signal; and encoding the base layer image signal thereby generating an encoded base layer signal;

the step of encoding the enhancement layer image signal comprising the steps of:

generating a reference image signal used to calculate a motion vector of the enhancement layer image signal to be encoded, the reference image signal being generated by replacing the values of pixels outside the image object of the enhancement layer image signal with the values of predetermined pixels of the base -Layer image signal;

detecting the motion vector of the enhancement layer image signal to be encoded using the reference image signal;

encoding the enhancement layer image signal to be encoded using a predicted image signal of the enhancement layer image signal to be encoded, the predicted image signal being generated by performing motion compensation using the motion vector detected; and generating a flag indicating an image to be replaced;

the method further comprising the step of transmitting the encoded enhancement layer image signal, the encoded base layer image signal, the motion vector, and the flag.

According to a further aspect of the invention, there is provided an image signal decoding apparatus for receiving an encoded signal generated by encoding a plurality of image signals and then decoding the encoded signal, at least one of the plurality of image signals being an image signal representing a moving image object, at least one of the plurality of image signals including a signal used to combine it with other image signal(s) of the plurality of image signals, the encoded signal including an encoded enhancement layer signal, an encoded base layer signal, a motion vector, and a flag indicating an image to be replaced, the apparatus comprising:

a separator for separating the encoded signal into the encoded enhancement layer signal, the encoded base layer signal, the motion vector, and the flag;

a base layer decoder for decoding the encoded base layer signal thereby generating a decoded base layer image signal; and an enhancement layer decoder for decoding the encoded enhancement layer signal thereby generating a decoded enhancement layer image signal;

wherein the enhancement layer decoder comprises: a replaced image generator for generating a replaced image signal by replacing the values of pixels outside an image object of the decoded enhancement layer image signal with the values of predetermined pixels of the base layer image signal in accordance with the flag; and a generator for generating the decoded enhancement layer image signal using a predicted image signal generated by performing motion compensation on the replaced image signal using the motion vector.

According to another aspect of the invention, there is provided an image signal decoding method for receiving an encoded signal generated by encoding a plurality of image signals and then decoding the encoded signal, at least one of the plurality of image signals being an image signal representing a moving image object, at least one of the plurality of image signals including a signal used to combine it with other image signal(s) of the plurality of image signals, the encoded signal including an encoded enhancement layer signal, an encoded base layer signal, a motion vector, and a flag indicating an image to be replaced, the method comprising the steps of:

separating the encoded signal into the encoded enhancement layer signal, the encoded base layer signal, the motion vector, and the flag;

decoding the encoded base layer signal thereby generating a decoded base layer image signal; and decoding the encoded enhancement layer signal thereby generating a decoded enhancement layer image signal;

wherein the step of decoding the enhancement layer signal comprises the steps of:

generating a replaced image signal by replacing the values of pixels outside an image object of the decoded enhancement layer image signal with the values of predetermined pixels of the base layer image signal in accordance with the flag; and generating the decoded enhancement layer image signal using a predicted image signal generated by performing motion compensation on the replaced image signal using the motion vector.

According to still another aspect of the invention, there is provided an image signal recording medium capable of being decoded by a decoding apparatus, the recording medium including a recorded signal, the recorded signal including an encoded signal generated by encoding a plurality of image signals, at least one of the plurality of image signals being an image signal representing a moving image object, at least one of the plurality of image signals including a signal used to combine it with other image signal(s) of the plurality of image signals, the encoded signal including an encoded enhancement layer signal, an encoded base layer signal, a motion vector, and a flag indicating an image to be replaced, the encoded signal being generated by the steps of:

supplying a base layer image signal and an enhancement layer image signal scalably representing the image signal representing a moving image object;

encoding the enhancement layer image signal thereby generating an encoded enhancement layer signal; and encoding the base layer image signal thereby generating an encoded base layer signal;

wherein the step of encoding the enhancement layer image signal comprises the steps of: generating a reference image signal used to calculate a motion vector of the enhancement layer image signal to be encoded, the reference image signal being generated by replacing the values of pixels outside the image object of the enhancement layer image signal with the values of predetermined pixels of the base layer image signal; detecting the motion vector of the enhancement layer image signal to be encoded using the reference image signal; encoding the enhancement layer image signal to be encoded using a predicted image signal of the enhancement layer image signal to be encoded, the predicted image signal being generated by performing motion compensation using the motion vector detected; and generating a flag indicating an image to be replaced.

According to still another aspect of the invention, there is provided an image signal encoding apparatus for encoding a plurality of image signals, at least one of the plurality of image signals being an image signal representing a moving image object, at least one of the plurality of image signals including a signal used to combine it with other image signal(s) of the plurality of image signals, the apparatus comprising:

an image supplier for supplying an enhancement layer image signal and a base layer image signal scalably representing the image signal representing a moving image object;

an enhancement layer encoder for encoding the enhancement layer image signal thereby generating an encoded enhancement layer signal; and a base layer encoder for encoding the base layer image signal thereby generating an encoded base layer signal;

wherein the base layer encoder comprises:

a generator for generating a reference image signal used to calculate a motion vector of the base layer image signal to be encoded, the reference image signal being generated by replacing the values of pixels outside the image object of the base layer image signal with the pixel values obtained by extrapolating the pixel values inside the image object;

a detector for detecting the motion vector of the base layer image signal to be encoded using the reference image signal; and an enhancement layer encoder for encoding the base layer image signal to be encoded using a predicted image signal of the base layer image signal to be encoded, the predicted image signal being generated by performing motion compensation using the motion vector detected.

According to still another aspect of the invention, there is provided an image signal encoding method for encoding a plurality of image signals, at least one of the plurality of image signals being an image signal representing a moving image object, at least one of the plurality of image signals including a signal used to combine it with other image signal(s) of the plurality of image signals, the method comprising the steps of:

supplying a base layer image signal and an enhancement layer image signal scalably representing the image signal representing a moving image object;

encoding the enhancement layer image signal thereby generating an encoded enhancement layer signal; and encoding the base layer image signal thereby generating an encoded base layer signal;

wherein the step of encoding the base layer image comprising the steps of:

generating a reference image signal used to calculate a motion vector of the base layer image signal to be encoded, the reference image signal being generated by replacing the values of pixels outside the image object of the base layer image signal with the pixel values obtained by extrapolating the pixel values inside the image object;

detecting the motion vector of the base layer image signal to be encoded using the reference image signal; and encoding the base layer image signal to be encoded using a predicted image signal of the base layer image signal to be encoded, the predicted image signal being generated by performing motion compensation using the motion vector detected.

According to still another aspect of the invention, there is provided an image signal transmission method for encoding a plurality of image signals and then transmitting the encoded signals, at least one of the plurality of image signals being an image signal representing a moving image object, at least one of the plurality of image signals including a signal used to combine it with other image signal(s) of the plurality of image signals, the method comprising the steps of:

supplying a base layer image signal and an enhancement layer image signal scalably representing the image signal representing a moving image object;

encoding the enhancement layer image signal thereby generating an encoded enhancement layer signal; and encoding the base layer image signal thereby generating an encoded base layer signal;

wherein the step of encoding the base layer image comprising the steps of:

generating a reference image signal used to calculate a motion vector of the base layer image signal to be encoded, the reference image signal being generated by replacing the values of pixels outside the image object of the base layer image signal with the pixel values obtained by extrapolating the pixel values inside the image object;

detecting the motion vector of the base layer image signal to be encoded using the reference image signal;

encoding the base layer image signal to be encoded using a predicted image signal of the base layer image signal to be encoded, the predicted image signal being generated by performing motion compensation using the motion vector detected; and transmitting the encoded enhancement layer signal and the encoded base layer signal.

According to still another aspect of the invention, there is provided an image signal decoding apparatus for receiving an encoded signal generated by encoding a plurality of image signals and then decoding the encoded signal, at least one of the plurality of image signals being an image signal representing a moving image object, at least one of the plurality of image signals including a signal used to combine it with other image signal(s) of the plurality of image signals, the encoded signal including an encoded enhancement layer signal, an encoded base layer signal, a motion vector, and a flag indicating an image to be replaced, the apparatus comprising:

a separator for separating the encoded signal into the encoded enhancement layer signal, the encoded base layer signal, the motion vector, and the flag;

a base layer decoder for decoding the encoded base layer signal thereby generating a decoded base layer image signal; and an enhancement layer decoder for decoding the encoded enhancement layer signal thereby generating a decoded enhancement layer image signal;

the base layer decoder comprises:

a replaced image generator for generating a replaced image signal by replacing the values of pixels outside an image object of the decoded base layer image signal with the pixel values obtained by extrapolating the pixel values inside the image object in accordance with the flag;

a generator for generating the decoded base layer image signal using a predicted image signal generated by performing motion compensation on the replaced image signal using the motion vector.

According to still another aspect of the invention, there is provided an image signal decoding apparatus for receiving an encoded signal generated by encoding a plurality of image signals and then decoding the encoded signal, at least one of the plurality of image signals being an image signal representing a moving image object, at least one of the plurality of image signals including a signal used to combine it with other image signal(s) of the plurality of image signals, the encoded signal including an encoded enhancement layer signal, an encoded base layer signal, a motion vector, and a flag indicating an image to be replaced, the method comprising the steps of:

separating the encoded signal into the encoded enhancement layer signal, the encoded base layer signal, the motion vector, and the flag;

decoding the encoded base layer signal thereby generating a decoded base layer image signal; and decoding the encoded enhancement layer signal thereby generating a decoded enhancement layer image signal;

the step of decoding the enhancement layer signal comprises the steps of:

generating a replaced image signal by replacing the values of pixels outside an image object of the decoded base layer image signal with the values obtained by extrapolating pixel values inside the image object in accordance wit the flag; and generating the decoded base layer image signal using a predicted image signal generated by performing motion compensation on the replaced image signal using the motion vector.

According to still another aspect of the invention, there is provided an image signal recording medium capable of being decoded by a decoding apparatus, the recording medium including a recorded signal, the recorded signal including an encoded signal generated by encoding a plurality of image signals, at least one of the plurality of image signals being an image signal representing a moving image object, at least one of the plurality of image signals including a signal used to combine it with other image signal(s) of the plurality of image signals, the encoded signal including an encoded enhancement layer signal, an encoded base layer signal, and a motion vector, the encoded signal being generated by the steps of:

supplying a base layer image signal and an enhancement layer image signal scalably representing the image signal representing a moving image object;

encoding the enhancement layer image signal thereby generating an encoded enhancement layer signal; and encoding the base layer image signal thereby generating an encoded base layer signal;

wherein the step of encoding the base layer image comprising the steps of:

generating a reference image signal used to calculate a motion vector of the base layer image signal to be encoded, the reference image signal being generated by replacing the values of pixels outside the image object of the base layer image signal with -the pixel values obtained by extrapolating the pixel values inside the image object;

detecting the motion vector of the base layer image signal to be encoded using the reference image signal; and encoding the base layer image signal to be encoded using a predicted image signal of the base layer image signal to be encoded, the predicted image signal being generated by performing motion compensation using the motion vector detected;

BRIEF DESCRIPTION OF THE DRAWINGS

FIG. 22 illustrates the syntax of a video session;

FIG. 23 illustrates the syntax of a video object;

FIG. 24 illustrates the syntax of a video object layer;

FIG. 25 illustrates the syntax of a video object plane;

FIG. 26 illustrates the syntax of a video object plane;

FIG. 27 illustrates the syntax of a video object plane;

FIG. 29 is a schematic representation of an example of spatial scalability encoding;

FIG. 43 illustrates the syntax of a video object layer;

DESCRIPTION OF THE PREFERRED EMBODIMENTS

With an encoding apparatus according to the present invention, scalable encoding is performed VO by VO by means of a scalable encoding technique according to for example the MPEG standard. When scalable encoding is performed VO by VO, an image in the enhancement layer can be a part of an image in the base layer. For example, if a particularly important area in a base layer image is improved in image quality, the resultant image will be good enough in low bit rate applications. This technique also allows a reduction of redundant bits. In this case, the particular area of the base layer image can be improved in the image quality (spatial resolution or temporal resolution) by decoding both bit streams of the enhancement and base layers.

In the case where the enhancement layer image corresponds to a particular area of the base layer image, the base layer image has information about the image outside the enhancement layer image. In the motion compensation, the above information can be used to achieve an improvement in the encoding efficiently.

That is, in the present invention, pixel replacement is performed as follows.

1. When the enhancement layer is referred to in the motion vector extraction or in the motion compensation, pixels whose pixel value is equal to 0 are replaced with pixels at corresponding locations in the base layer.

2. In the above pixel replacement process for those pixels whose pixel value is equal to 0, a flag is used to indicate whether the pixel values should be replaced with proper base layer image signals. This flag is transmitted after being encoded.

3. When an image of a VOP having an arbitrary shape is expanded using an interpolation filter or the like, the expansion is performed after performing pixel replacement process.

With this technique, when an image is encoded in a scalable fashion VO by VO, even if the size and/or the shape vary with time, it is possible to perform motion compensation in a highly efficient fashion at a reduced calculation cost. As a result, it is possible to realize a high efficiency scalability.

Figure 51:
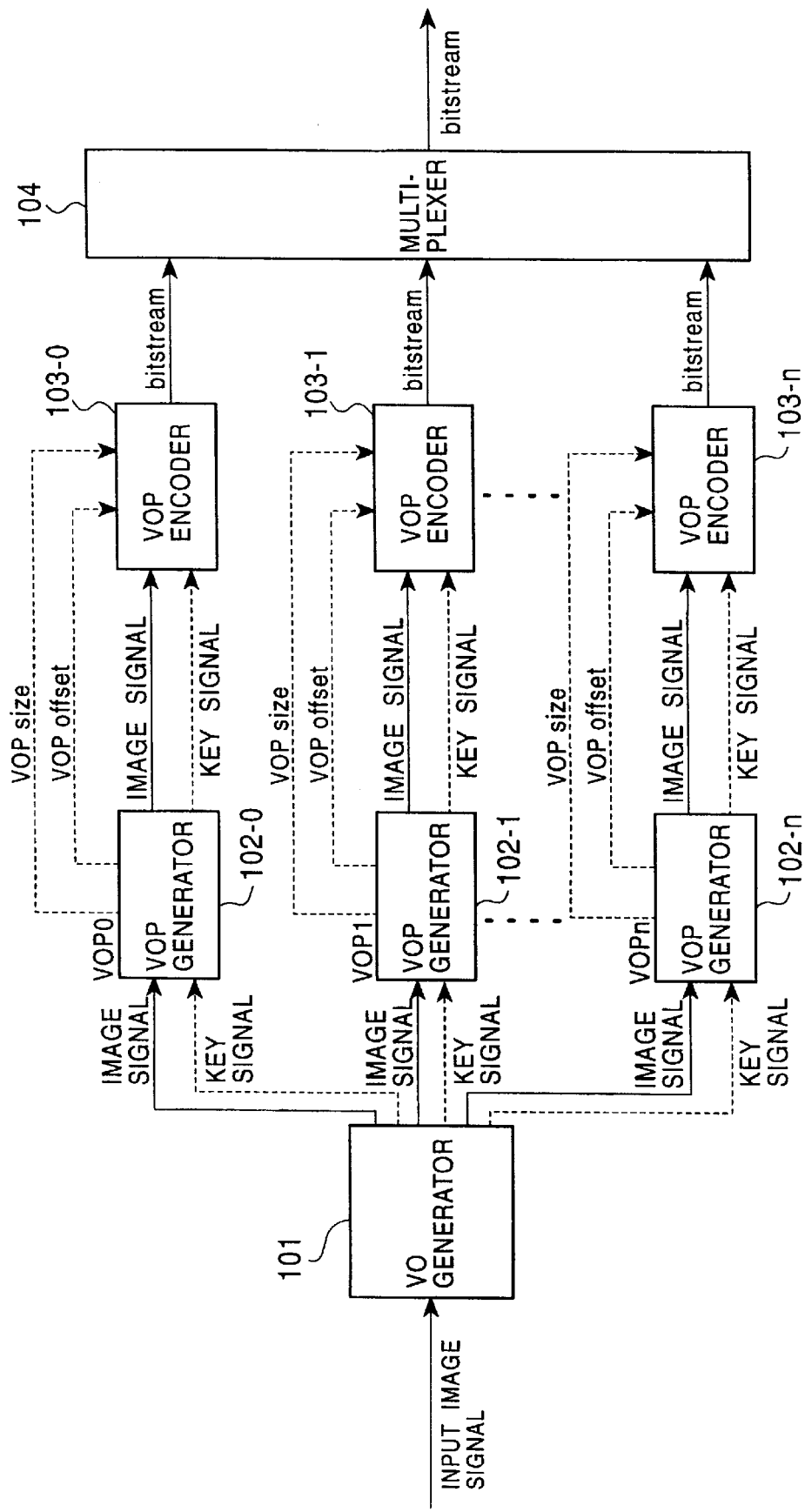
FIG. 51 is a block diagram illustrating still another example of the construction of an image signal encoding apparatus.
Figure 52:
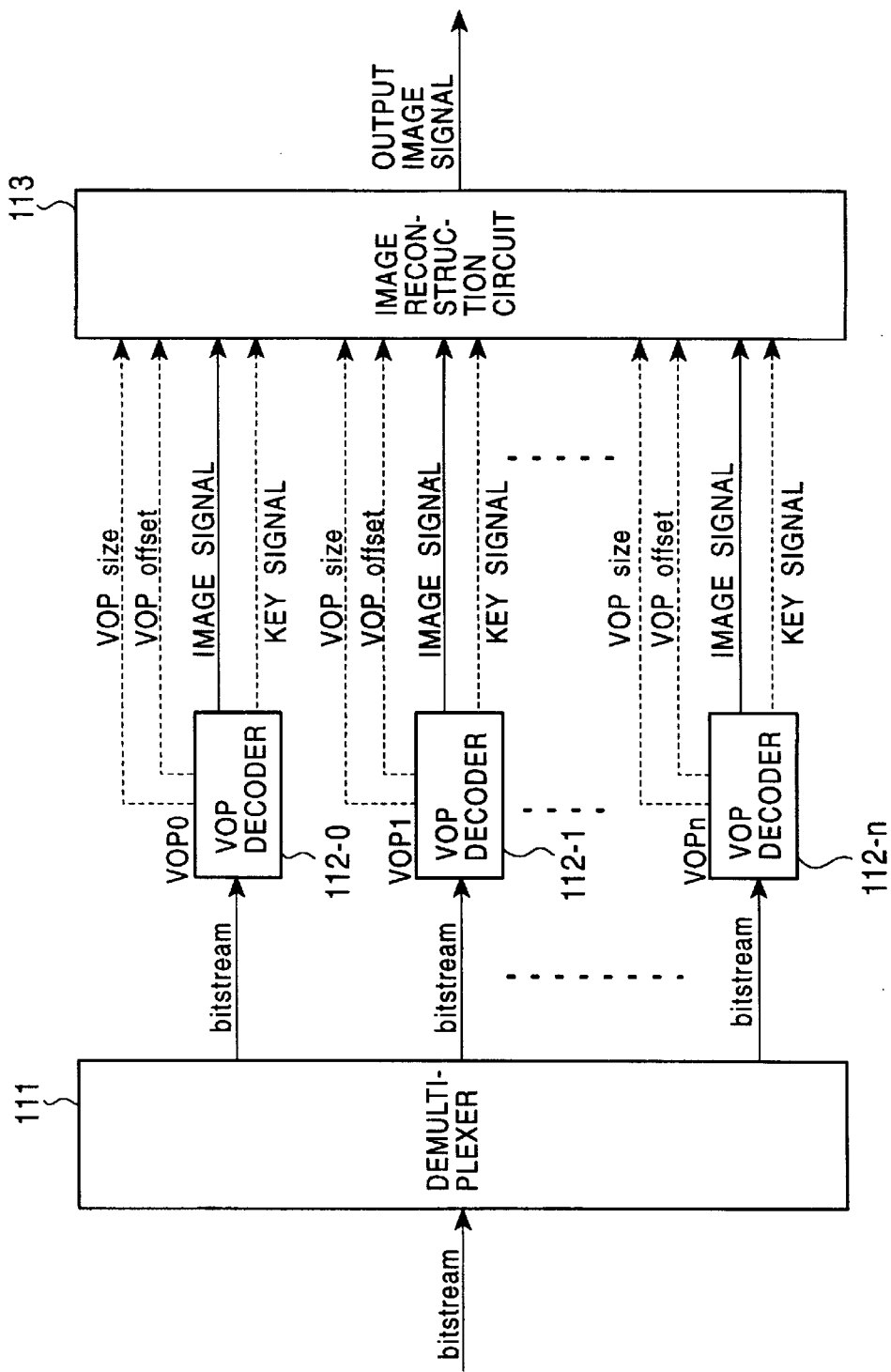
FIG. 52 is a block diagram illustrating still another example of the construction of an image signal decoding apparatus.
Figure 53:
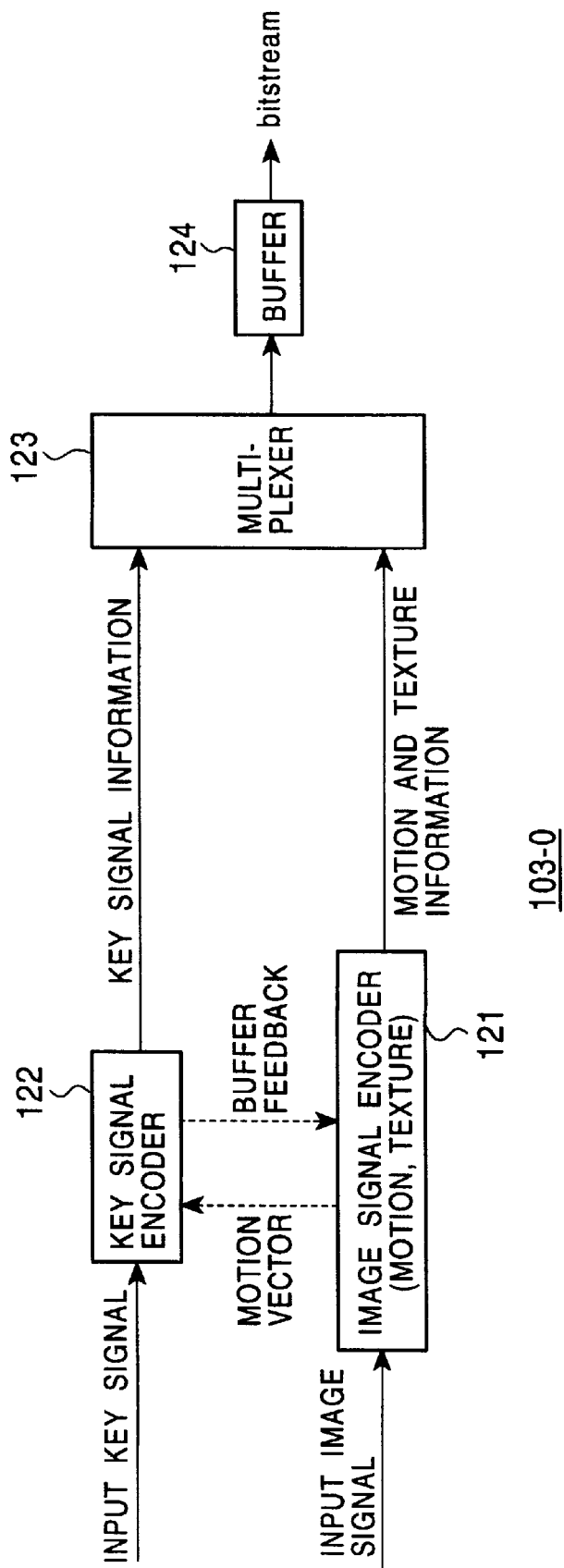
FIG. 53 is a block diagram illustrating an example of the construction of the VOP encoder 103-0 shown in FIG. 51.
Figure 54:
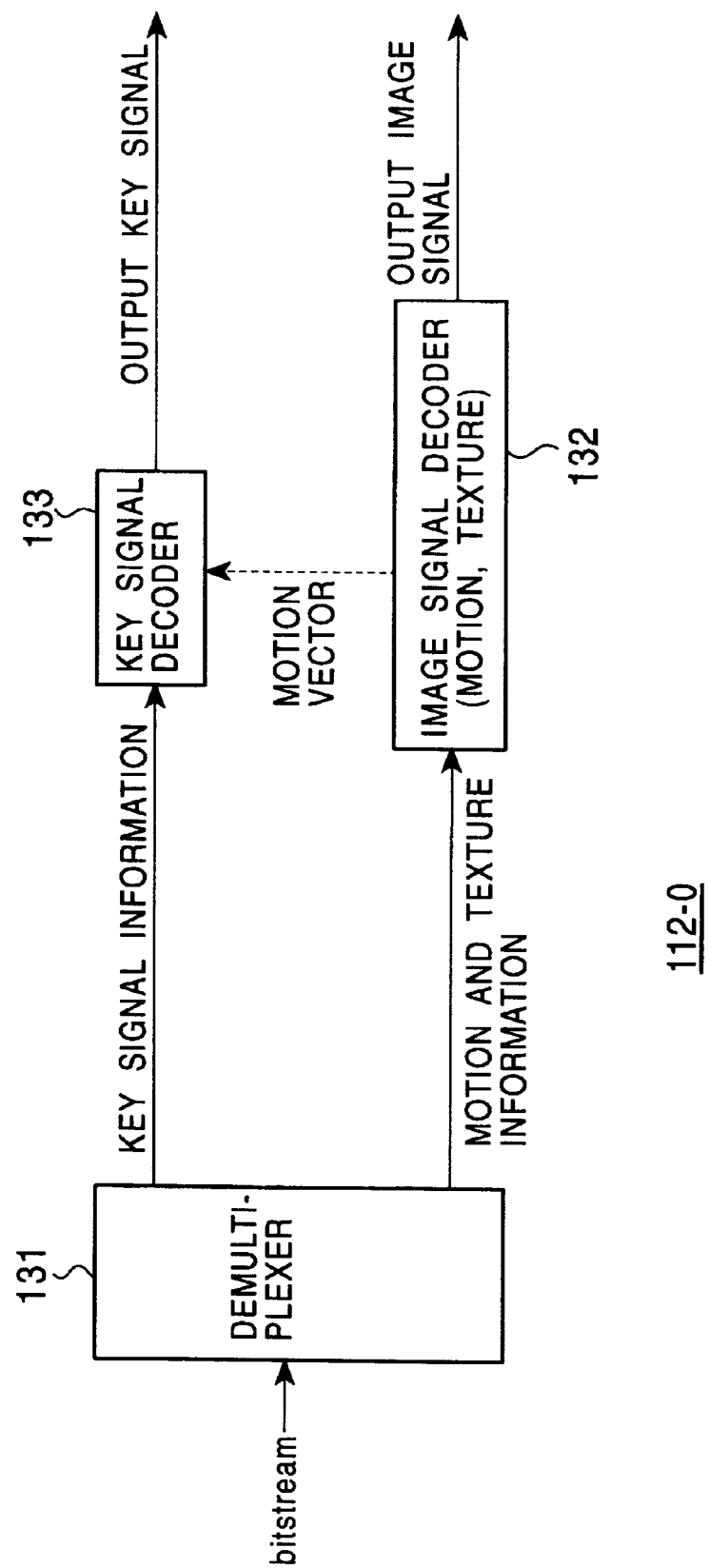
FIG. 54 is a block diagram illustrating an example of the construction of the VOP decoder 112-0 shown in FIG. 52.
Figure 55:
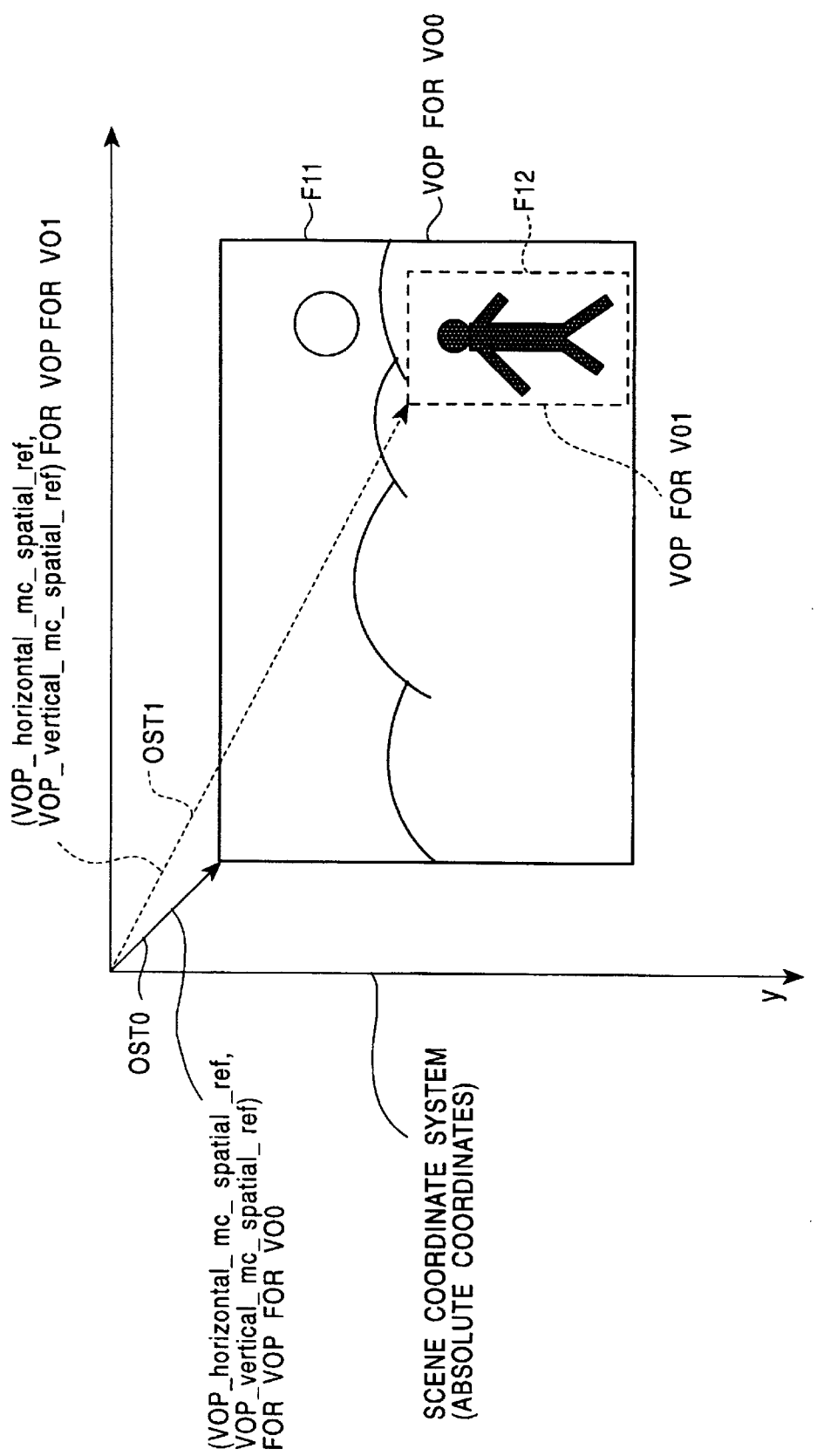
FIG. 55 is a schematic representation of absolute coordinates.
Figure 56:
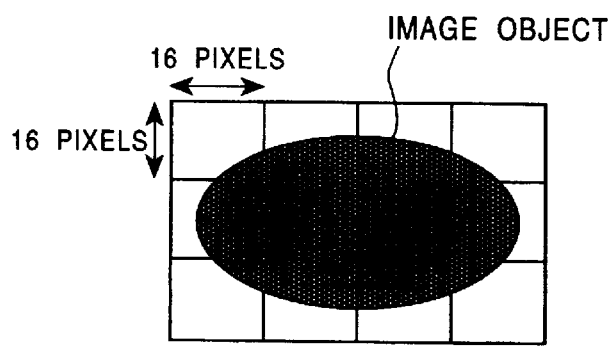
FIG. 56 is a schematic representation of an image object.
Figure 57:
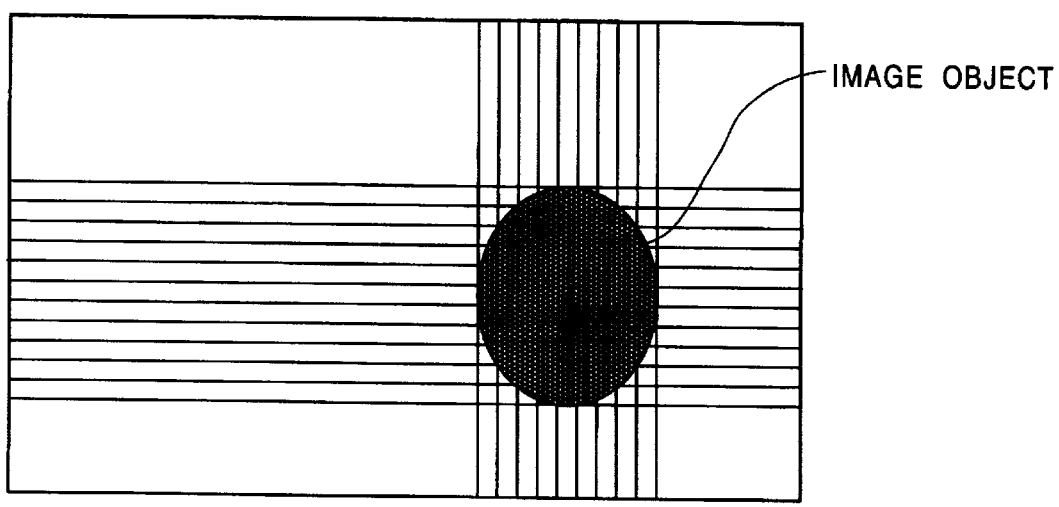
FIG. 57 is a schematic representation of an image object.

A first embodiment of an image signal encoder according to the present invention will be described below. In this embodiment, the VOP encoders 103-0 to 103-n and the VOP decoders 112-0 to 112-n shown in FIGS. 51 and 52 are replaced by scalable encoders and scalable decoders, respectively, thereby achieving the bit stream scalability.

Figure 1:
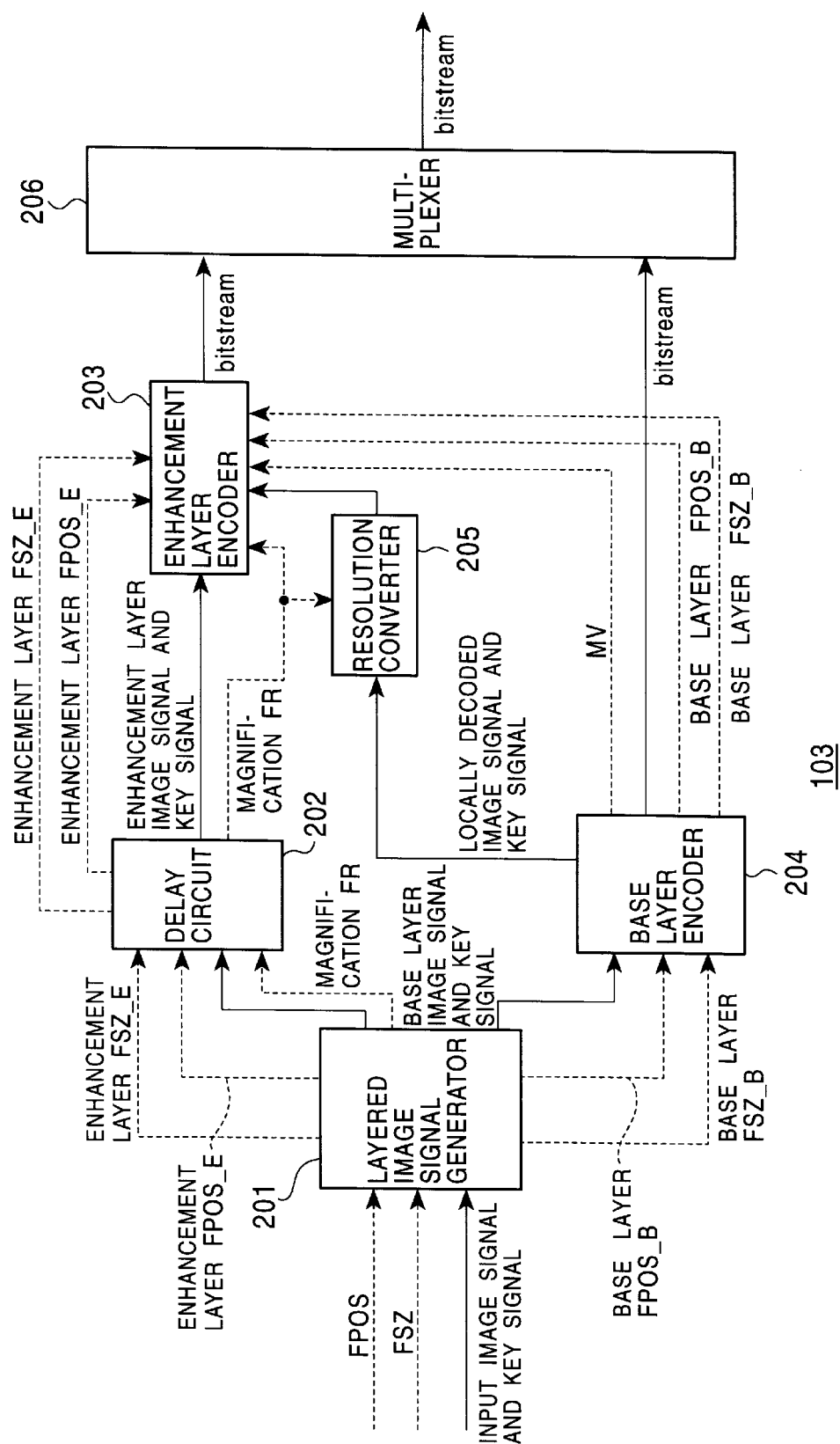
FIG. 1 is a block diagram illustrating an example of the construction of a VOP encoder employed in an image signal encoding apparatus according to the present invention.

FIG. 1 illustrates an example of a VOP encoder 103 according to the first embodiment. An image signal and a key signal of each VOP as well as a flag FSZ indicating the VOP size and a flag FPOS indicating the absolute coordinate position of the VOP are input to a layered image signal generator 201. The layered image signal generator 201 generates a plurality of image signals in different layers from the input image signal. For example in the case of the spatial scalability, the layered image signal generator 201 generates a base layer image signal and key signal by reducing the input image signal and key signal. Although in the specific example shown in FIG. 1, image signals in two layers (an enhancement layer image signal and a base layer image signal) are generated, image signals in a greater number of layers may also be generated. For simplicity, it is assumed in the following description that image signals in two layers are generated.

Figure 2:
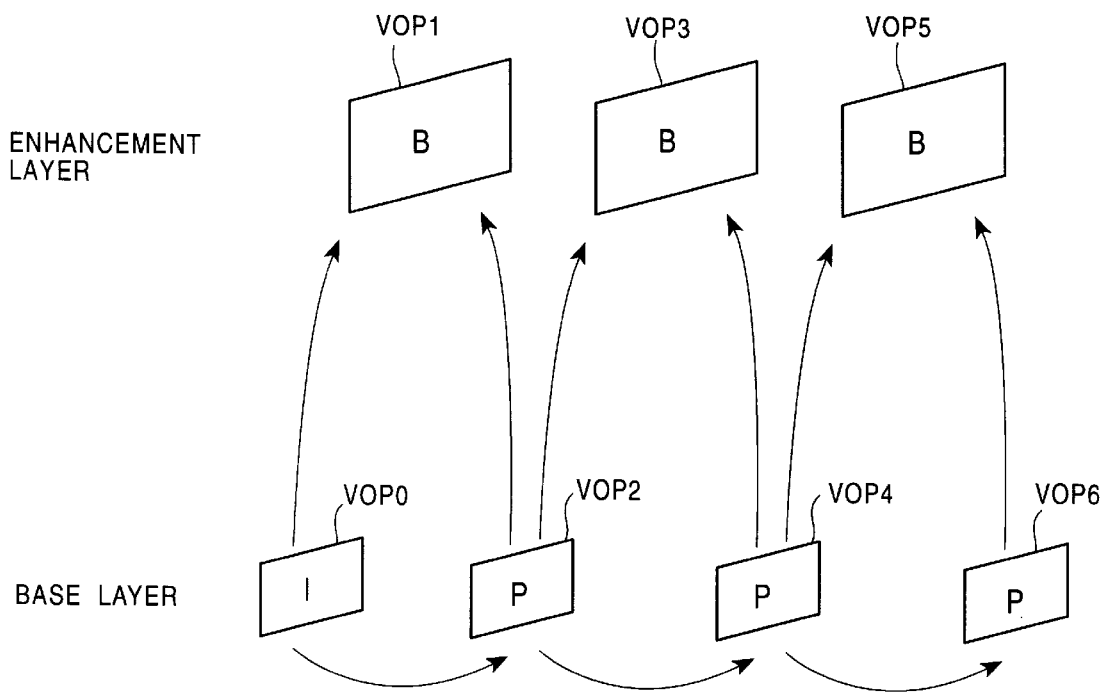
FIG. 2 is a schematic representation of a process performed on pictures in the enhancement layer and the base layer.

In the case of the temporal scalability (scalability along the time axis), the layered image signal generator 201 switches the output image signal between the base layer image and the enhancement layer image depending on the time. For example, as shown in FIG. 2, VOP0, VOP2, VOP4, and VOP6 are output in the base layer and VOP1, VOP3, and VOP5 are output in the enhancement layer. In the case of the temporal scalability, expansion/reduction of the image signal (conversion of resolution) is not performed.

In the case of the SNR (signal-to-noise ratio) scalability, the layered image signal generator 201 supplies the input image signal and key signal directly to the respective layers. That is, the same image signal and key signal are supplied to both base layer and enhancement layer.

In the case of the spatial scalability, the layered image signal generator 201 performs resolution conversion on the input image signal and key signal, and supplies the resultant image signal and key signal to the base layer. The resolution conversion is performed by means of reduction filtering process using for example a reduction filter. Alternatively, after the Layered image signal generator 201 performs resolution conversion on the input image signal and key signal, the resultant image signal and key signal may be supplied to the enhancement layer. In this case, the resolution conversion is performed by means of expansion filtering process. Still alternatively, two separately generated image signals and associated key signals (which may or may not be equal in resolution) may be output from the layered image signal generator 201 to the enhancement layer and the base layer, respectively. In this case, which images are supplied to which layers are determined in advance.

The scalable encoding method performed VO by VO will be described below. The size and/or position of the VO may or may not vary with time. The scalability can be performed in either of the following modes.

1. The enhancement layer includes the entire area of the base layer.

2. The enhancement layer corresponds to a partial area of the base layer.

In the case of mode 1, the entire area of the base layer is improved in the image quality by decoding the enhancement layer and the base layer. Herein, the improvement in the image quality refers to the improvement in the temporal resolution in the case of the temporal scalability. On the other hand, it refers to the improvement in the spatial resolution in the case of the spatial scalability.

In the case of mode 2, only the corresponding partial area of the base layer is improved in the image quality by decoding the enhancement layer and the base layer.

Figure 3:
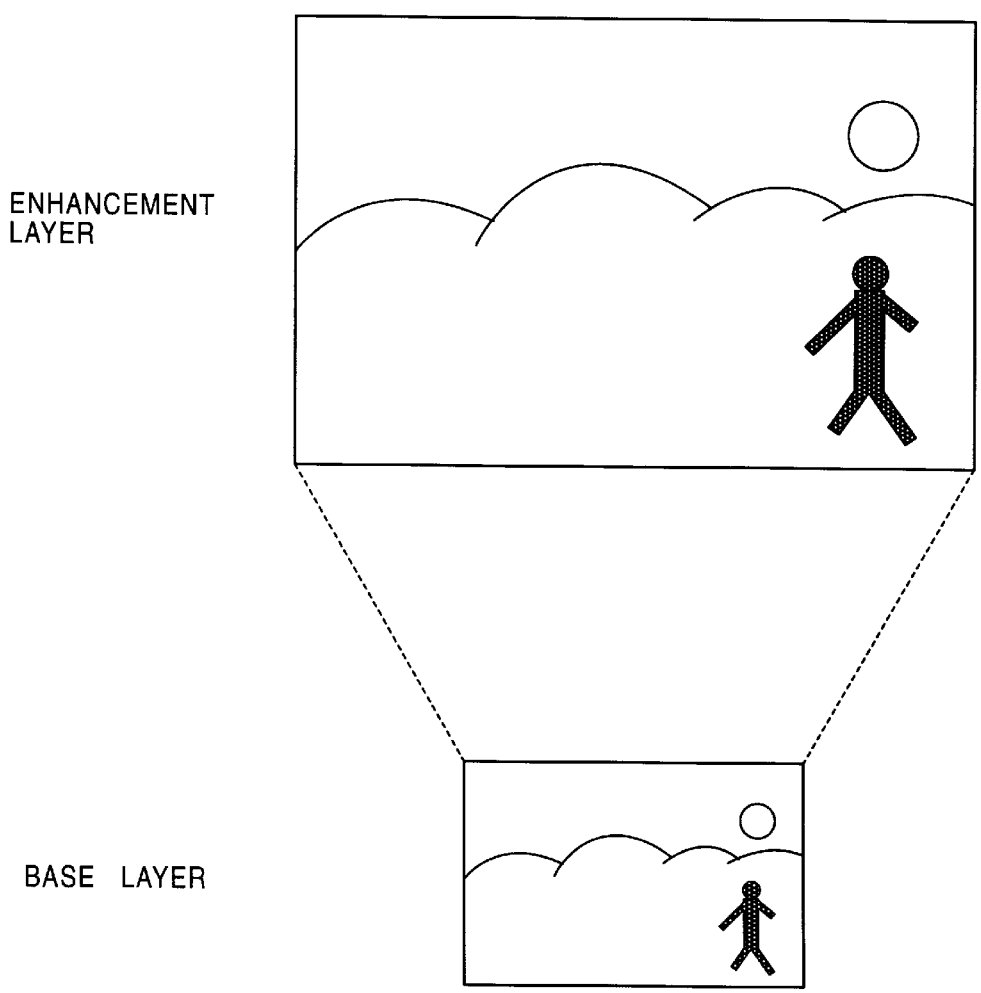
FIG. 3 is a schematic representation of the relationship between images in the enhancement layer and the base layer.
Figure 4:
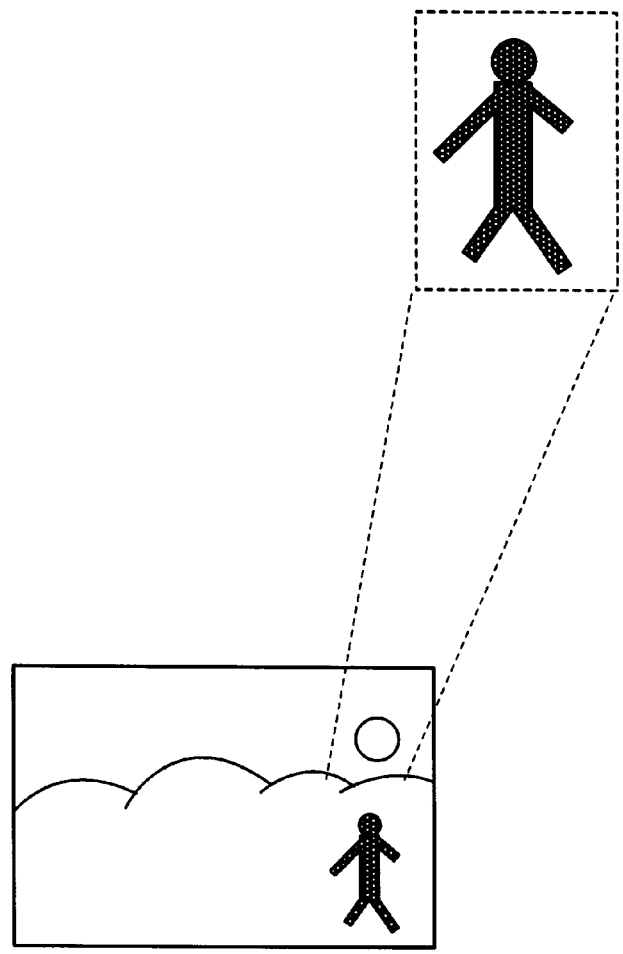
FIG. 4 is a schematic representation of the relationship between images in the enhancement layer and the base layer.

In both cases of modes 1 and 2, the VOP may have either a rectangular or arbitrary shape. FIG. 3 illustrates an example of spatial scalability in mode 1 for the case where the VOP has a rectangular shape. On the other hand, FIG. 4 illustrates an example of a spatial scalability in mode 2 for the case where the VOP has a rectangular shape.

Figure 5:
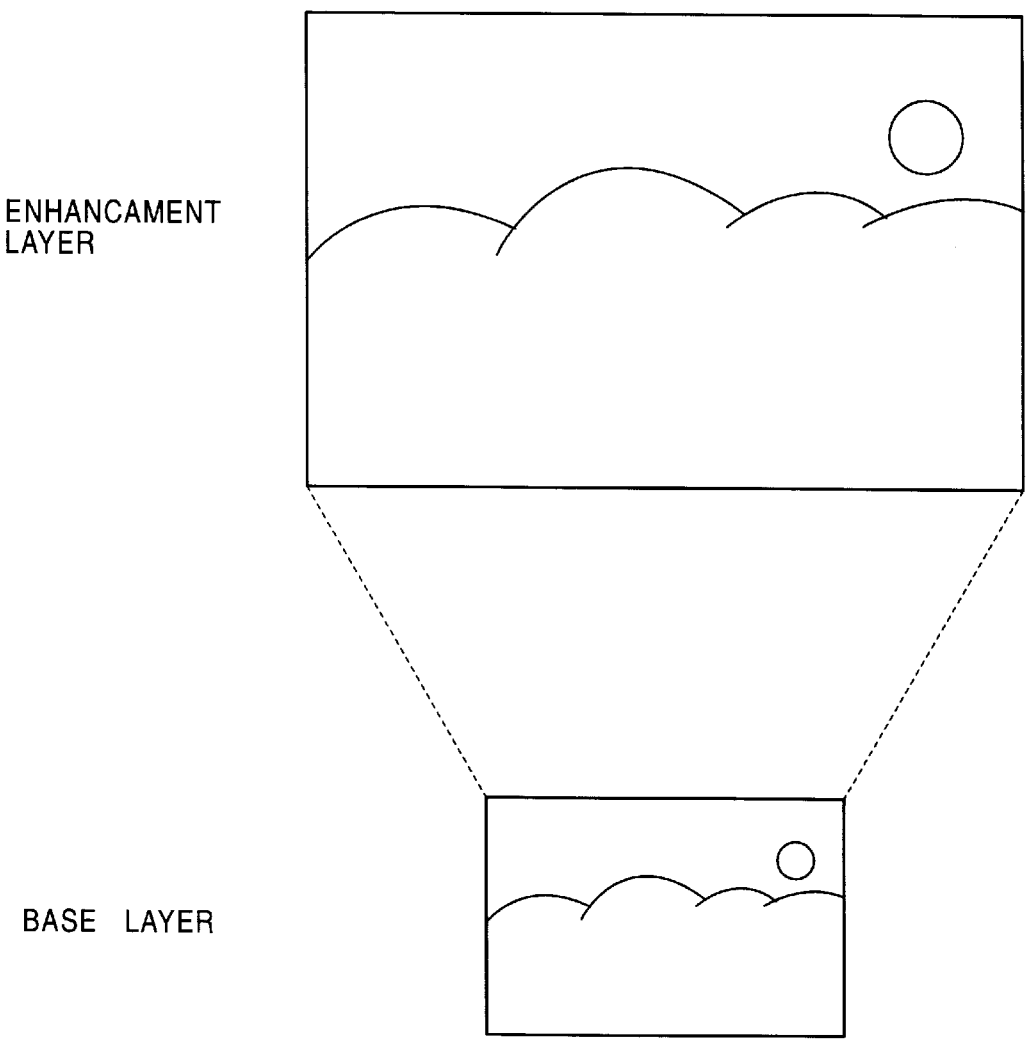
FIG. 5 is a schematic representation of the relationship between images in the enhancement layer and the base layer.
Figure 6:
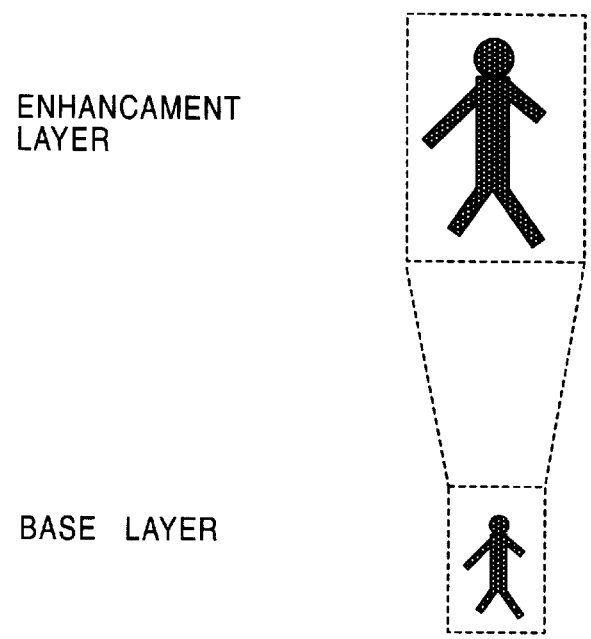
FIG. 6 is a schematic representation of the relationship between images in the enhancement layer and the base layer.
Figure 7:
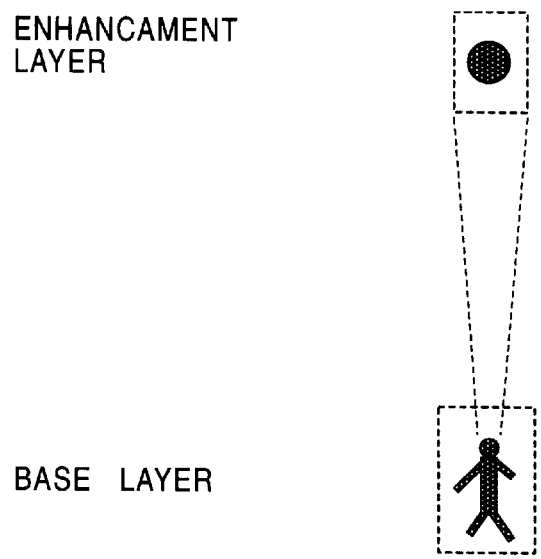
FIG. 7 is a schematic representation of the relationship between images in the enhancement layer and the base layer.

FIGS. 5 and 6 illustrate examples of spatial scalability in mode 1 for the case where the VOPs have an arbitrary shape. FIG. 7 illustrates an example of spatial scalability in mode 2 for the case where the VOP has an arbitrary shape.

The mode of scalability is determined in advance, and the layered image signal generator 201 sets the enhancement and base layers in accordance with the predetermined mode.

The layered image signal generator 201 also outputs flags indicating the sizes and absolute coordinate positions of VOPs in the respective layers. For example, in the case of the VOP encoder shown in FIG. 1, a flag FSZ_B indicating the size of the base layer VOP and a flag FPOS_B indicating the absolute coordinate position of the base layer VOP are output to the base layer encoder 204. On the other hand, a flag FSZ_E indicating the size of the enhancement layer VOP and a flag FPOS_E indicating the absolute coordinate position of the enhancement layer VOP are output to the enhancement layer encoder 203 via the delay circuit 202.

Furthermore, the layered image signal generator 201 outputs a flag FR indicating the ratio of the size of the enhancement layer VOP relative to the size of the base layer VOP to the resolution converter 205 and the enhancement layer encoder 203 via the delay circuit 202.

Figure 8:
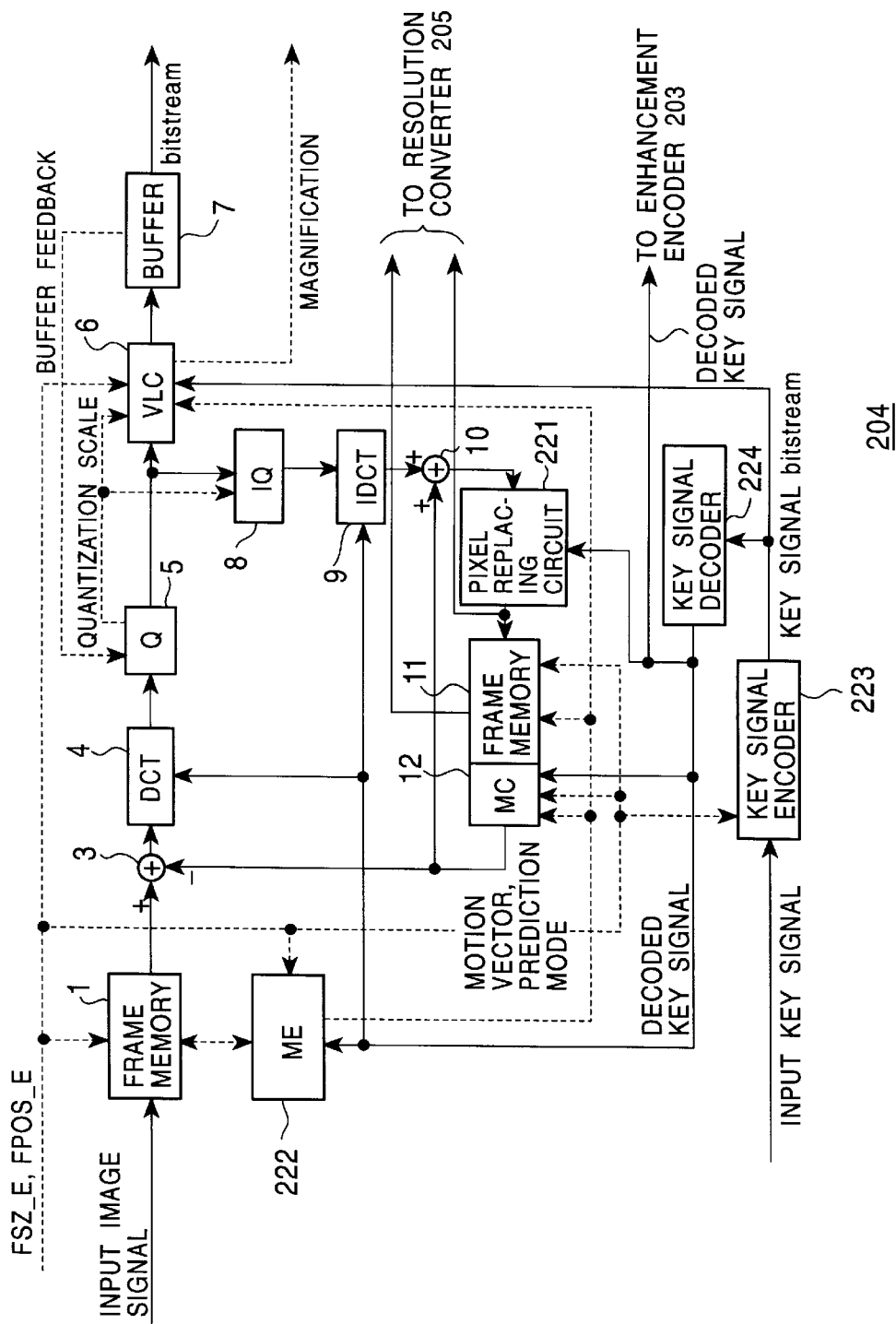
FIG. 8 is a block diagram illustrating an example of the construction of the base layer encoder 204 shown in FIG. 1.
Figure 44:
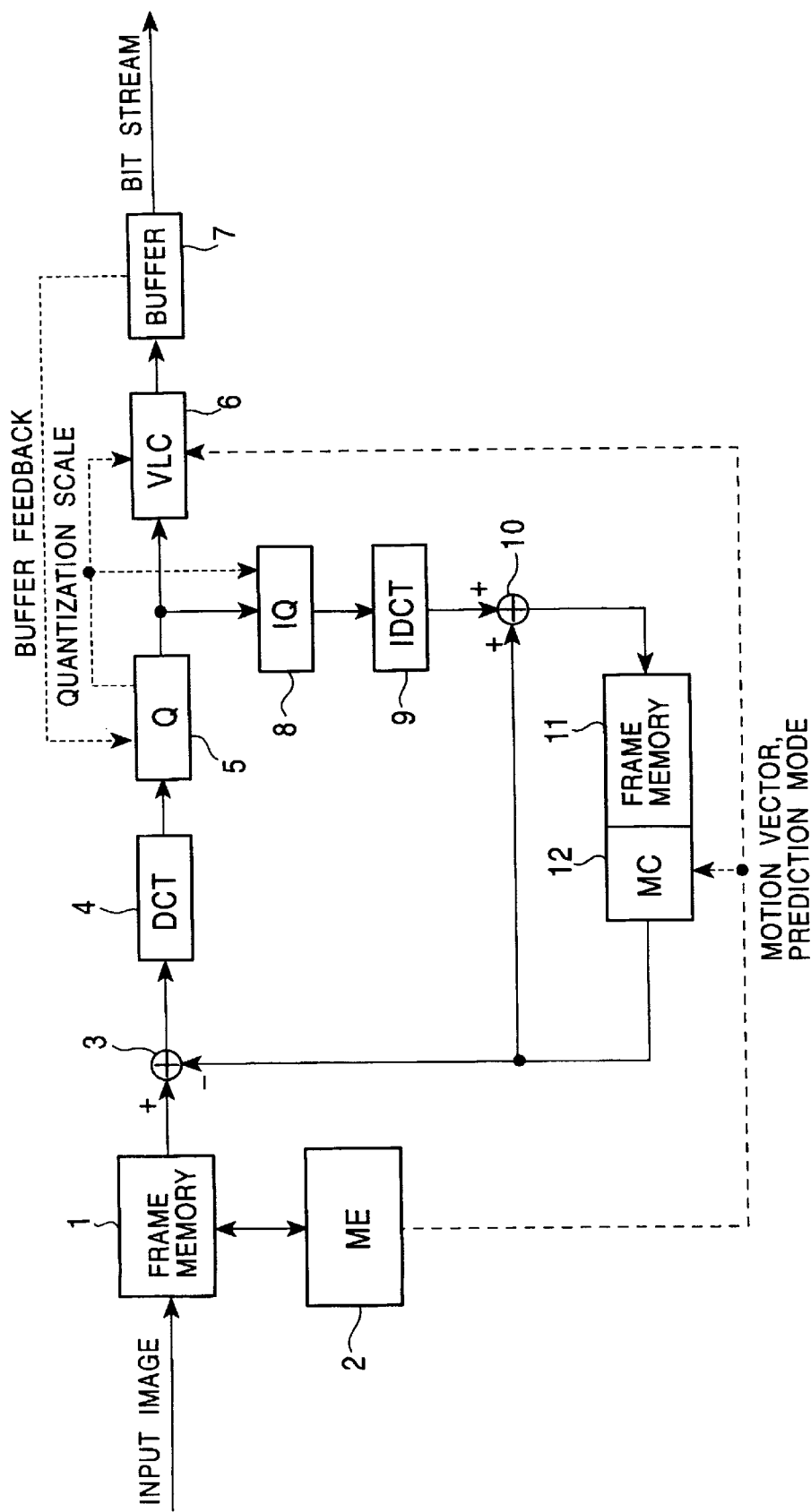
FIG. 44 is a block diagram illustrating an example of the construction of an image signal encoding apparatus.

Referring now to FIG. 8, the base layer encoder 204 will be described below. In FIG. 8, similar elements to those in FIG. 44 are denoted by similar reference numerals.

An input image signal is first supplied to a set of frame memories 1, and stored therein in the predetermined order. The set of frame memories 1 stores the image signal of the VOP, the flag FSZ_B indicating the size of the VOP, and the flag FPOS_B indicating the absolute coordinate position of the VOP. The set of frame memories 1 can store image signals and flags FSZ_B and FPOS_B for a plurality of VOPs. The image signal to be encoded is supplied macroblock by macroblock to a motion vector extraction circuit 222 and an arithmetic operation circuit 3.

The motion vector extraction circuit 222 processes the image data for each frame as an I-picture, a P-picture, or a B-picture according to a predetermined procedure. In the above procedure, the processing mode is predefined for each frame of an image sequence, and each frame is processed as either of an I-picture, a P-picture, or a B-picture corresponding to the predefined processing mode (for example frames are processes in the order of I, B, P, B, P, ... , B, P). Basically, I-pictures are subjected to intraframe encoding, and P-pictures and B-pictures are subjected to interframe prediction encoding, although the encoding mode for P-pictures and B-pictures is adaptively varied macroblock by macroblock in accordance with the prediction mode as will be described later.

The motion vector extraction circuit 222 extracts a motion vector with reference to a predetermined reference frame so as to perform motion compensation (interframe prediction). The motion compensation (interframe prediction) is performed in one of three modes: forward, backward, and forward-and-backward prediction modes. The prediction for a P-picture is performed only in the forward prediction mode, while the prediction for a B-picture is performed in one of the above-described three modes. The motion vector extraction circuit 222 selects a prediction mode which can lead to a minimum prediction error, and generates a predicted vector in the selected prediction mode.

The prediction error is compared for example with the dispersion of the given macroblock to be encoded. If the dispersion of the macroblock is smaller than the prediction error, prediction compensation encoding is not performed on that macroblock but, instead, intraframe encoding is performed. In this case, the prediction mode is referred to as an intraframe encoding mode. The motion vector extracted by the motion vector extraction circuit 222 and the information indicating the prediction mode employed are supplied to a variable-length encoder 6, a set of frame memories 11, and a motion compensation circuit 12.

The motion vector will be described below. Since VOPs are different in size and position from one another, it is required to define a reference coordinate system in which detected motion vectors are represented. An absolute coordinate system is assumed to be defined herein, and motion vectors are calculated using this coordinate system. That is, after placing a current VOP and a predicted reference VOP at proper positions in accordance with the flags indicating their size and positions, a motion vector is calculated. The details of the method of detecting motion vectors will be described later.

The motion compensation circuit 12 generates a predicted image signal on the basis of the motion vector, and supplies it to an arithmetic operation circuit 3. The arithmetic operation circuit 3 calculates the difference between the value of the given macroblock to be encoded and the value of the predicted image. The result is supplied as a difference image signal to a DCT circuit 4. In the case of an intramacroblock, the arithmetic operation circuit 3 directly transfers the value of the given macroblock to be encoded to the circuit 4 without performing any operation.

The DCT circuit 4 performs a DCT (discrete cosine transform) operation on the received image signal thereby converting it to DCT coefficients. The resultant DCT coefficients are supplied to a quantization circuit 5. The quantization circuit 5 quantizes the DCT coefficients in accordance with a quantization step corresponding to the amount of data stored in a transmission buffer 7. The quantized data is then supplied to the variable-length encoder 6.

The variable-length encoder I5 converts the quantized data supplied from the quantization circuit 5 into a variable-length code using for example the Huffman encoding technique, in accordance with the quantization step (scale) supplied from the quantization circuit 5. The obtained variable-length code is supplied to the transmission buffer 7.

The variable-length encoder 6 also receives the quantization step (scale) from the quantization circuit 5 and the motion vector as well as the information indicating the prediction mode (that is, the information indicating in which mode of the intraframe prediction mode, the forward prediction mode, the backward prediction mode, or forward-and-backward prediction mode the prediction has been performed) from the motion vector extraction circuit 222, and converts these received data into variable-length codes.

Furthermore, the variable-length encoder 6 receives the flag FSZ_B indicating the size of the base layer VOP and the flag FPOS_B indicating the position thereof in the absolute coordinates, and also encodes these flags. The variable-length encoder 6 interposes a key signal bit stream supplied from a key signal encoder 223 at a predetermined position in the data bit stream output from the quantization circuit 5. The resultant bit stream is supplied to the transmission buffer 7.

The key signal associated with the base layer VOP to be encoded is input to the key signal encoder 223. The key signal is encoded according to a predetermined encoding method such as DPCM, and a resultant key signal bit stream is supplied to the variable-length encoder 6 and the key signal decoder 224. The key signal decoder 224 decodes the received key signal bit stream, and supplies the result to a motion vector extraction circuit 222, the motion compensation circuit 12, the DCT circuit 4, the inverse DCT circuit 9, and an image replacement circuit 221. The decoded key signal is supplied to the base layer encoder 203 shown in FIG. 1.

The transmission buffer 7 stores the received data temporarily. The information representing the amount of data stored in the transmission buffer 7 is fed back to the quantization circuit 5. If the amount of residual data stored in the transmission buffer 7 reaches an upper allowable limit, the transmission buffer 7 generates a quantization control signal to the quantization circuit 5 so that the following quantization operation is performed using an increased quantization scale thereby decreasing the amount of quantized data. Conversely, if the amount of residual data decreases to a lower allowable limit, the transmission buffer 7 generates a quantization control signal to the quantization circuit 5 so that the following quantization operation is performed using a decreased quantization scale thereby increasing the amount of quantized data. In this way, an overflow or underflow in the transmission buffer 7 is prevented. The encoded data stored in the transmission buffer 7 is read out at a specified time and supplied to the multiplexer 206 shown in FIG. 1.

The quantized data output by the quantization circuit 5 is also supplied to an inverse quantization circuit 8. The inverse quantization circuit 8 performs inverse quantization on the received data in accordance with the quantization step given by the quantization circuit 5. The data (DCT coefficients) generated by the inverse quantization circuit 8 are supplied to an IDCT (inverse DCT) circuit 9 which in turn performs an inverse DCT operation on the received data. The resultant value is then added by the arithmetic operation circuit 10 with a predicted image value for each block according to the prediction mode. The resultant image signal is then supplied to a pixel replacement circuit 221 for use in generating a further predicted image. The image signal is subjected to a pixel replacement process in the pixel replacement circuit 221, and the resultant image signal is stored in a set of frame memories 11. In the case of an intramacroblock, the macroblock output from the IDCT circuit 9 is supplied to the set of frame memories 11 without being processed by the arithmetic operation circuit 10 and the pixel replacement circuit 221.

Figure 9:
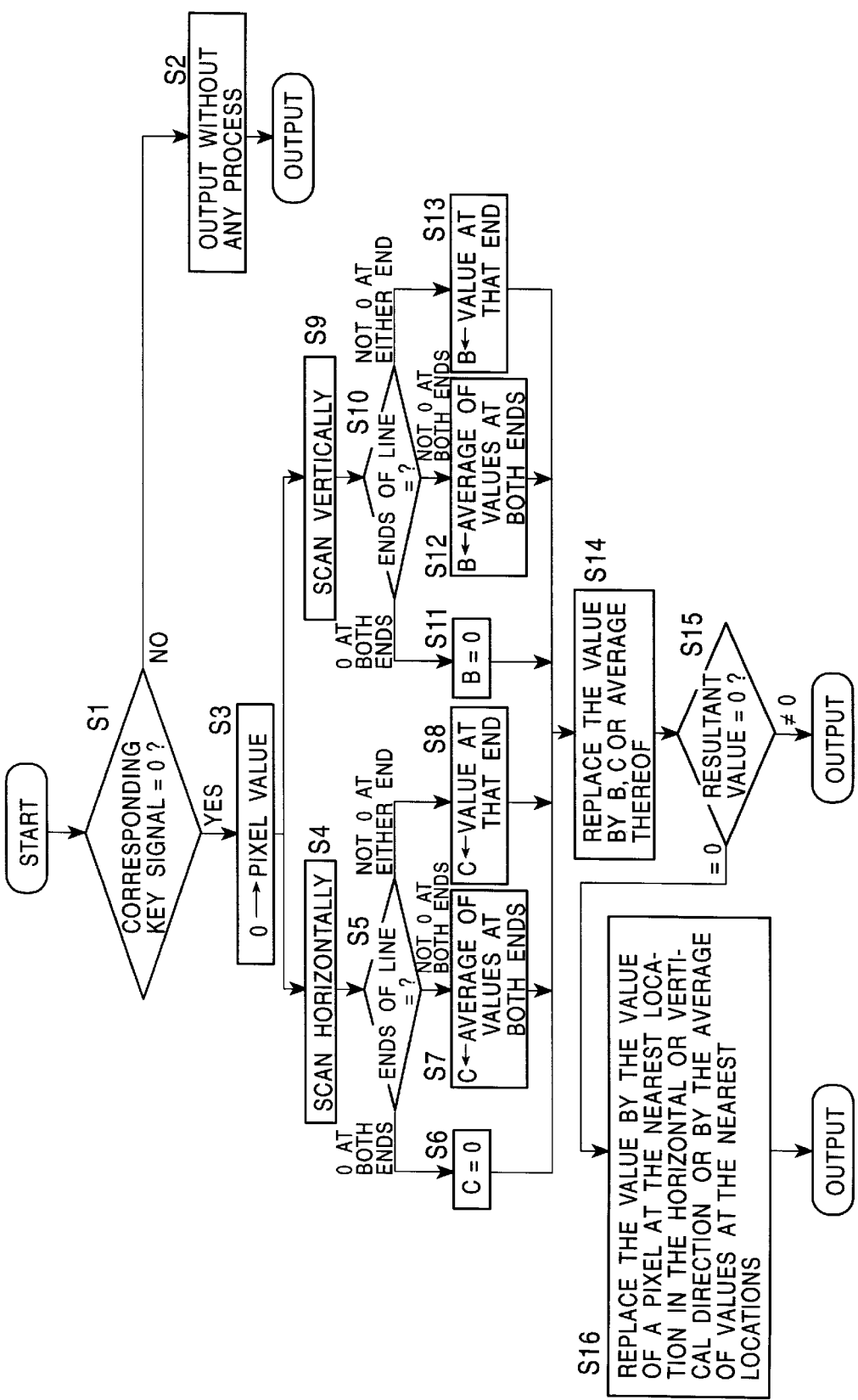
FIG. 9 is a flow chart illustrating the operation of the pixel replacement circuit 221 shown in FIG. 8.

Referring to the flow chart shown in FIG. 9, the process performed by the pixel replacement circuit 221 is described. If it is concluded in step S1 that the position of a pixel to be processed is within an image object, that is, the corresponding key signal has a value which is not equal to zero, then process goes to step S2 in which the pixel replacement circuit 221 directly outputs the pixel without performing any process on it. On the other hand, if the corresponding key signal is equal to 0, then the process goes to step S3, and 0 is substituted into that pixel.

In the case where the VOP has a rectangular shape, the key signal always has a value which is not equal to 0 (1 in the case of a binary key, 255 in the case of a gray scale key). Therefore, in this case, all pixels of the VOP are directly output without being subjected to any process.

Subsequent to step S3, a series of steps from S4 to S8 and a series of steps from S9 to S13 are performed in parallel. In step S4, the VOP under consideration is scanned in the horizontal direction. In this step, each horizontal line is divided into the following three types of line segments. Step S5 judges which of these three types the line segments are.

1. A line segment whose both ends are located on either end of the VOP.
2. A line segment whose one end is not equal to zero in pixel value.
3. A line segment whose both ends are not equal to zero in pixel value.

For such a line segment whose both ends are located on either end of the VOP (for example a line segment in a space in FIG. 10A), zero is substituted into the value C in step S6. In the case where the line segment has non-zero pixel values at its both ends, (for example a line segment located within a solid area in FIG. 10A and thus both ends of the line segment have a pixel value corresponding to black), the average of pixel values on both ends is substituted into the value C in step S7. In the case where only one of ends of the line segment has a non-zero pixel value (for example a horizontal line represented in FIG. 10A), that non-zero pixel value is substituted into the value C in step S8.

Figure 10A:
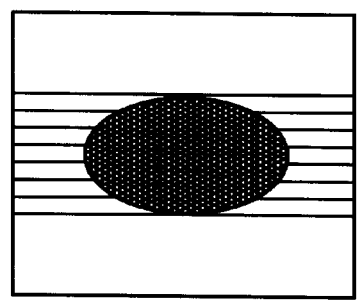
FIG. 10 is a schematic representation of the process shown in the flow chart of FIG. 9.

Thus, image processing is performed as shown in FIG. 10A.

Then in step S9, the VOP under consideration is scanned in the vertical direction., In this step, each vertical line is divided into the following three types of line segments. In the subsequent step S10, it is judged which of these three types the line segments are.

1. A line segment whose both ends are located on either end of the VOP.
2. A line segment whose one end is not equal to zero in pixel value.
3. A line segment whose both ends are not equal to zero in pixel value.

For such a line segment whose both ends are located on either end of the VOP, zero is substituted into the value B in step S11. In the case where the line segment has non-zero pixel values at its both ends, the average of pixel values on both ends is substituted into the value B in step S12. In the case where only one of ends of the line segment has a non-zero pixel value that non-zero pixel value is substituted into the value B in step S13.

Figure 10B:
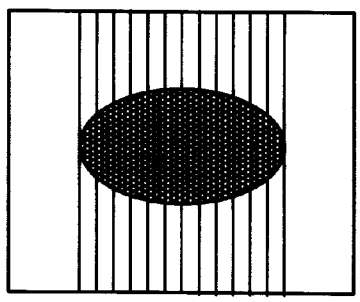

Thus the VOP is subjected to image processing as shown in FIG. 10B.

In step S14, if both values B and C are qual to 0, the pixel values are maintained at 0. On the other hand, if only the value B is not qual to zero, the pixel values are replaced by the value B. In the case where only the value C is not equal to zero, the pixel values are replaced by the value C. If both values B and C are not equal to zero, the pixel values are replaced by the average of these.

Figure 10C:
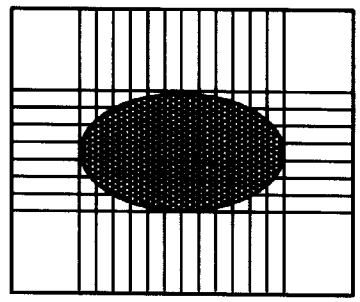

Thus, the VOP is subjected to image processing as shown in FIG. 10C.

In step S15, after completion of the above processing steps, it is judged whether pixel values are equal to zero or not. The pixel values which are not equal to zero are directly output. Those pixels having a value of zero are subjected to replacement in step S16 such that each pixel value is replaced by a non-zero value of a pixel located nearest, in the horizontal or vertical direction, to the pixel under consideration. In this replacement, if there are two non-zero pixels at the nearest positions, the pixel value is replaced by the average of these two non-zero pixel values.

Figure 10D:
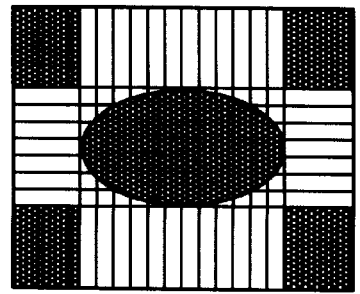

Thus, the VOP is subjected to image processing as shown in FIG. 10D.

After completion of the above replacement, the pixel replacement circuit 221 supplies the resultant image signal to the set of frame memories 11 and the resolution converter 205 shown in FIG. 1.

The set of frame memories 1 stores the image signal output from the pixel replacement circuit 221, the flag FSZ_B indicating the size of the VOP, and the flag FPOS_B indicating the absolute coordinate position of the VOP. The set of frame memories 11 also supplies a locally decoded image signal of the VOP to the enhancement layer encoder 203 via the resolution converter 205.

Now, the motion vector extraction circuit 222 is described. The motion vector extraction circuit 222 extracts a motion vector which results in a minimum prediction error for a macroblock to be encoded relative to a reference image signal which is supplied from the set of frame memories 11 depending on the prediction mode (I-, P-, B-pictures).

The motion vector extraction circuit 222 also receives a locally decoded key signal associated with the macroblock being processed from the key signal decoder 224. The motion vector extraction circuit 222 calculates a prediction error by referring to the corresponding key signal.

When the VOP to be encoded has an arbitrary shape, the macroblock to be encoded can have an area in which there is no image. In this case, those pixels in the non-image area in the macroblock to be encoded are neglected in the calculation of the prediction error. That is, the prediction error of the macroblock being processed is calculated using only pixels in areas in which there is an image, and the motion vector is determined so that it gives a minimum prediction error.

It is possible to judge whether each pixel of the macroblock to be encoded corresponds to an image or not by referring to the locally decoded key signal associated with the macroblock to be encoded. That is, if the key signal corresponding to a pixel is equal to 0, then there is no image corresponding to that pixel. This means that such the pixel is in an area outside an image object. On the other hand, if the key signal corresponding to a pixel has a value not equal to 0, then that pixel is in an area in which there is an image or an image object.

When the motion vector extraction circuit 222 refers to the key signal supplied from the key signal decoder 224, if the key signal is equal to 0, then the difference between the value of the pixel corresponding to the key signal and the reference image signal is not included in the calculation of the prediction error. When the VOP has a rectangular shape, the key signal always has a value not equal to 0 (1 in the case of a binary key, 255 in the case of a gray scale key), and thus all pixels of the macroblock are taken in the calculation of the prediction error.

Referring again to FIG. 1, the resolution converter 205 converts the resolution of the base layer image signal to the resolution corresponding to the enhancement image signal by means of filtering operation in accordance with the flag FR indicating the ratio of the size of the enhancement layer VOP to the size of the base layer VOP, and supplies the result to the enhancement layer encoder 203. When the magnification (size ratio) is equal to 1, that is, when the enhancement layer and the base layer are equal in the size, the resolution converter 205 directly outputs the received data without performing any process on it.

The enhancement layer image signal, the key signal, the flag FSZ_E indicating the size of the enhancement layer VOP, and the flag FPOS_E indicating the absolute coordinate position of the enhancement layer VOP, which are generated by the layered image signal generator 201, are supplied to the enhancement layer encoder 203 via a delay circuit 202. The delay circuit 202 makes the input signals delayed by a time required for the base layer encoder to encode the corresponding base layer VOP.

Figure 11:
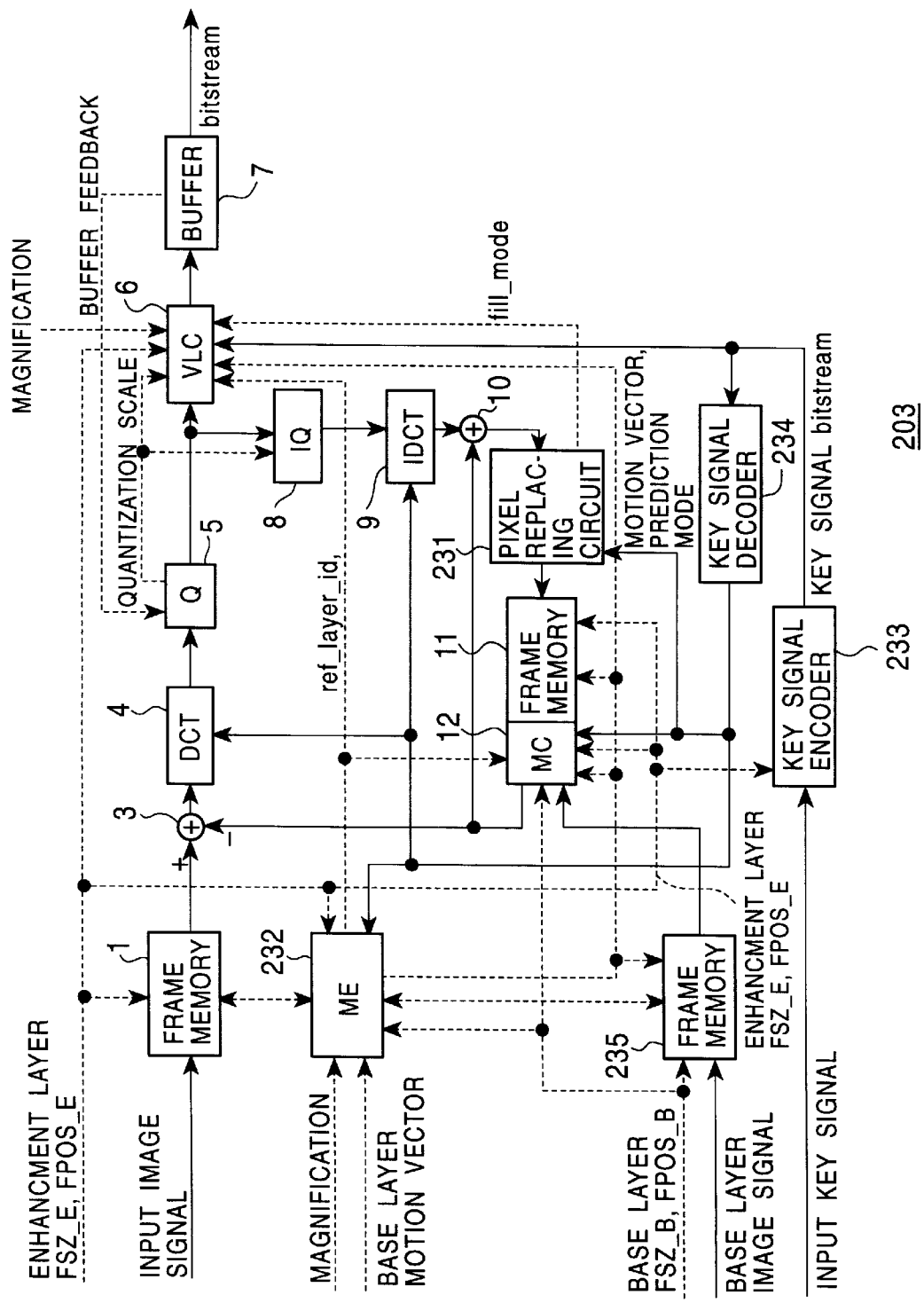
FIG. 11 is a block diagram illustrating an example of the construction of the enhancement layer encoder 203 shown in FIG. 1.

Referring now to FIG. 11, the enhancement layer encoder 203 is described. In FIG. 11, similar elements to those in FIG. 44 are denoted by similar reference numerals.

An input image signal is supplied to a set of frame memories 1, and stored therein in the predetermined order. The set of frame memories 1 stores the image signal of the VOP, the flag FSZ_E indicating the size of the VOP, and the flag FPOS_E indicating the absolute coordinate position of the VOP.

The image signal to be encoded is input macroblock by macroblock to a motion vector extraction circuit 232. The motion vector extraction circuit 232 processes the image data for each frame as an I-picture, a P-picture, or a B-picture according to a predetermined procedure. In this procedure, the processing mode is predefined for each frame of the image sequence, and each frame is processed as an I-picture, a P-picture, or a B-picture corresponding to the predefined processing mode (for example frames are processes in the order of I, B, P, B, P, . . . , B, P). Basically, I-pictures are subjected to intraframe encoding, and P-pictures and B-pictures are subjected to interframe prediction encoding, although the encoding mode for P-pictures and B-pictures is adaptively varied macroblock by macroblock in accordance with the prediction mode as will be described later.

Figure 12:
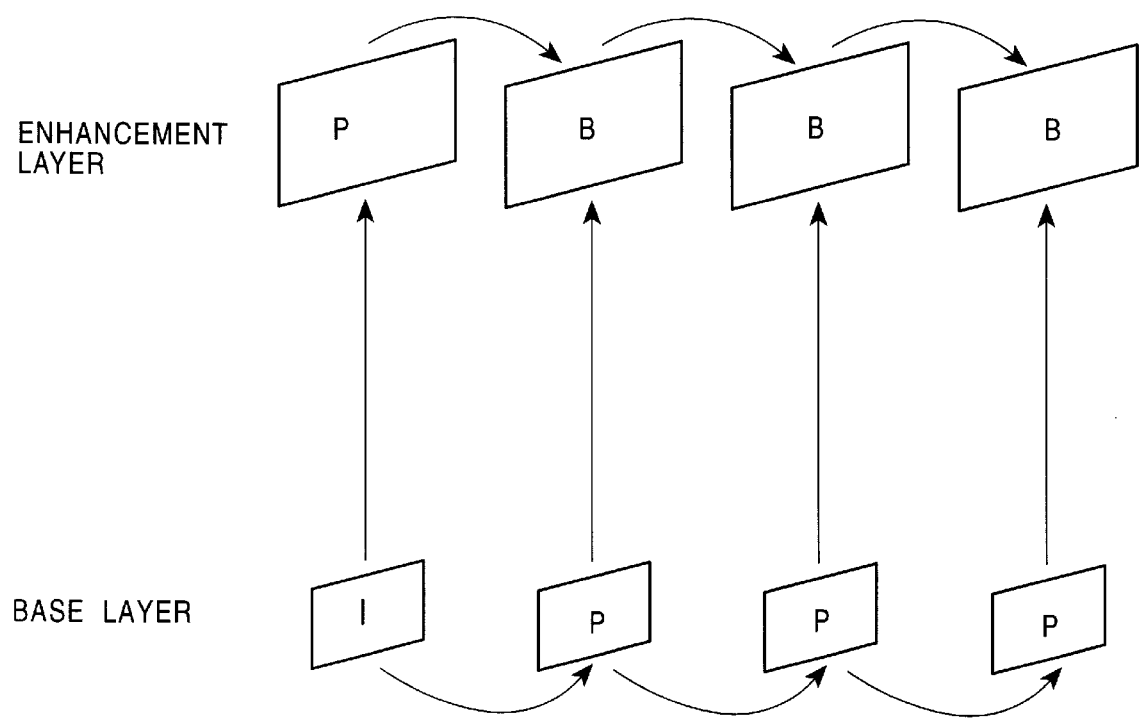
FIG. 12 is a schematic representation of a process performed on pictures in the enhancement layer and the base layer.

In the case of the spatially scalable encoding, the encoding is performed for example as shown in FIG. 12. A first VOP in the enhancement layer is encoded as a P-picture. In this case, a VOP in the base layer which is equal in time to the first VOP in the enhancement layer is employed as a reference image. A second and subsequent VOPs in the enhancement layer are encoded as a B-picture. In the encoding of these VOPs, the image in the base layer which is equal in time to the immediately preceding VOP in the enhancement layer is employed as a reference image. As in the case of P-pictures in the base layer, B-pictures in the enhancement layer are employed as prediction reference images when other VOPs are encoded.

The SNR scalability is a special case of the spatial scalability in which the enhancement layer and the base layer are equal in size to each other.

In the temporal scalability, encoding is performed for example as shown in FIG. 2. A VOP1 is encoded as a B-picture wherein a VOP0 and VOP2 in the base layer are used as prediction reference images. A VOP3 is encoded as a B-picture wherein a VOP2 in the base layer immediately preceding the VOP3 and also a VOP4 in the base layer immediately after the VOP3 are employed as reference images. Similarly, a VOP5 is encoded as a B-picture wherein a VOP4 in the base layer immediately preceding the VOP5 and also a VOP6 in the base layer immediately after the VOP5 are employed as reference images.

The process of predicting P- and B-pictures in the enhancement layer is described below. In the prediction in the enhancement layer, not only an image in the same layer but also an image in other layers (scalable layers) may be employed as a reference image. For example in the case of a two-layer scalability, prediction of images in a higher layer (enhancement layer) may be performed using images in a lower layer (base layer). For each scalable layer, a flag ref_layer_id is set to indicate which layer other than the same layer is employed as a reference image, and the flag ref_layer_id is encoded and transmitted. Furthermore, a flag ref_select_code is set to indicate from which layer forward prediction and backward prediction are performed in accordance with the flag ref_layer_id, and this flag ref_select_code is also encoded and transmitted. Table 1 shows a flag ref_select_code for a P-picture, and Table 2 shows a flag ref_select_code for a B-picture. The syntax associated with these flags will be described later.

TABLE 1

| ref_select_code | forward prediction reference |
| --- | --- |
| 00 | finally decoded VOP in the same layer |
| 01 | finally displayed VOP in the reference layer |
| 10 | VOP in the reference layer to be displayed next |
| 11 | VOP in the reference layer equal in time (motion vector is not transmitted) |

TABLE 2

| ref_select_code | forward temporal reference | backward temporal reference |
|---|---|---|
| 00 | finally decoded VOP in the same layer | VOP in the reference layer equal in time (motion vector is not transmitted) |
| 01 | finally decode VOP in the same layer | finally displayed VOP in the reference layer |
| 10 | finally decoded VOP in the same layer | VOP in the reference layer to be displayed next |
| 11 | finally displayed VOP in the reference layer | VOP in the reference layer to be displayed next |

The method of prediction in the enhancement and base layers is not limited to those shown in FIGS. 2 and 12, but the prediction may be performed in various manners as long as the requirements shown in Tables 1 and 2 are satisfied. In the syntax shown in Tables 1 and 2, there is no explicit designation about the spatial or temporal scalability.

In the case of a P-picture, when ref_select_code is '11', VOP equal in time in the layer (reference layer) indicated by ref_layer_id is employed as a prediction reference image. This mode is also used in the spatial scalability and the SNR scalability. The other modes '00', '01', and '10' are used in the temporal scalability.

In the case of a B-picture, when ref_select_code is '00', a VOP equal in time in the layer indicated by ref_layer_id and an immediately preceding decoded VOP in the same layer are used as prediction reference images. This mode is used in the spatial scalability and the SNR scalability. The other modes '01', '10', and '11' are used in the temporal scalability.

Which of I-, P-, and B-picture is employed in the process of encoding each VOP in each layer is determined in advance. The motion vector extraction circuit 232 sets the flags ref_layer id and ref_select code according to the predefined picture type, and supplies these flags to the motion compensation circuit 12 and the variable-length encoder 6.

The decoded image signal and key signal in the base layer are supplied to the enhancement layer encoder 203 via the resolution converter 205, and stored in the set of frame memories 235 therein. The decoded image signal supplied herein to the resolution converter 205 has been subjected to the pixel replacement process in the pixel replacement circuit 221 shown in FIG. 8.

The flag FSZ_B indicating the size of the base layer VOP and the flag FPOS_B indicating the absolute coordinate position thereof are stored in the set of frame memories 235 and also supplied to the motion vector extraction circuit 232 and the motion compensation circuit 12.

The motion vector extraction circuit 232 refers to a predetermined proper reference frame stored in the set of frame memories 1 or 235, and performs motion compensation (interframe prediction) thereby extracting a motion vector. The motion compensation (interframe prediction) is performed in one of three modes: forward, backward, and forward-and-backward prediction modes. The prediction for a P-picture is performed only in the forward prediction mode, while the prediction for a B-picture is performed in one of the above-described three modes. The motion vector extraction circuit 232 selects a prediction mode which leads to a minimum prediction error, and outputs a motion vector and the prediction mode.

The prediction error is compared for example with the dispersion of the given macroblock to be encoded. If the dispersion of the macroblock is smaller than the prediction error, prediction compensation encoding is not performed on that macroblock but, instead, intraframe encoding is performed. In this case, the prediction mode is referred to as the intraframe encoding mode. The motion vector and the information about the prediction mode are supplied to the variable-length encoder 6 and the motion compensation circuit 12.

The motion vector extraction circuit 232 in the enhancement layer encoder 203, as in the case of the motion vector extraction circuit 222 in the base layer, receives the locally decoded key signal associated with the macroblock to be encoded wherein the key signal is locally decoded by the key signal decoder 234. In this case, the key signal decoder 234 outputs a decoded enhancement layer key signal. In the calculation of the prediction error, the motion vector extraction circuit 232, as in the case of the motion vector extraction circuit in the base layer, neglects the difference values between pixel values of the predicted image and pixel values whose associated key signal is equal to 0. That is, the prediction error is calculated using only those pixels which are located within an image object and whose associated key signal has a value not equal to 0, and a motion vector which gives a minimum prediction error is detected.

The motion vector extraction circuit 232 also receives a flag FR indicating the ratio of the size (resolution) of the enhancement layer to the size of the base layer. As can be seen from Table, 2, in the case of a B-picture (VOP), if ref_selecct_code='00', the encoding is performed in the spatially scalable mode. In this case, backward prediction is performed by referring to a VOP equal in time in the base layer (reference layer), and forward prediction is performed by referring to an immediately preceding decoded VOP in the same layer. If the magnification flag is equal to 1 (the base layer and the enhancement layer are equal in resolution to each other), and if ref_select_code='00', the encoding is performed in the SNR scalable mode which is a special case of the spatial scalability. In this case, backward prediction in the enhancement layer is performed using a motion vector used in the prediction of a VOP equal in time in the base layer in the same prediction mode. Therefore, in this case, the motion vector extraction circuit 232 directly supplies to the motion compensation circuit 12 the motion vector and the information about the prediction mode supplied from the base layer. Thus, in this case, the variable-length encoder 6 does not perform encoding on the motion vector.

According to the motion vector, the motion compensation circuit 12 generates a predicted image signal from the image signal stored in the set of frame memories 11 or 235, and supplies the resultant signal to the arithmetic operation circuit 3. The arithmetic operation circuit 3 calculates a difference between the value of the macroblock to be encoded and the value of the predicted image signal, and supplies the resultant difference image signal to the DCT circuit 4. In the case of an intramacroblock, the arithmetic operation circuit 3 directly transfers the value of the given macroblock to be encoded to the circuit 4 without performing any operation.

The DCT circuit 4 performs a DCT (discrete cosine transform) operation on the received image signal thereby converting it to DCT coefficients. The DCT coefficients are input to the quantization circuit 5 and quantized according to a quantization step corresponding to the amount of data stored in the transmission buffer 7. The resultant quantized data is supplied to the variable-length encoder 6.

The variable-length encoder 6 converts the quantized data supplied from the quantization circuit 5 into a variable-length code using for example the Huffman encoding technique, in accordance with the quantization step (scale) supplied from the quantization circuit 5. The obtained variable-length code is supplied to the transmission buffer 7.

The variable-length encoder 6 also receives the quantization step (scale) from the quantization circuit 5 and the motion vector as well as the information indicating the prediction mode (that is, the information indicating in which mode of the intraframe prediction mode, the forward prediction mode, the backward prediction mode, or forward-and-backward prediction mode the prediction has been performed) from the motion vector extraction circuit 232, and converts these received data into variable-length codes.

The variable-length encoder also encodes the flag FSZ_E indicating the size of the enhancement layer VOP, the flag FPOS_E indicating the absolute coordinate position thereof, and the flag FR indicating the ratio of the resolution of the enhancement layer to the resolution of the base layer. The variable-length encoder 6 interposes a key signal bit stream at a predetermined position in the encoded image signal bit stream, and supplies the resultant bit stream to the transmission buffer 7.

The key signal of the enhancement layer VOP to be encoded is input to the key signal encoder 233. The key signal is encoded according to a predetermined encoding method such as DPCM, and the resultant key signal bit stream is supplied to the variable-length encoder 6 and the key signal decoder 234. The key signal bit stream is decoded by the key signal decoder :234, and the resultant signal is supplied to the motion vector extraction circuit 232 and the motion compensation circuit 12.

The transmission buffer 7 stores the received data temporarily. The information representing the amount of data stored in the transmission buffer 7 is fed back to the quantization circuit 5. If the amount of residual data stored in the transmission buffer 7 reaches an upper allowable limit, the transmission buffer 7 generates a quantization control signal to the quantization circuit 5 so that the following quantization operation is performed using an increased quantization scale thereby decreasing the amount of quantized data. Conversely, if the amount of residual data decreases to a lower allowable limit, the transmission buffer 7 generates a quantization control signal to the quantization circuit 5 so that the following quantization operation is performed using a decreased quantization scale thereby increasing the amount of quantized data. In this way, an overflow or underflow in the transmission buffer 7 is prevented.

The data stored in the transmission buffer 7 is read out at a specified time and multiplexed by the multiplexer 206 shown in FIG. 1 with the base layer bit stream. The multiplexed signal is then supplied to the multiplexer 104 shown in FIG. 51.

The quantized data output from the quantization circuit 5 is input to the inverse quantization circuit 8 and subjected to an inverse quantization process in accordance with the quantization step supplied from the quantization circuit 5. The data (dequantized DCT coefficients) output from the inverse quantization circuit 8 is input to the IDCT (inverse DCT) circuit 9 and is subjected to an inverse DCT process therein. The resultant value is then added together by the arithmetic operation circuit 10 with a predicted image value for each block according to the prediction mode. The resultant image signal is then supplied to the pixel replacement circuit 231 for use in generating a further predicted image. The image signal is subjected to a pixel replacement process in the pixel replacement circuit 231, and the resultant image signal is stored in the set of frame memories 11. In the case of an intramacroblock, the arithmetic operation circuit 10 directly transfers the macroblock output by the IDCT circuit 9 to the pixel replacement circuit 231 without performing any operation.

The pixel replacement circuit 231 of the enhancement layer encoder 203 is described in further detail below. As described earlier with reference to FIG. 9, the pixel replacement circuit 221 in the base layer replaces the values of pixels in a non-image area outside an image object with the values of pixels located at periphery of an area in which there is an image.

In contrast, the pixel replacement circuit 231 in the enhancement layer performs not only a similar replacement process to that performed by the pixel replacement circuit 221 in the base layer but also a pixel replacement process using a decoded base layer reference image output from the set of frame memories 235.

The scalable encoding method performed VO by VO will be described below. The size and/or position of the VO may vary with time or may be constant. The scalability can be performed in either of the following modes.

That is, as described earlier, the scalable encoding for each VO is performed in different ways depending on the type of VO as described below.

1. The enhancement layer includes the entire area of the base layer.

2. The enhancement layer corresponds to a partial area of the base layer.

In the type 2, the base layer has information about an area which is not included in the enhancement layer. In particular, in the spatial scalability, the enhancement layer and the base layer are equal in time and thus it is possible to use a base layer reference image converted in resolution.

Figure 13:
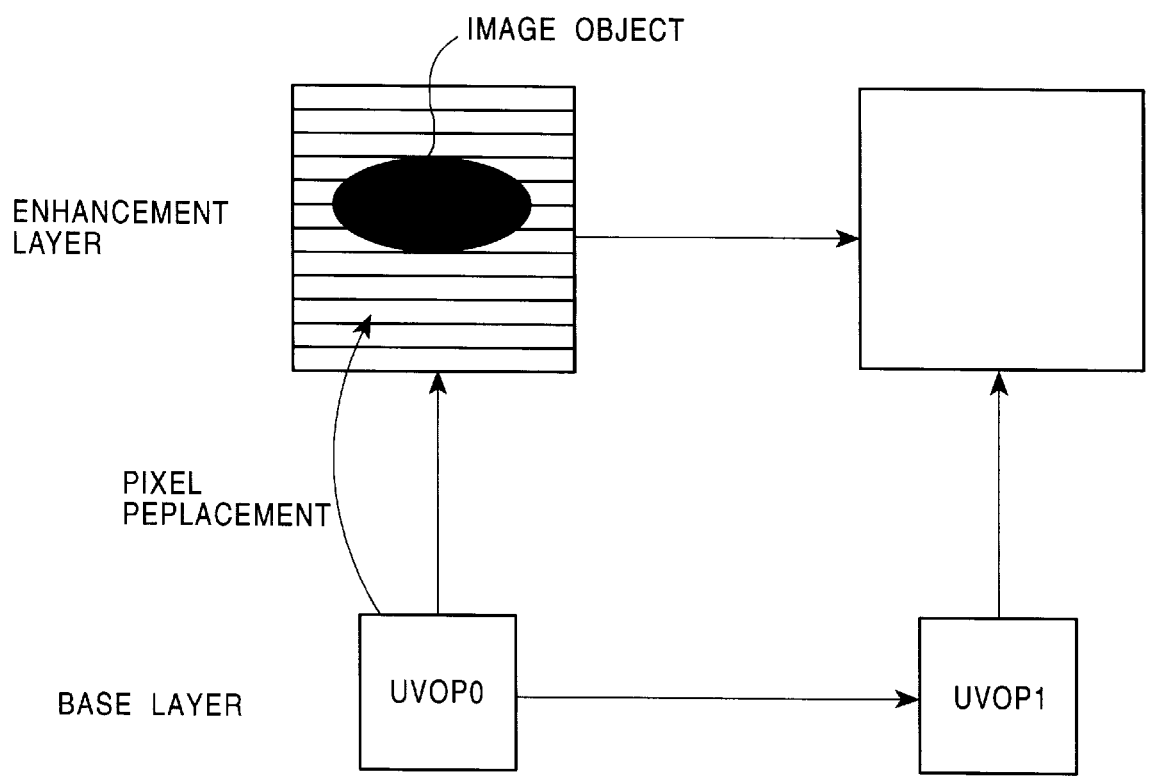
FIG. 13 is a schematic representation of a pixel replacement process.

FIG. 13 illustrates an example of pixel replacement process performed by the pixel replacement circuit 231 in the enhancement layer. In an area containing an image in which corresponding key signals have a value not equal to 0 (for example the image object area in FIG. 13), the image in the enhancement layer is directly employed. In the other area (the area in which horizontal lines are drawn in FIG. 13), the reference image is obtained by replacing pixel values in the enhancement layer with pixel values of the base layer image which has been converted in resolution (subjected to an up-sampling process) at locations corresponding to the locations of the reference image (UVOP0 in FIG. 13).

Figure 14:
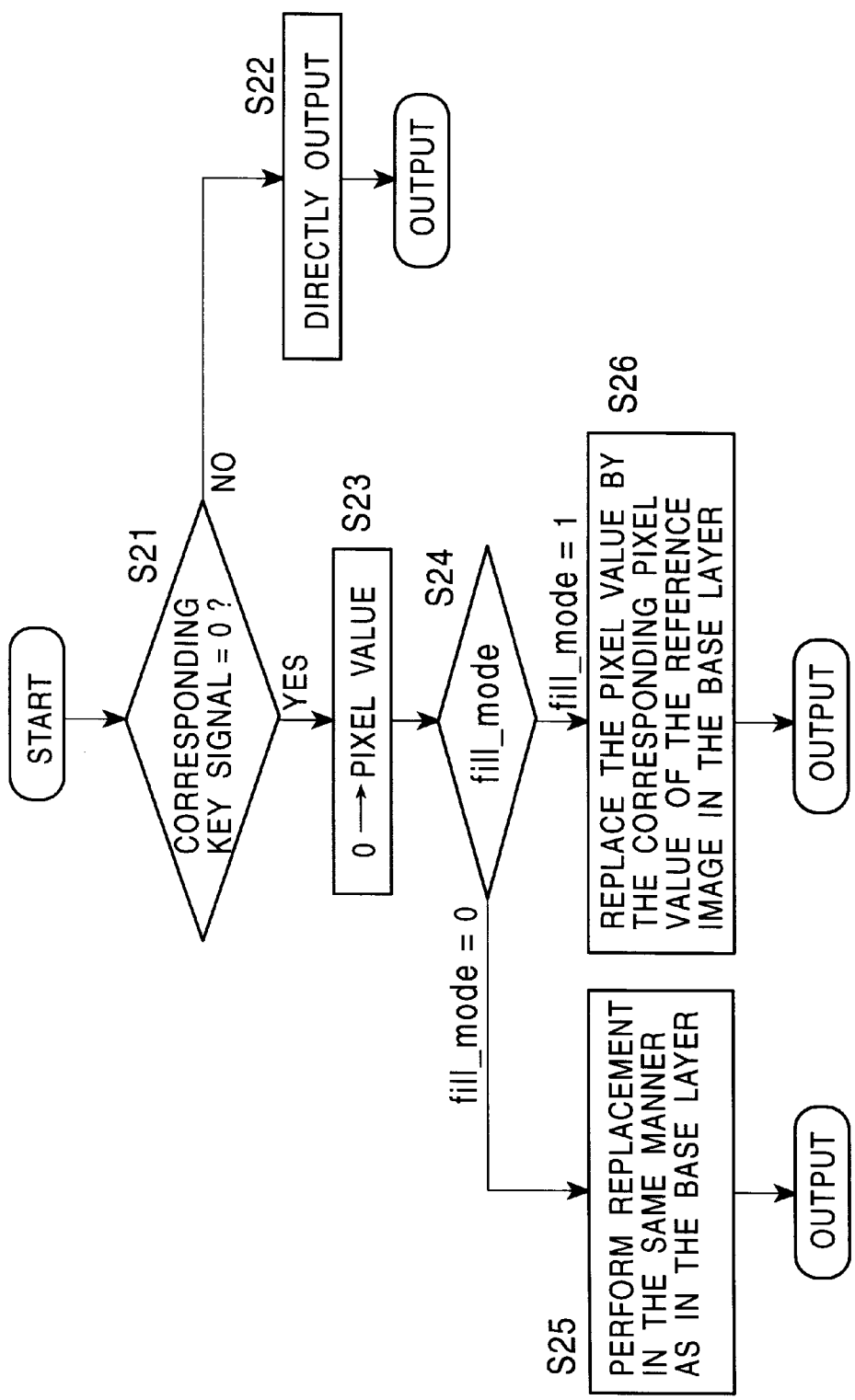
FIG. 14 is a flow chart illustrating the process performed by the pixel replacement circuit 231 shown in FIG. 11.

FIG. 14 is a flow chart illustrating the process performed by the pixel replacement circuit 231. If it is concluded in step S21 that the pixel is within an image object, that is, the corresponding key signal has a value not equal to zero, then the process goes to step S22 in which the image replacement circuit 231 directly outputs the pixel value without performing any process on that pixel. When the corresponding key signal is equal to 0, the process goes to step S23, and 0 is substituted into that pixel. In the case where the VOP has a rectangular shape, the key signal always has a value which is not equal to 0 (1 in the case of a binary key, 255 in the case of a gray scale key). Therefore, in this case, all pixels of the VOP are directly output without being subjected to any process.

The replacement mode is then determined in step S24, a replacement process is performed according to that replacement mode. The replacement mode is described in further detail below. The replacement in the enhancement layer is performed in either of two modes. In a first mode, the replacement is performed in the same manner as in the replacement performed in the base layer. In the other mode, pixel values in the enhancement layer are replaced with values of pixels of a reference image in the base layer at corresponding locations. The latter mode is employed when the enhancement layer corresponds to a partial area of te base layer, and the encoding is performed in a spatially scalable manner. The scalability mode and the replacement mode are both determined in advance. A one-bit flag fill_mode indicating the replacement mode is supplied from the pixel replacement circuit 231 to the variable-length encoder 6. The flag fill_mode is encoded by the variable-length encoder 6 and transmitted.

If it is concluded that the flag fill_mode indicating the replacement mode has a value equal to 0, then the process goes to step S25 in which the pixel replacement circuit 231 performs replacement in the same manner as that (FIG. 9) performed by the pixel replacement circuit 221 (FIG. 8) in the base layer. The resultant image signal is output to the set of frame memories 11.

In the case where the flag fill-mode indicating the replacement mode has a value equal to 1, the process goes to step S26 in which the pixel replacement circuit 231 replaces the pixel values in the enhancement layer with the pixel value of the base layer reference image signal at corresponding locations. This replacement method is described in further detail below with reference to FIGS. 15 and 16.

Figure 15:
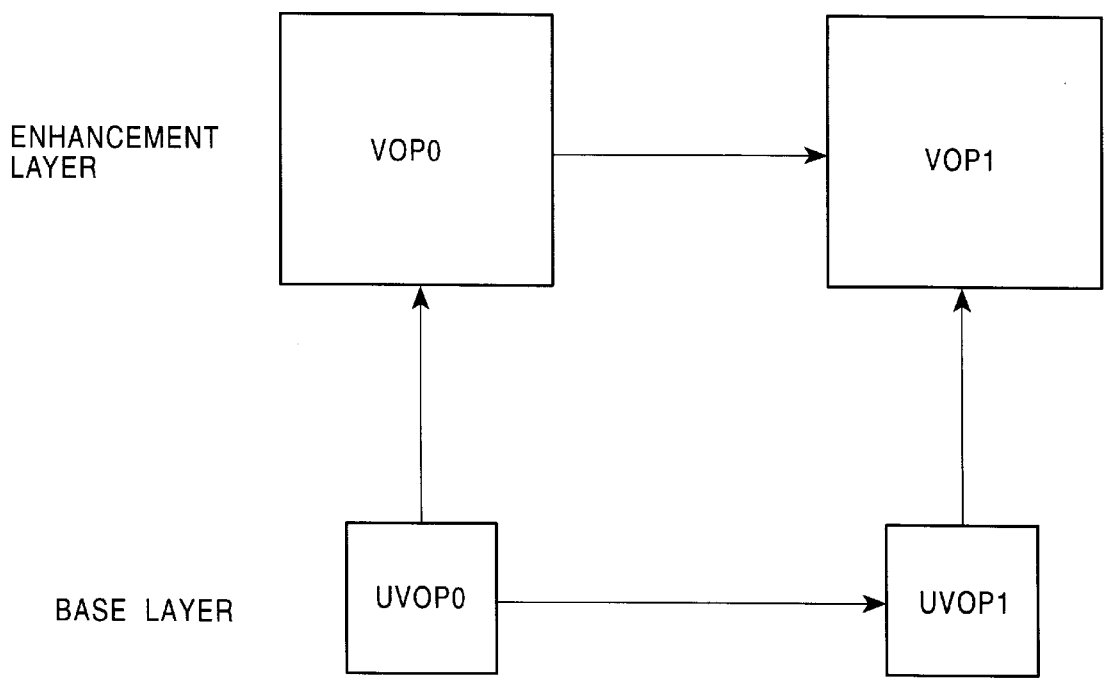
FIG. 15 is a schematic representation of a pixel replacement process.

In an example shown in FIG. 15, as in the example shown in FIG. 13, when an image VOP1 in the enhancement layer is encoded, an immediately preceding image VOP0 in the enhancement layer and a base layer image UVOP1 equal in time which has been converted in resolution (expanded in size or up-sampled) are used as reference images. In this case, the pixel replacement circuit 231 replaces the pixel values in an area other than an image object in the image VOP0 with the values of pixels, at corresponding locations, of the image UVOP0 in the base layer equal in time which has been converted in resolution (expanded in size or up-sampled).

Figure 16:
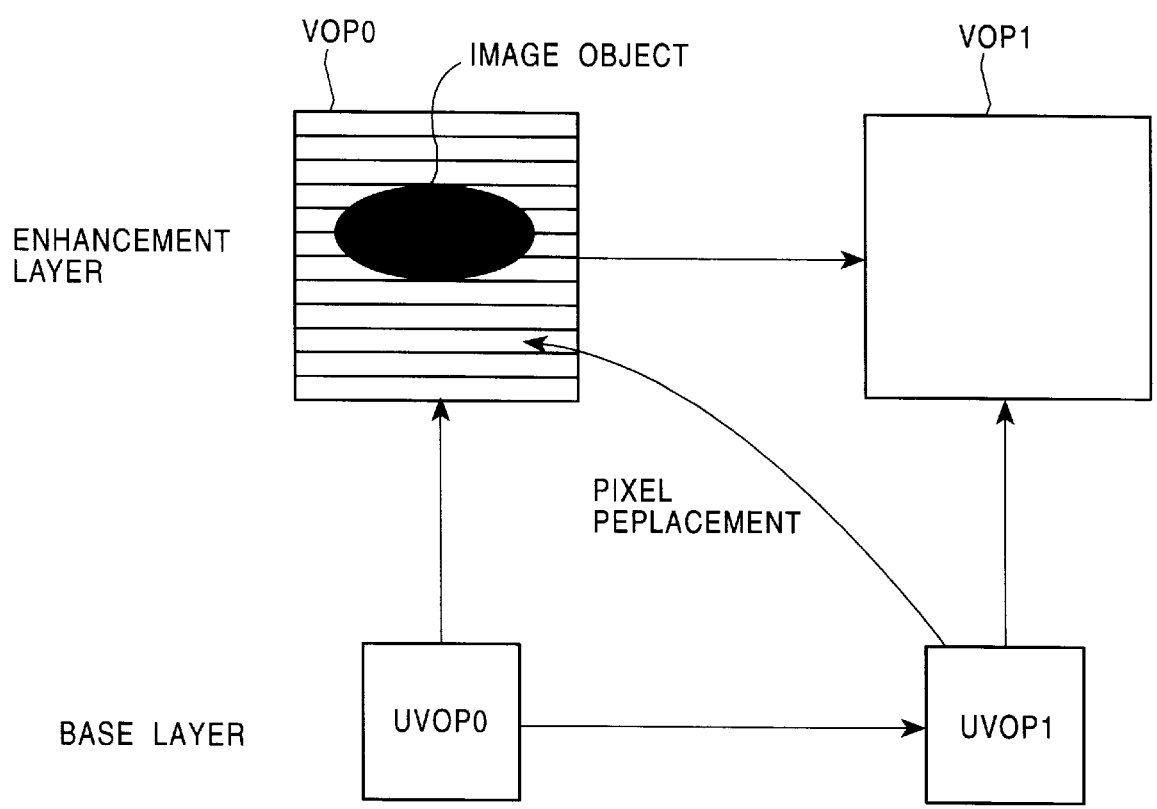
FIG. 16 is a schematic representation of a pixel replacement process.

In the replacement method shown in FIG. 16, which is a modification of the method described above, the pixel values in an area other than an image object in the image VOP0 are replaced with the values of pixels at corresponding locations of the image UVOP1 which is equal in time to the image VOP1 and which has been converted in resolution.

After completion of the replacement process, the pixel replacement circuit 231 outputs the resultant image signal to the set of frame memories 11.

Figure 17:
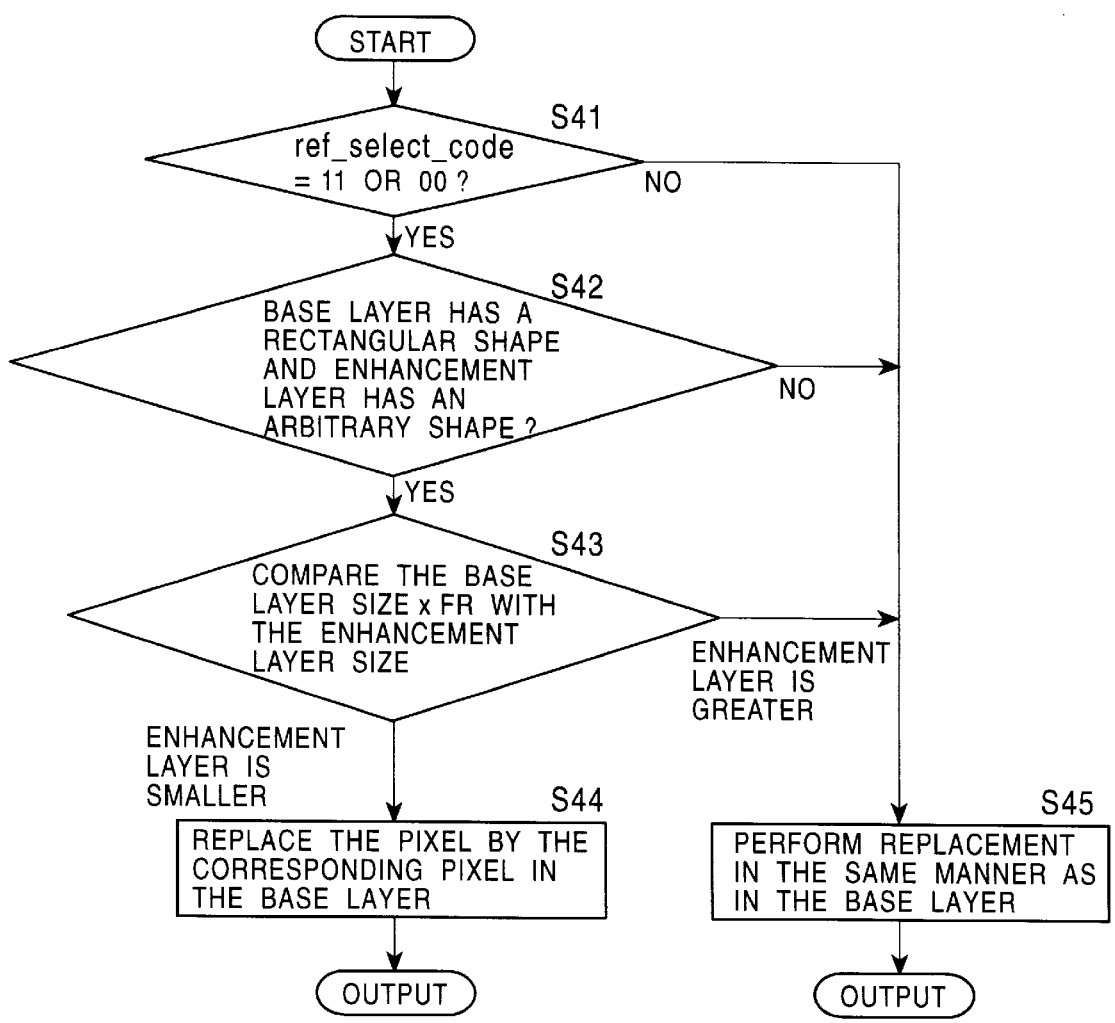
FIG. 17 is a flow chart illustrating the pixel replacement process.

Although in the method shown in FIG. 14, the replacement mode is switched in accordance with the flag fill_mode indicating the replacement mode, the replacement mode may be switched in accordance with the flag ref_select_code. In this case, replacement is performed as described below with reference to FIG. 17.

As shown in Table 1, when an enhancement layer VOP is to be encoded in the P-picture prediction mode, if the flag ref_select_code is equal to '11', the encoding is performed in the spatially scalable fashion. On the other hand, as shown in Table 2, when an enhancement layer VOP is to be encoded in the B-picture prediction mode, if the flag ref_select_code is equal to '00', the encoding is performed in the spatially scalable fashion (step S41). In the case where the enhancement layer VOP has an arbitrary shape, and the base layer VOP has a rectangular shape, the enhancement layer corresponds to a partial area of the base layer (step S42). When the size of the enhancement layer VOP is compared with the size of the corresponding base layer VOP times the factor of FR, if the size of the enhancement layer VOP is smaller, then the enhancement layer corresponds only to the partial area of the base layer (step S43).

If it is concluded in steps S41 to S43 that the encoding is performed in the spatially scalable fashion and that the enhancement layer corresponds only to a partial area of the base layer, the pixel values of the reference image are replaced with the pixel values of the base layer image which has been converted in resolution (step S44). In the other cases, the pixel replacement is performed in the same manner as in the case where the pixel replacement circuit 221 performs replacement on a base layer image.

The set of frame memories 11 stores the image signal output from the pixel replacement circuit 231, the flag FSZ_E indicating the size of the VOP, and the flag FPOS_E indicating the absolute coordinate position thereof.

As described above, the bit streams generated by the enhancement layer encoder 203 and the base layer encoder 204, respectively, are input to the multiplexer 206 as shown in FIG. 1. The multiplexer 206 shown in FIG. 1 multiplexes the enhancement layer bit stream and the base layer bit stream into a single bit stream, and supplies the resultant VO bit stream to the multiplexer 104 shown in FIG. 51. The multiplexer 104 shown in FIG. 51 multiplexes the bit streams supplied from the respective VOP encoders into a signal bit stream, and outputs the resultant bit stream either over a transmission line or onto a recording medium.

Figure 18:
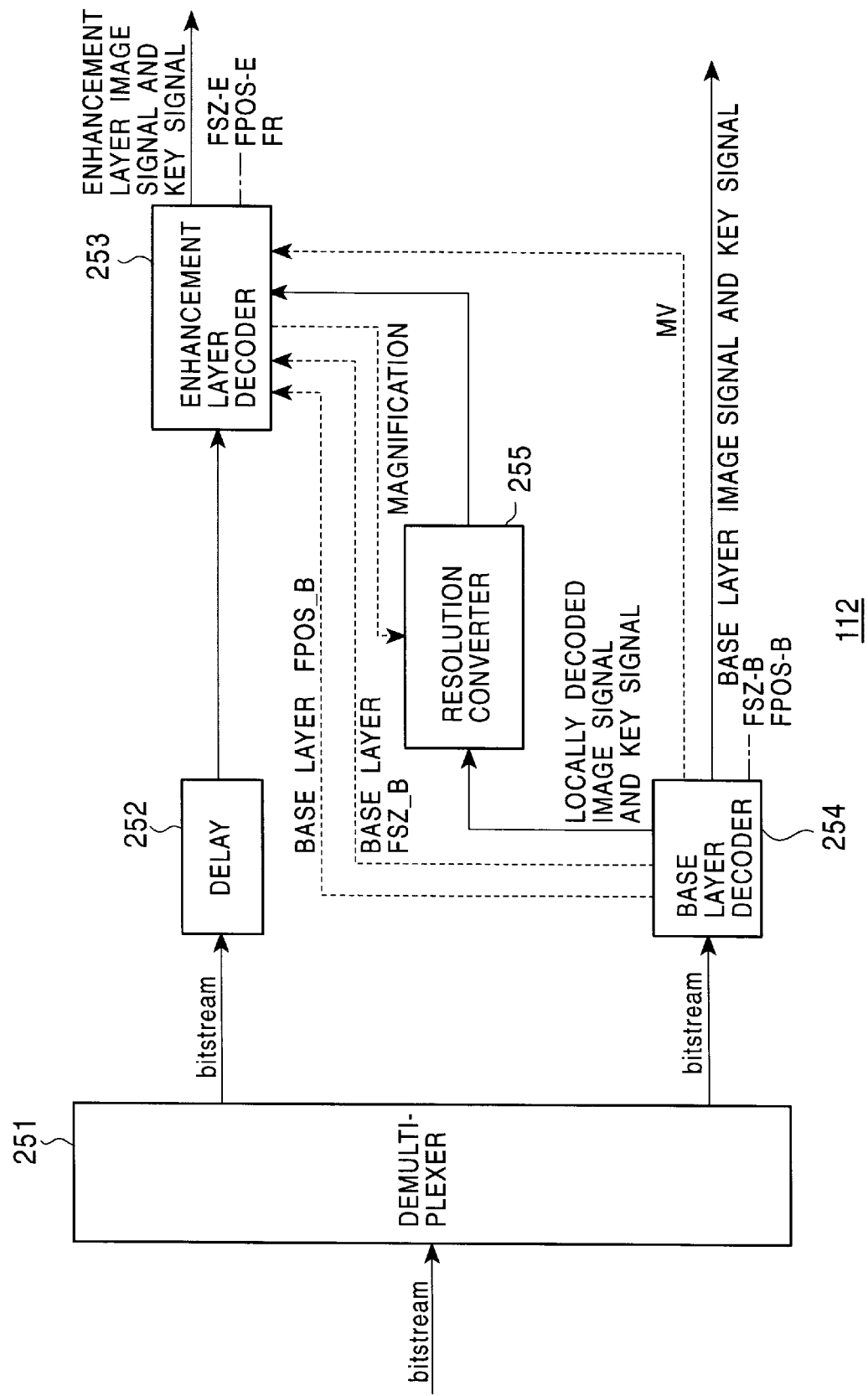
FIG. 18 is block diagram illustrating an example of the construction of a VOP decoder used in an image signal decoding apparatus according to the present invention.

FIG. 18 illustrates an example of a VOP decoder 112 corresponding to the VOP encoder 1 f03 shown in FIG. 1 according to the first embodiment of the invention. In FIG. 18, the bit stream supplied to the VOP decoder via the transmission line or the recording medium is first demultiplexed to an enhancement layer bit stream and a base layer bit stream.

The base layer bit stream is directly supplied to a base layer decoder 254. On the other hand, the enhancement layer bit stream is supplied to an enhancement layer decoder 253 via a delay circuit 252.

The delay circuit 252 makes the enhancement layer bit stream delayed by a time required for the base layer decoder 254 to decode one VOP, and then outputs the bit stream to the enhancement layer decoder 253.

Figure 19:
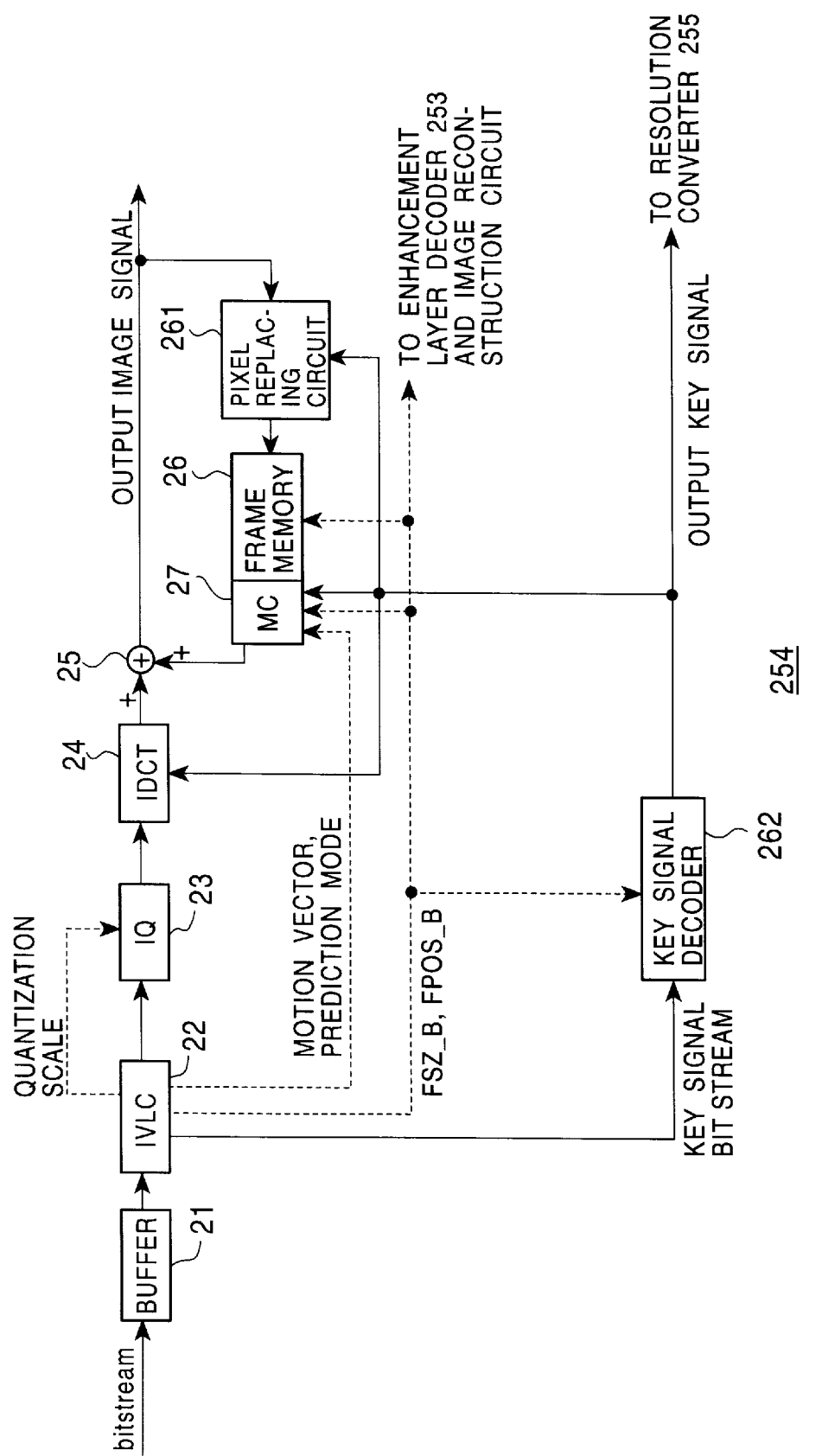
FIG. 19 is a block diagram illustrating an example of the construction of the enhancement layer decoder 254 shown in FIG. 18.
Figure 45:
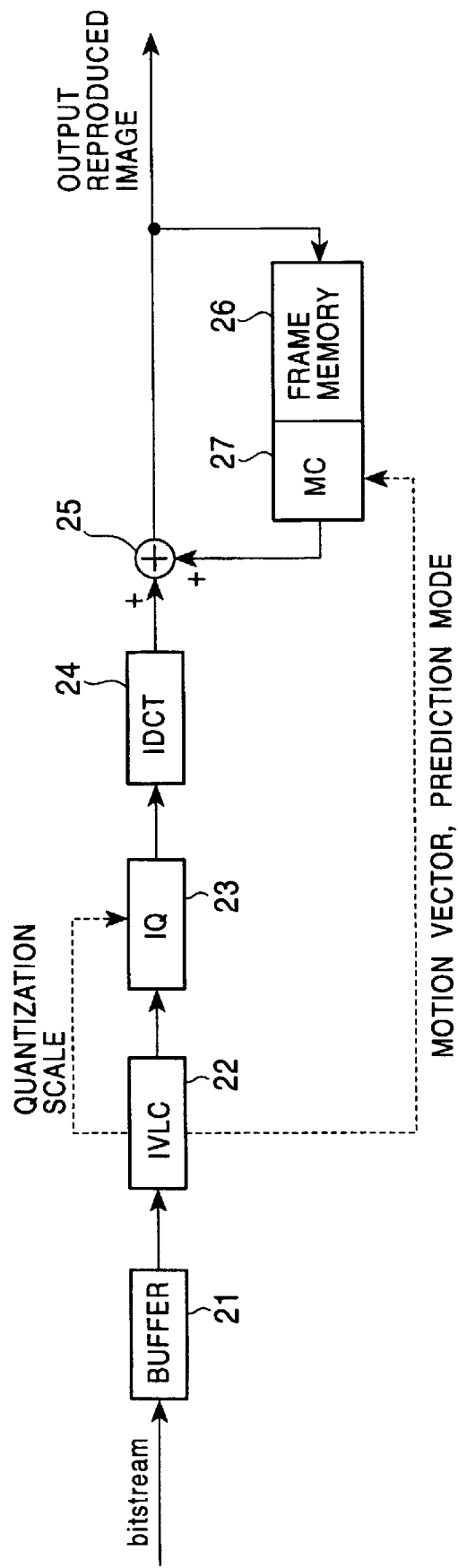
FIG. 45 is a block diagram illustrating an example of the construction of an image signal decoding apparatus.
Figure 46:
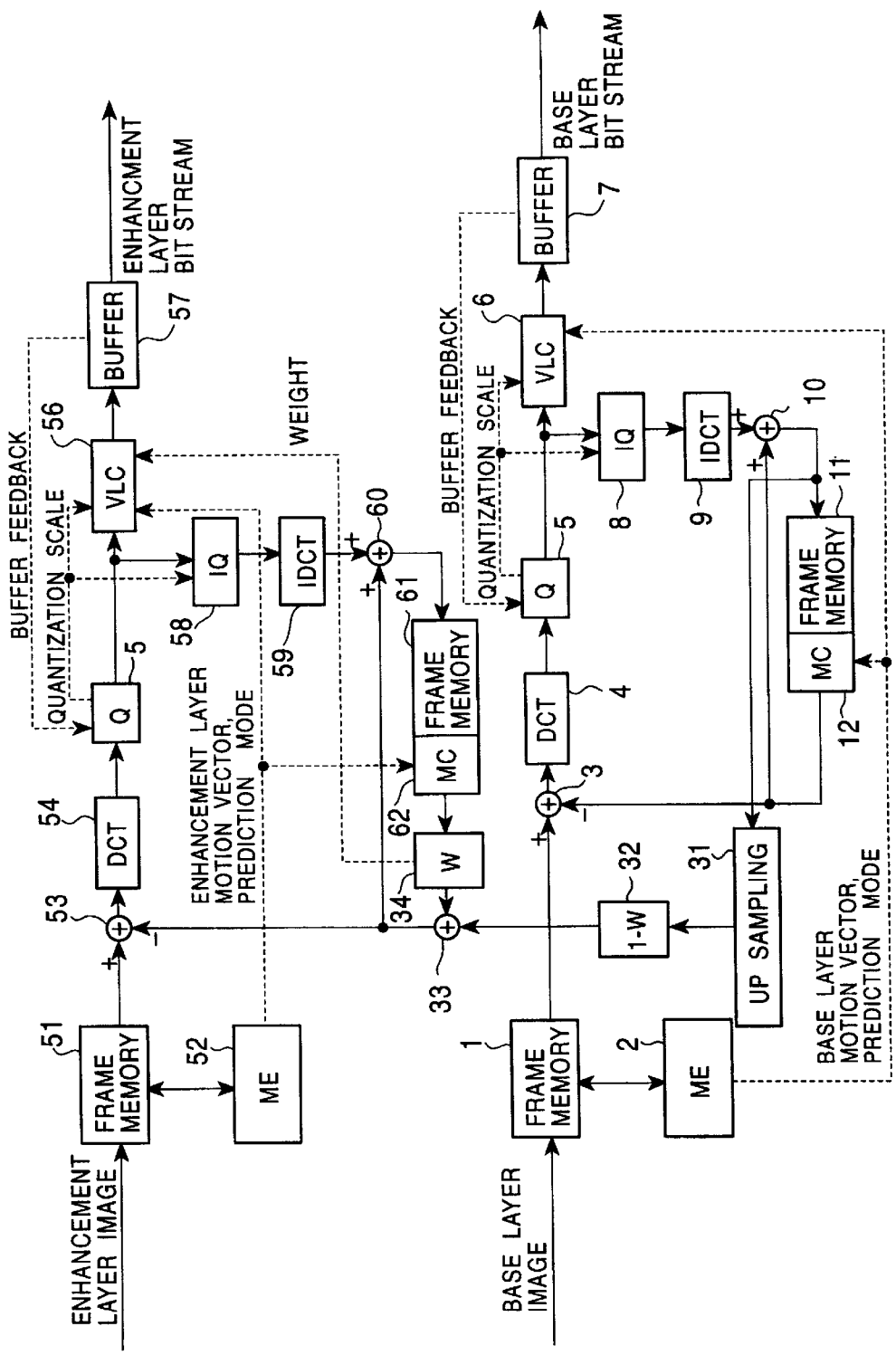
FIG. 46 is a block diagram illustrating another example of the construction of an image signal encoding apparatus.
Figure 47:
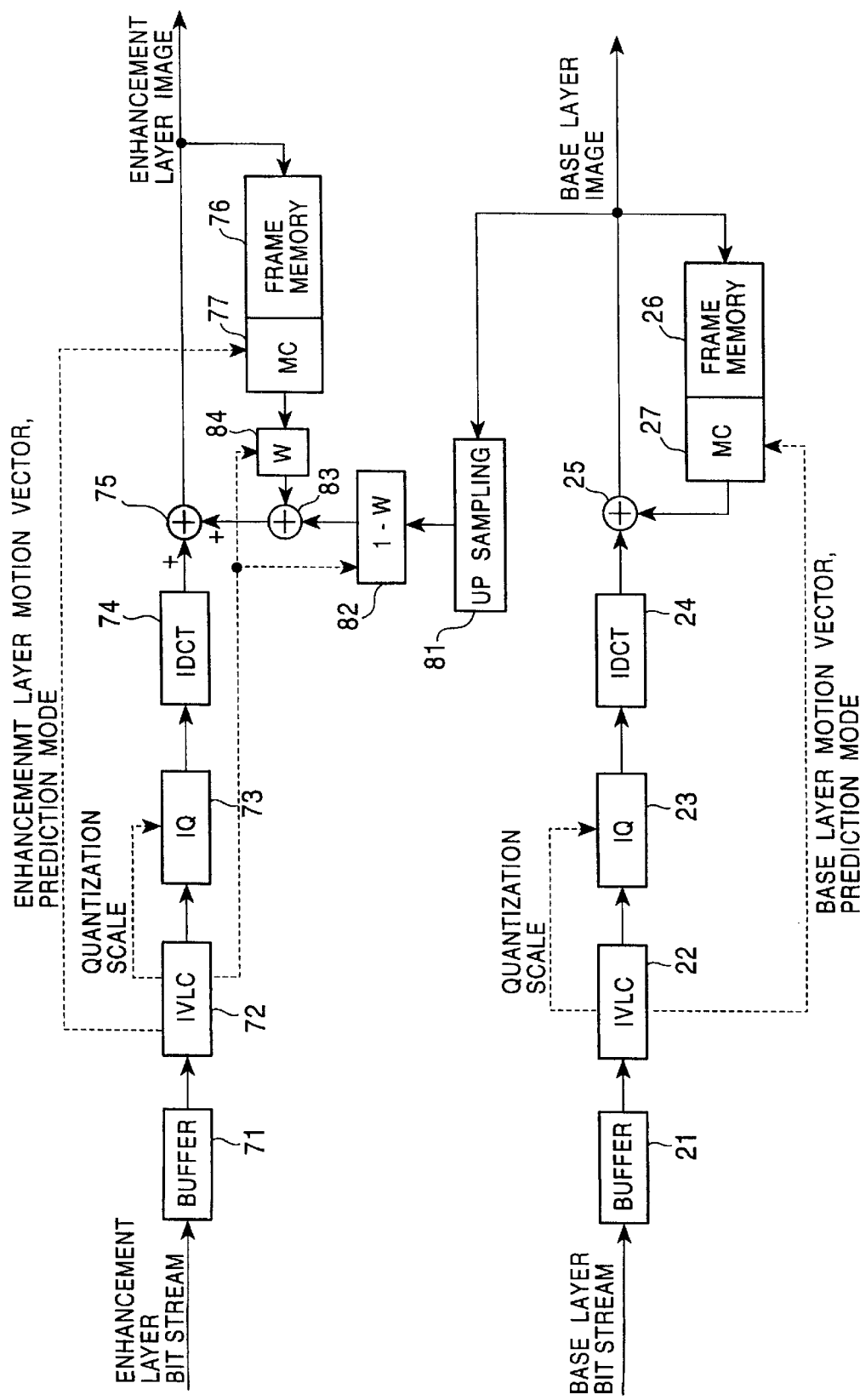
FIG. 47 is a block diagram illustrating another example of the construction of an image signal decoding apparatus.
Figure 48:
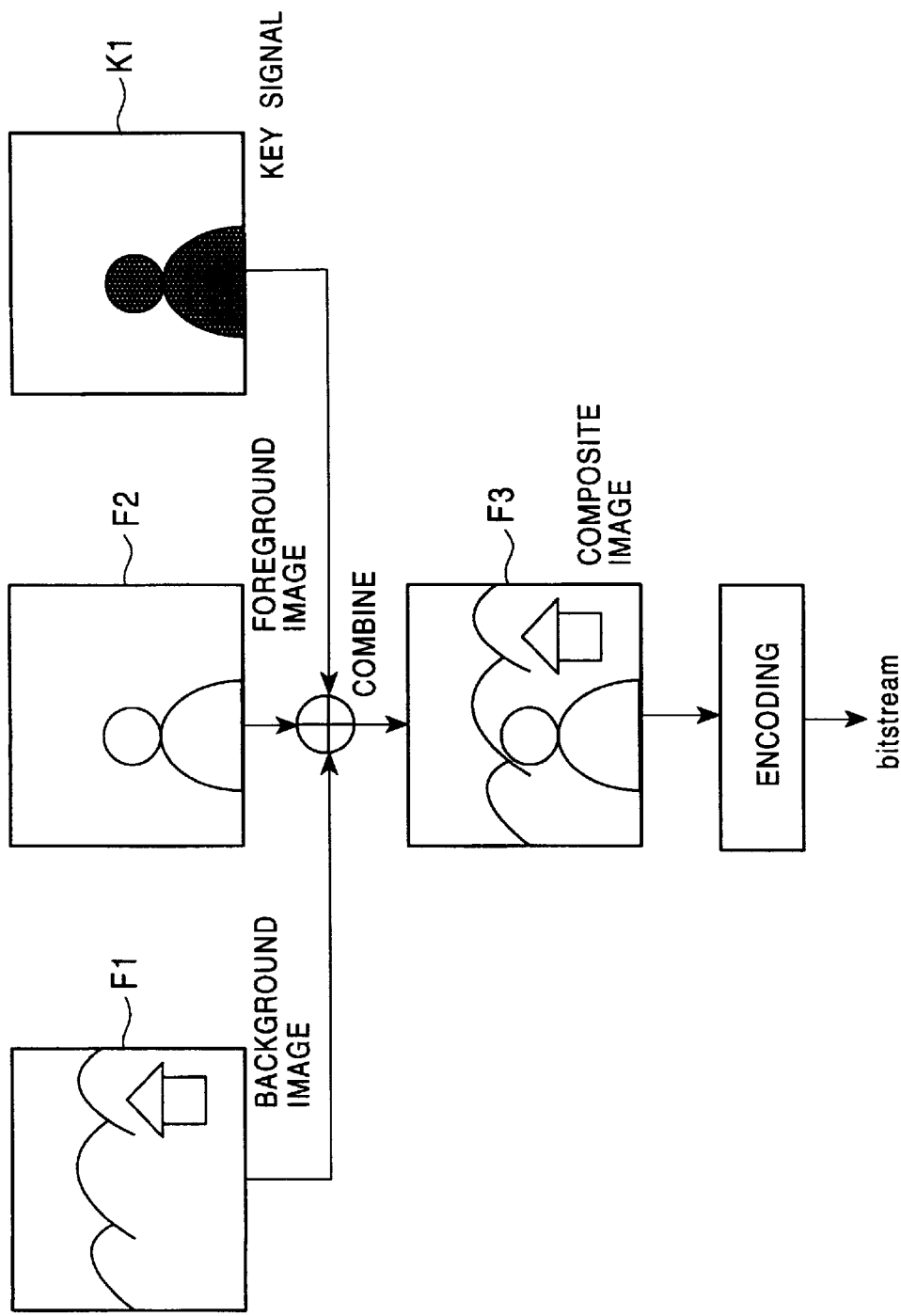
FIG. 48 is a schematic representation of the process of combining a plurality of images into a single composite image.
Figure 49:
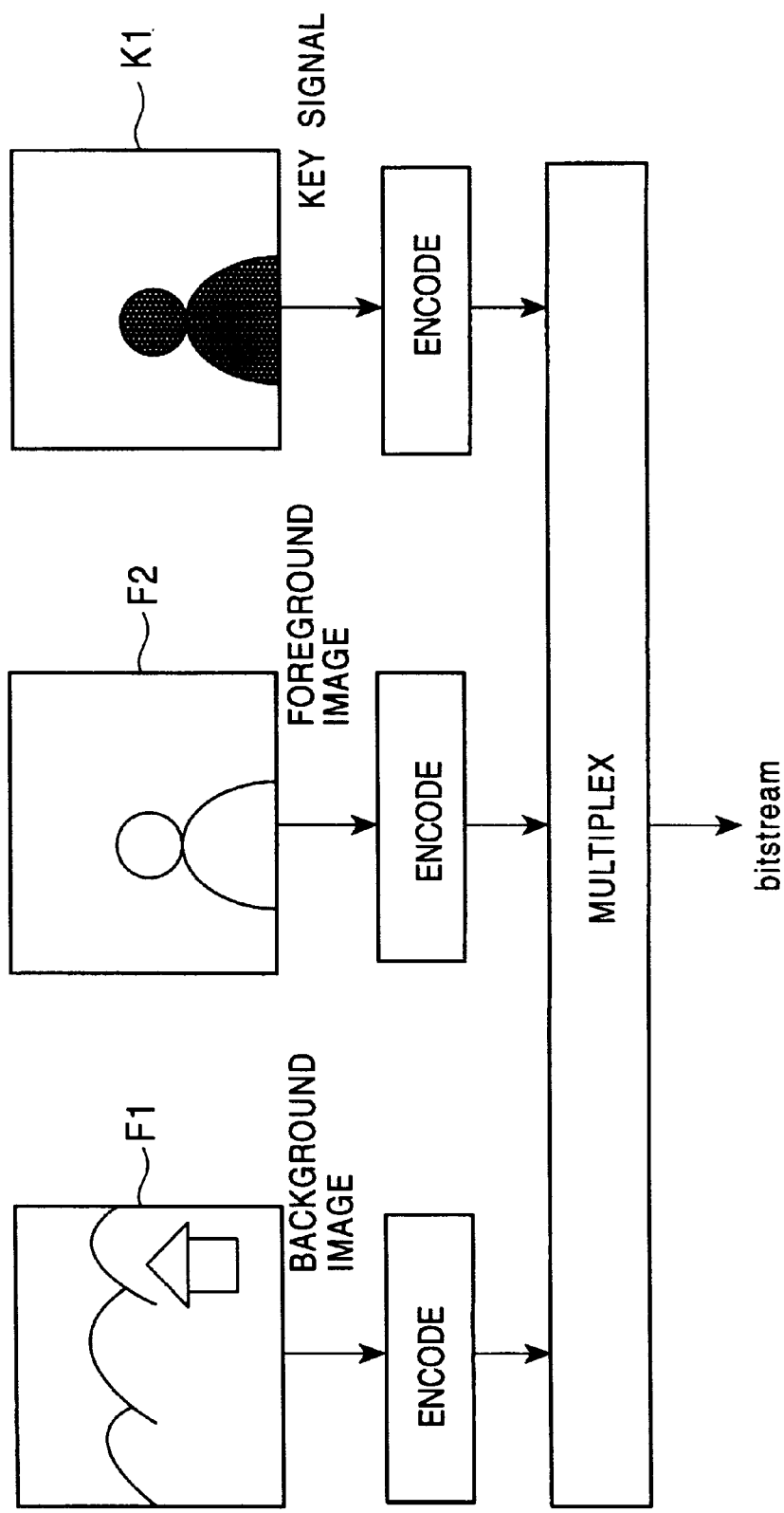
FIG. 49 is a schematic representation of the process of combining a plurality of images into a single composite image.
Figure 50:
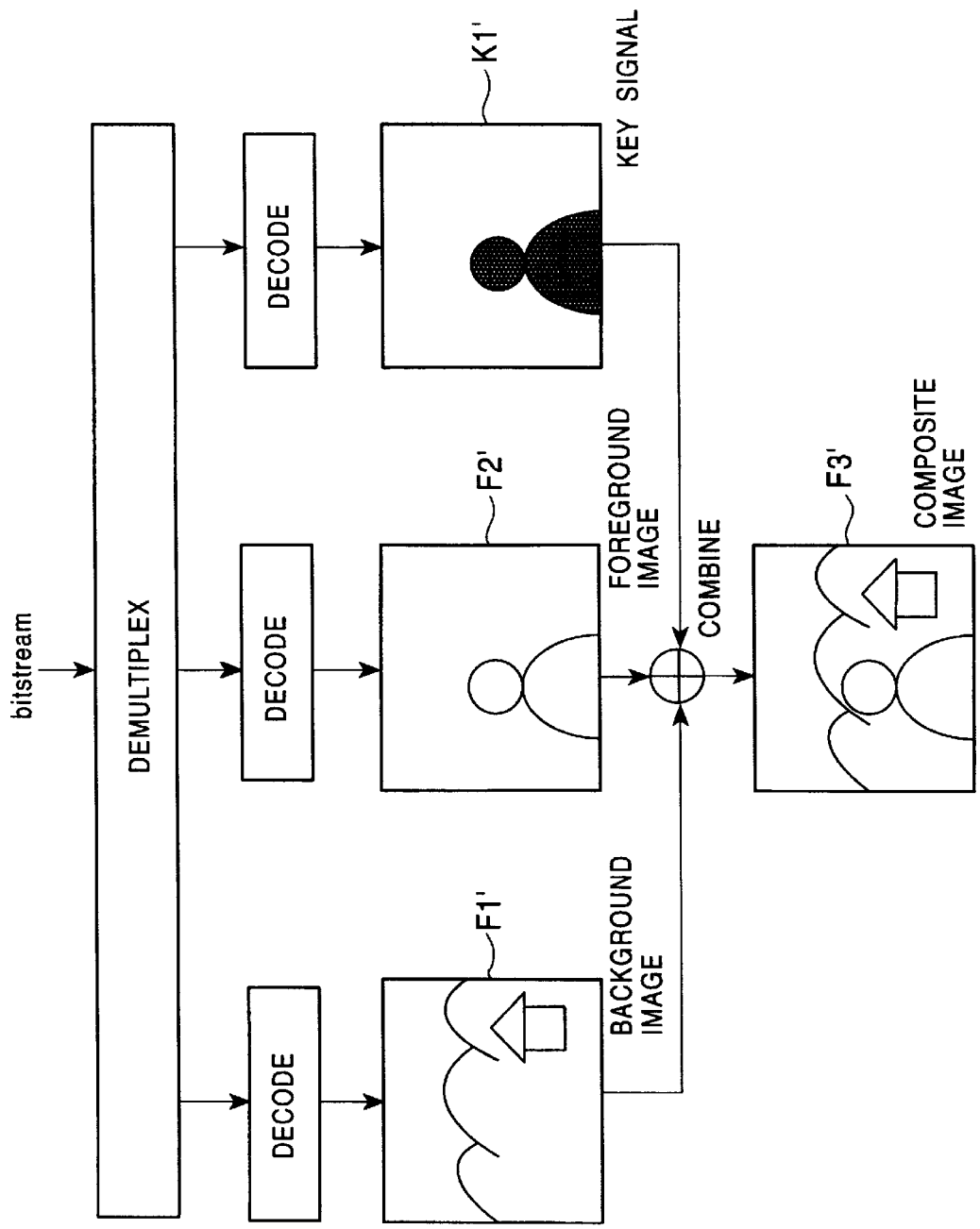
FIG. 50 is a schematic representation of the process of combining a plurality of images into a single composite image.

A specific circuit configuration of the base layer decoder 254 is described below with reference to FIG. 19. In FIG. 19, similar elements to those in FIG. 45 are denoted by similar reference numerals.

After the base layer bit stream is stored temporarily in a reception buffer 21, the base layer bit stream is supplied to a variable-length decoder 22. The variable-length decode 22 performs variable-length decoding on the base layer bit stream supplied from the reception buffer 21 thereby supplying a motion vector and information representing the prediction mode to a motion compensation circuit 27, information representing the quantized step to an inverse quantization circuit 23, and the variable-length decoded data to the inverse quantization circuit 23.

The variable-length decoder 22 also decodes the flag FSZ_B indicating the size of the VOP and the flag FPOS_B indicating the absolute coordinate position thereof, and supplies the decoded flags to the motion compensation circuit 26, a set of frame memories 26, and a key signal decoder 262. The flags FSZ_B and FPOS_B are also supplied to an enhancement layer decoder 253. The variable-length decoder 22 also extracts a key signal bit stream, and supplies the extracted key signal bit stream to the key signal decoder 262.

The key signal decoder 262 decodes the key signal bit stream supplied from the variable-length decoder 22 in accordance with a decoding method corresponding to the encoding method employed. The decoded key signal is supplied to an IDCT circuit 24, the motion compensation circuit 27, a pixel replacement circuit 261. The decoded key signal is also supplied to the enhancement layer decoder 253 via a resolution converter 255 shown in FIG. 18.

The inverse quantization circuit 23 performs inverse quantization on the quantized data supplied from the variable-length decoder 22 bock by block in accordance with the quantization step supplied from also the variable-length decoder 22. The resultant signal is supplied to the IDCT circuit 24. The IDCT circuit 24 performs an inverse DCT process on the data (DCT coefficients) output by the inverse quantization circuit 23, and supplies the resultant data to an arithmetic operation circuit 25.

In the case where the image signal supplied from the IDCT circuit 24 is I-picture data, the image signal is directly output via the arithmetic operation circuit 25 without being subjected to any process, and is stored in the set of frame memories 26 via the pixel replacement circuit 261 for use in generating a predicted image signal of an image signal which will be input later to the arithmetic operation circuit 25. The image signal output from the arithmetic operation circuit 25 is directly output to an image reconstruction circuit 113 shown in FIG. 52.

When the image signal supplied from the IDCT circuit 24 is a P-picture or a B-picture, the motion compensation circuit 27 generates a predicted image signal in accordance with the motion vector and information representing the prediction mode supplied from the variable-length decoder 22, and outputs the resultant signal to the arithmetic operation circuit 25. The arithmetic operation circuit 25 adds the predicted image signal supplied from the motion compensation circuit 27 to the image signal supplied from the IDCT circuit 24 thereby creating a reproduced image signal. When the image signal supplied from the IDCT circuit 24 is a P-picture, the image signal output from the arithmetic operation circuit 25 is also stored in the set of frame memories 26 via the pixel replacement circuit 261 so that it can be used as a reference image in the process of decoding a subsequent image signal. However, in the case of an intramacroblock, the arithmetic operation circuit 25 simply transfers the image signal supplied from the IDCT circuit 24 to the output without performing any process on it.

The pixel replacement circuit 261 performs pixel repayment in a similar manner to the pixel replacement circuit 221 (FIG. 8) in the encoder (as shown in the flow chart of FIG. 9).

In FIG. 18, the base layer image signal and key signal decoded by the base layer decoder 254 are supplied to the image reconstruction circuit 113 shown in FIG. 52. The decoded base layer image signal and key signal are also supplied to the resolution converter 255.

On the other hand, the flag PSZ_B indicating the size of the base layer image VOP and the flag FPOS-B indicating the absolute coordinate position thereof decoded by the base layer decoder 254 are supplied to the image reconstruction circuit 113 shown in FIG. 52 and also to the enhancement layer decoder 253.

The enhancement layer bit stream created by the demultiplexer 251 via the demultiplexing process is supplied to the enhancement layer decoder 253 via the delay circuit 252.

Figure 20:
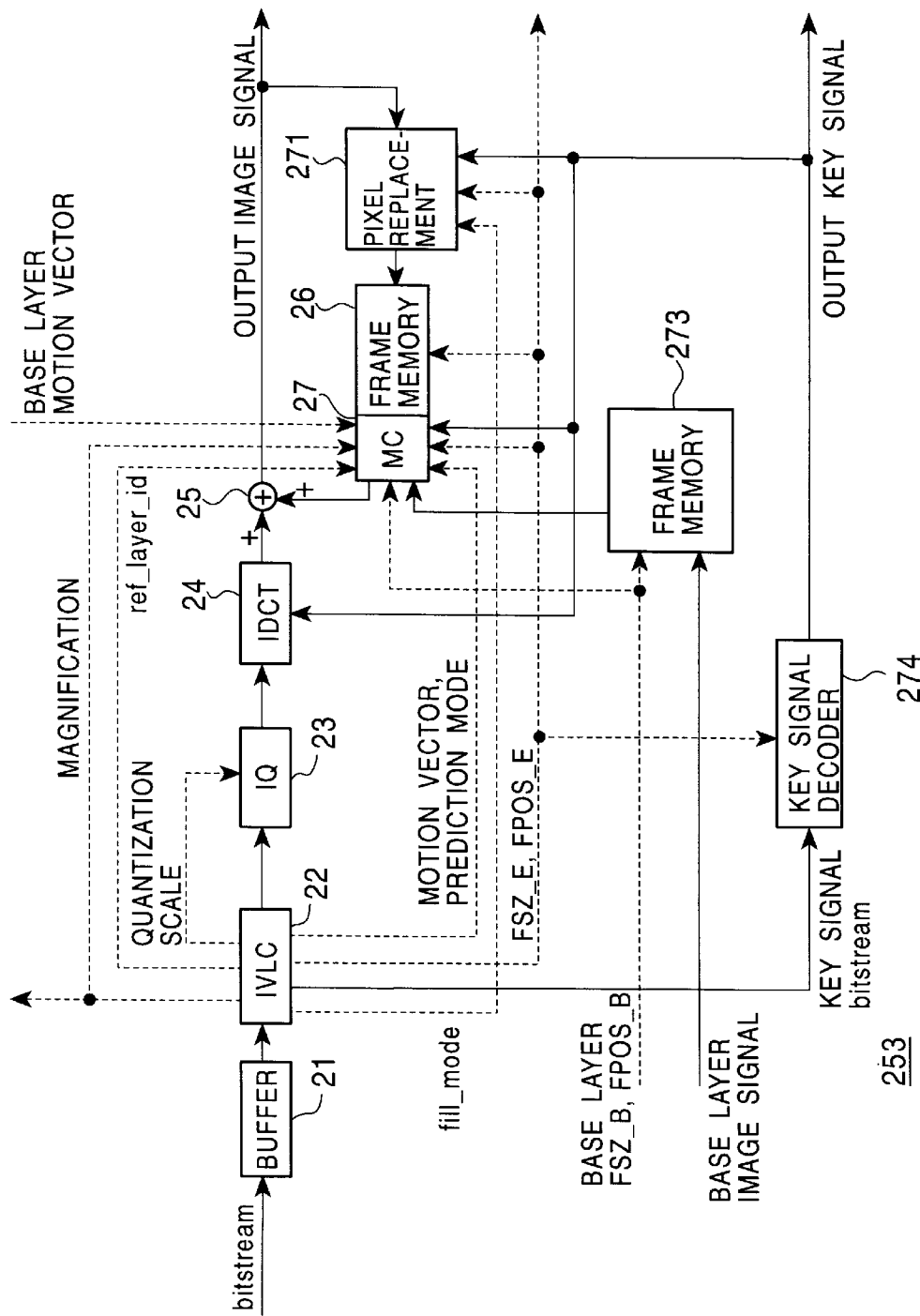
FIG. 20 is a block diagram illustrating an example of the construction of the base layer decoder 253 shown in FIG. 18.

The enhancement layer decoder 253 is described in further detail below with reference to FIG. 20. In FIG. 20, similar elements to those in FIG. 45 are denoted by similar reference numerals.

After the enhancement layer bit stream is stored temporarily in a reception buffer 21, the enhancement layer bit stream is supplied to a variable-length decoder 22. The variable-length decoder 22 performs an inverse variable-length encoding operation on the enhancement layer bit stream supplied from the receiving buffer 21. The variable-length decoder 22 outputs a motion vector and information indicating the associated prediction mode to a motion compensation circuit 27. The variable-length decoder 22 also supplies a quantization step to an inverse quantization circuit 23. Furthermore, the variable-length decoded data is supplied from the variable-length decoder 22 to the inverse quantization circuit 23.

The variable-length decoder 22 also decodes the flag FSZ_E indicating the size of the VOP and the flag FPOS_E indicating the absolute coordinate position thereof, and supplies the decoded flags to the motion compensation circuit 27, a set of frame memories 26, and a key signal decoder 274.

Furthermore, the variable-length decoder 22 also decodes the flag FR indicating the ratio of the size (resolution) of the enhancement layer image VOP to the size (resolution) of the base layer image VOP, and supplies the result to the motion compensation circuit 27 and the resolution converter 255 shown in FIG. 18.

According to the flag FR indicating the size ratio (magnification), the resolution converter 255 performs resolution conversion on the decoded base layer image signal and its associated key signal using a filter. The resultant signals are supplied to a set of frame memories 273 in the enhancement layer decoder 253.

The variable-length decoder 22 also decodes the flag ref_layer_id indicating the reference layer used in prediction, and the flag ref_select_code, and supplies the result to the motion compensation circuit 27. Still furthermore, the variable-length decoder 22 also decodes the flag fill-mode indicating the replacement mode and supplies the result to a pixel replacement circuit 271. The variable-length decoder 22 also extracts the key signal bit stream and supplies the extracted key signal bit stream to the key signal decoder 274.

The key signal decoder 274 decodes the key signal bit stream supplied from the variable-length decoder 22 in accordance with a decoding method corresponding to the encoding method employed. The decoded key signal is supplied to an IDCT circuit 24, the motion compensation circuit 27, and the pixel replacement circuit 271.

The inverse quantization circuit 23 performs inverse quantization on the data (quantized DCT coefficients) supplied from the variable-length decoder 22 bock by block in accordance with the quantization step supplied from also the variable-length decoder 22. The resultant signal is supplied to the IDCT circuit 24. The IDCT circuit 24 performs an inverse DCT process on the data (DCT coefficients) output from the inverse quantization circuit 23, and supplies the resultant data to an arithmetic operation circuit 25.

In the case where the image signal supplied from the IDCT circuit 24 is I-picture data, the image signal is directly output via the arithmetic operation circuit 25 without being subjected to any process, and is stored in the set of frame memories 26 via the pixel replacement circuit 261 for use in generating a predicted image signal of an image signal which will be input later to the arithmetic operation circuit 25. The image signal output from the arithmetic operation circuit 25 is directly output to the image reconstruction circuit 113 shown in FIG. 52.

When the image signal supplied from the IDCT circuit 24 is a P-picture or a B-picture, the motion compensation circuit 27 generates a predicted image signal from the image stored in the set of frame memories 26 or 273 in accordance with the motion vector, information representing the prediction mode, and flags ref_layer_id and ref_select_code indicating the reference layer supplied from the variable-length decoder 22. The resultant signal is supplied to the arithmetic operation circuit 25. The arithmetic operation circuit 25 adds the predicted image signal supplied from the motion compensation circuit 27 to the image signal supplied from the IDCT circuit 24 thereby creating a reproduced image signal. When the image signal supplied from the IDCT circuit 24 is a P-picture, the image signal output from the arithmetic operation circuit 25 is also stored in the set of frame memories 26 via the pixel replacement circuit 271 so that it can be used as a reference image in the process of decoding a subsequent image signal. However, in the case of an intramacroblock, the arithmetic operation circuit 25 simply transfers the image signal supplied from the IDCT circuit 24 to its output without performing any process on it.

The pixel replacement circuit 271 performs pixel replacement in a similar manner to the pixel replacement circuit 221 (FIG. 11) in the encoder (as shown in the flow chart of FIG. 14) in accordance to the decoded flag fill_mode indicating the replacement mode.

If the flag FR indicating the size ratio is equal to 1 and if ref_select_code='00', then the motion compensation circuit 27 generates a predicted image signal in accordance with the motion vector and information representing the prediction mode supplied from the base layer VOP equal in time, and supplies the resultant signal to the arithmetic operation circuit 25.

In FIG. 18, the decoded enhancement layer image signal, key signal, the flag FSZ_E indicating the size of the enhancement layer VOP, the flag FPOS_E indicating the absolute coordinate position of the enhancement layer VOP, and the flag FR indicating the size ratio are supplied to the image reconstruction circuit 113 shown in FIG. 52.

In FIG. 52, the image reconstruction circuit 113 reconstructs an image signal in accordance with the image signal, the key signal, the flag indicating the size of the VOP, the flag indicating the absolute coordinate position of the VOP, and the flag FR indicating the size ratio, supplied from the VOP decoder 112. The resultant reconstructed image signal is output to the outside.

An example of scalable encoding syntax is described below.

Figure 21:
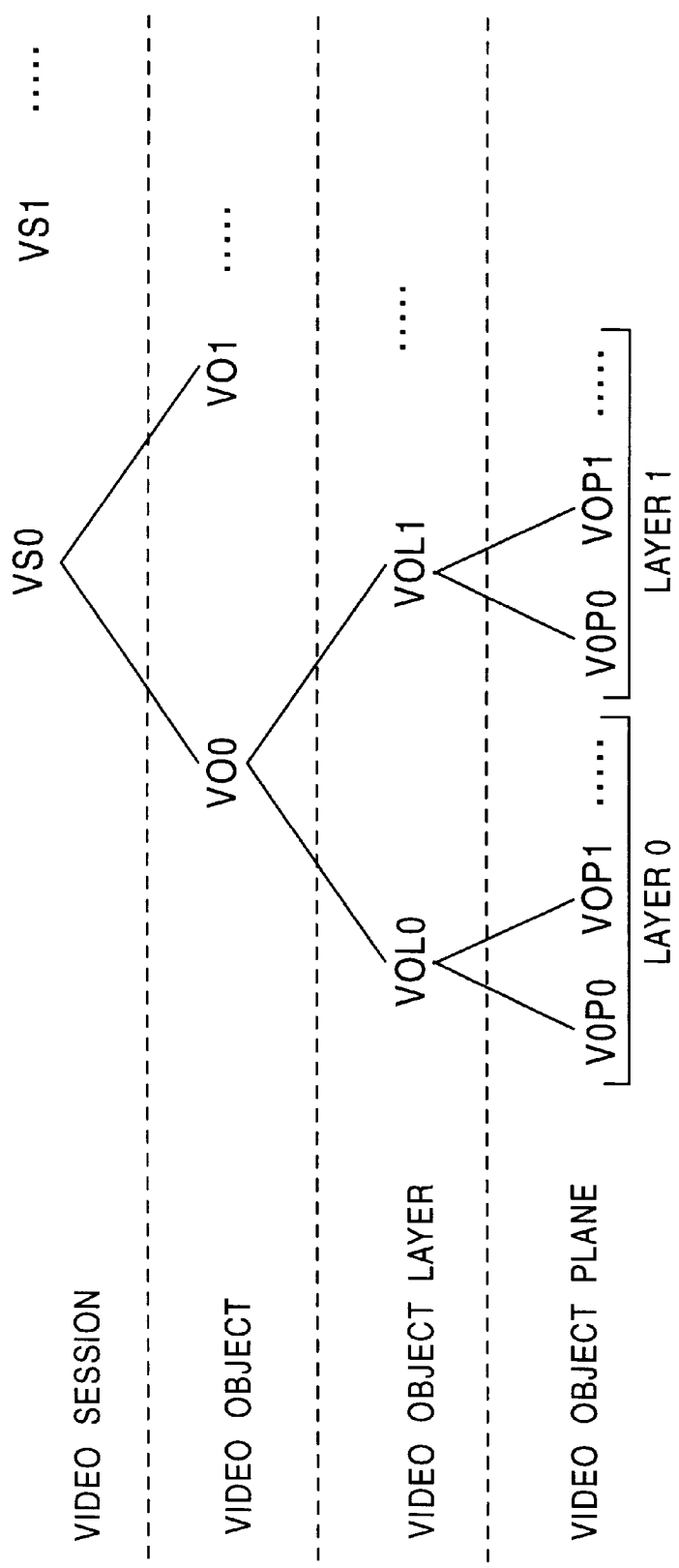
FIG. 21 is a schematic representation of the structure of a bit stream.

FIG. 21 illustrates the structure of a bit stream. Herein, a VS (video session) refers to a set of VO (video object) bit streams. The syntax of VS is shown in FIG. 22.

FIG. 23 illustrates the syntax of VO (video object). A VO is a bit stream associated with the entire image or a part of an object in an image.

In FIG. 21, a VOL (video object layer) includes a plurality of VOPs and is a class used to realize scalability. The syntax of VOL is shown in FIG. 24. Each VOL is identified by a number indicated by video_object_layer_id. For example, if video_object_layer_id=0, then VOL0 is a base layer. If video_object_layer_id=1, VOL1 is an enhancement layer. The number of scalable layers can be set to an arbitrary value. A flag video-object_layer_shape indicates whether the corresponding VOL includes the entire image or an object which is a part of the image. A flag video_object_layer_shape indicates the shape of the corresponding VOL, wherein specific shapes indicated thereby are shown in Table 3.

TABLE 3

| video_object_layer_shape | code |
| --- | --- |
| Entire image (rectangle) | 00 |
| Binary (Hard Key) | 01 |
| Gray-scale (Soft Key) | 10 |

A one-bit flag scalability indicates whether the corresponding VOL is an enhancement layer or a base layer. If scalability=1, the VOL is a base layer. In the other cases, the VOL is an enhancement layer.

A flag ref_layers_id indicates the VOL number used as a reference image different from the VOL being processed. This flag is transmitted only to the enhancement layer.

Flags hor_sampling_factor_n and hor_sampling_factor_m indicate the ratio of the horizontal length of an enhancement layer to that of a base layer (the resolution ratio in the horizontal direction). The horizontal size of the enhancement layer relative to that of the base layer is given by:

hor_sampling_factor_n/hor_sampling_factor_m

Flags ver_sampling_factor_n and ver_sampling-factor_m indicate the ratio of the vertical length of the enhancement layer to that of the base layer (the resolution ratio in the vertical direction). The vertical size of the enhancement layer relative to that of the base layer is given by:

ver_sampling_factor_n/ver_sampling_factor_m fill_mode is an one-bit flag used to indicate the replacement mode. When this flag is equal to 1, the pixel replacement is performed using a base layer image which has been converted in resolution. This flag is transmitted only in the enhancement layer.

The syntax of VOP (video object plane) is shown in FIGS. 25 to 27. Flags VOP_width and VOP_height indicate the size of the corresponding VOP. Flags VOP_horizontal_spatial_mc_ref and VOP_vertical_spatial_mc_ref indicate the position of the corresponding VOP represented in absolute coordinates.

ref_select_code is a flag used to indicate which layer is employed as a reference image in the forward prediction and backward prediction in accordance with the flag ref_layer_id. Specific values of ref_select_code are shown in Tables 1 and 2.

The bit stream output from the multiplexer 104 of the image signal encoder shown in FIG. 51 using the VOP encoder shown in FIG. 1 may be transmitted over a transmission line or recorded on a recording medium such as an optical disk, a magnetic disk, or a magneto-optical disk. The bit stream recorded on the recording medium can be reproduced and decoded by the image signal decoder shown in FIG. 52 using the VOP decoder 112 shown in FIG. 18.

Now a second embodiment of the present invention is described below. In this second embodiment, three layers are scalably encoded, although four or more layers may be scalably encoded in a similar manner according to the invention. In this embodiment, the VO-by-VO scalable encoding method described above is expanded to three-layer encoding. In this scalable encoding method for three layers, encoding for the base layer and a first enhancement layer is performed in a similar manner to the first embodiment described above.

In the three-layer scalable-encoding, there are two enhancement layer in addition to the base layer. That is, there are the base layer, the first enhancement layer, and the second enhancement layer. An image obtained by decoding the layers up to the second enhancement layer has better image qual.ity than can be achieved by decoding the layers up to the first enhancement layer. Herein, the improvement in the image quality refers to the improvement in the spatial resolution in the case of the spatial scalability encoding, the improvement in the temporal resolution (frame rate) in the case of the temporal scalable encoding, and the improvement in the SNR of an image in the case of the SNR scalable encoding.

The first enchantment layer and the second enhancement layer can have three different relationships as described below.

1. The second enhancement layer includes the entire area of the first enhancement layer.

2. The second enhancement layer corresponds to a partial area of the first enhancement layer.

3. The second enhancement layer corresponds to an area wider than the first enhancement layer.

The relationship types 1 and 2 are similar to those which occur in the first embodiment described above.

The third type of relationship can occur when three or more layers are scalably encoded. More specifically, the third type of relationship occurs when the first enhancement layer corresponds to a partial area of the base layer and the second enhancement layer includes the entire area of the base layer, or when the first enhancement layer corresponds to a partial area of the base layer and the second enhancement layer corresponds to an area wider than the first enhancement layer and to a partial area of the base layer.

When the three layers have the third type of relationship described above, if decoding is performed using the base layer and the first enhancement layer, a part of the image in the base layer is improved in image quality. If decoding is performed by further using the second enhancement layer, a wider area or the entire image in the base layer is improved in image quality.

In the third type of relationship, the VOP can have either a rectangular shape or an arbitrary shape.

Figure 28:
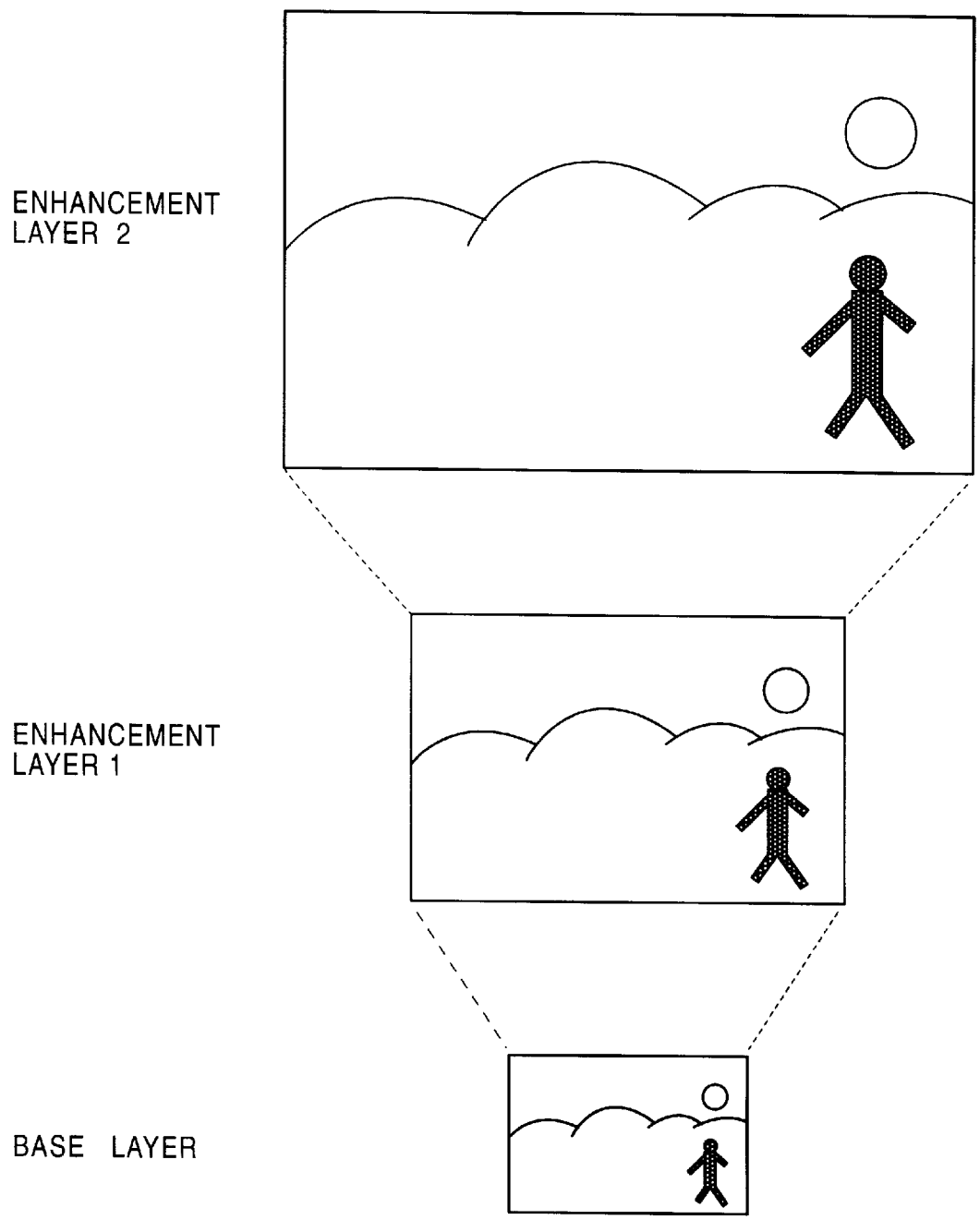
FIG. 28 is a schematic representation of an example of spatial scalability encoding.

Examples of scalable encoding processes for the third layer are shown in FIGS. 28 to 33. FIG. 28 illustrates an example in which a VOP has a rectangular shape and spatial scalability encoding is performed on it in the manner corresponding to the first type of relationship described above. FIG. 29 illustrates an example in which a VOP also has a rectangular shape but spatial scalability encoding is performed in the manner corresponding to the second type of relationship described above.

Figure 30:
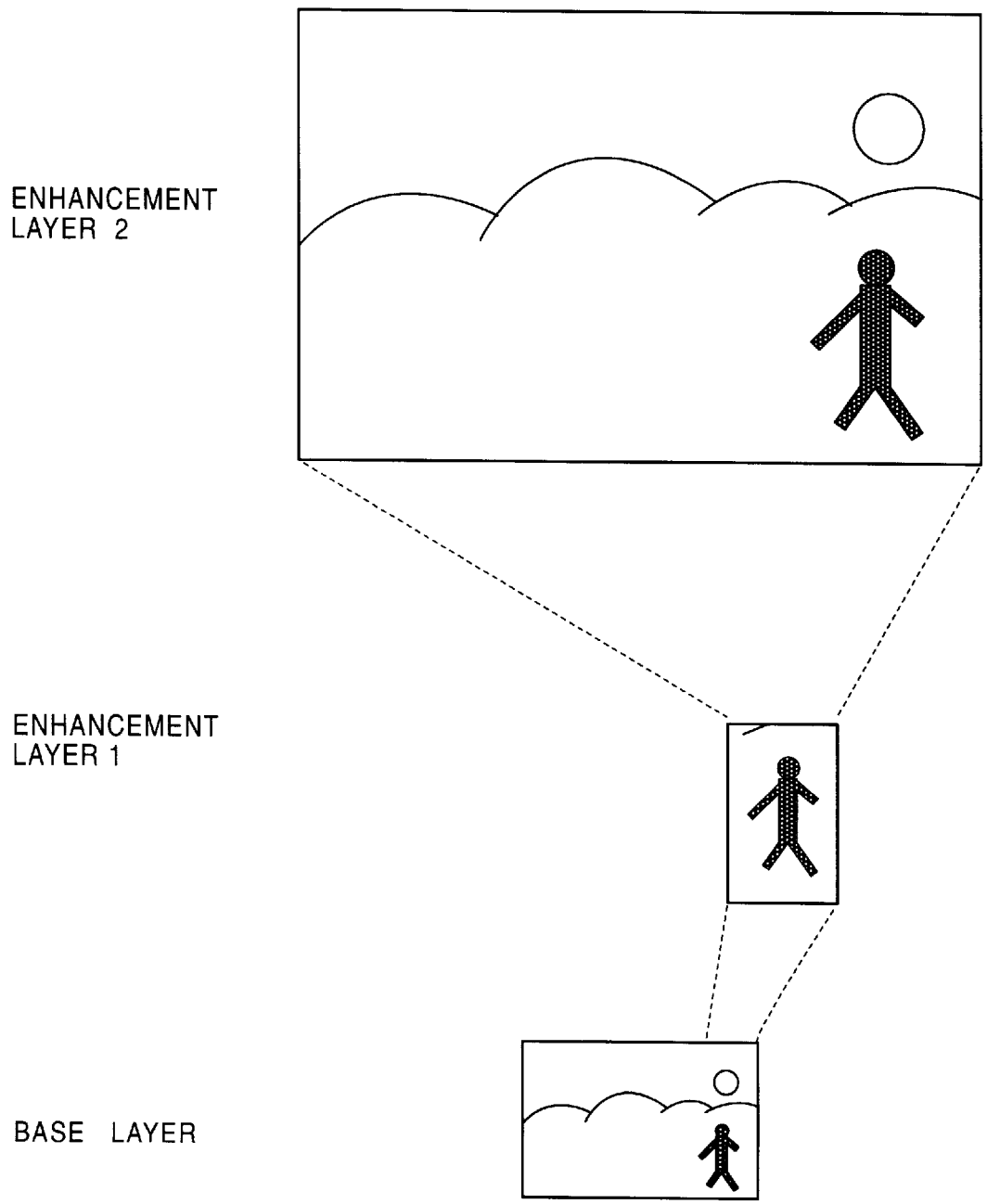
FIG. 30 is a schematic representation of an example of spatial scalability encoding.
Figure 31:
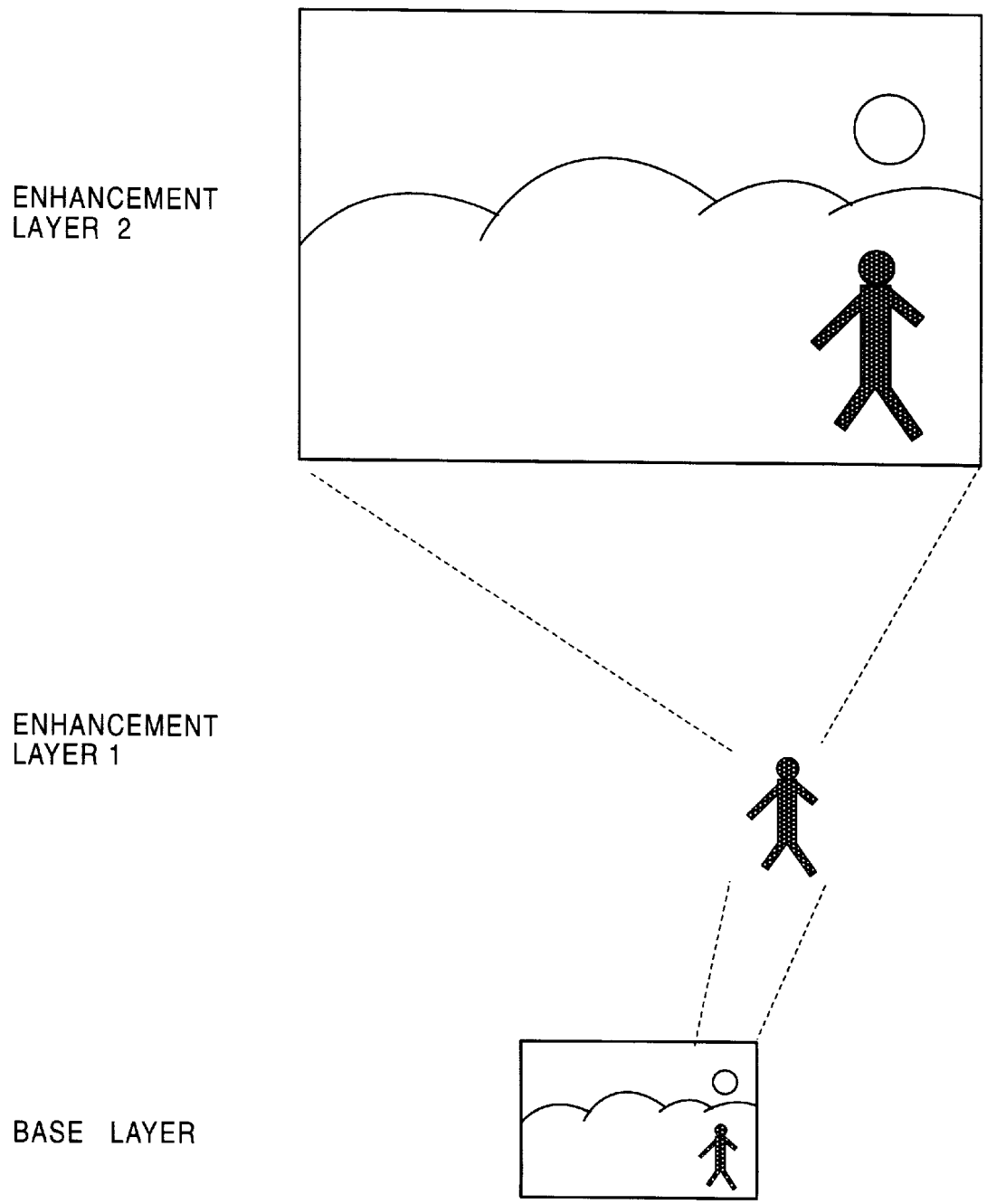
FIG. 31 is a schematic representation of an example of spatial scalability encoding.

FIG. 30 illustrates an example in which VOPs in all layers have a rectangular shape and spatial scalability encoding is performed in the manner corresponding to the third type of relationship described above. FIG. 31 illustrates an example in which a VOP in the first enhancement layer has an arbitrary shape and a VOP in the second enhancement layer has a rectangular shape wherein spatial scalability encoding is performed in the manner corresponding to the third type of relationship described above.

Figure 32:
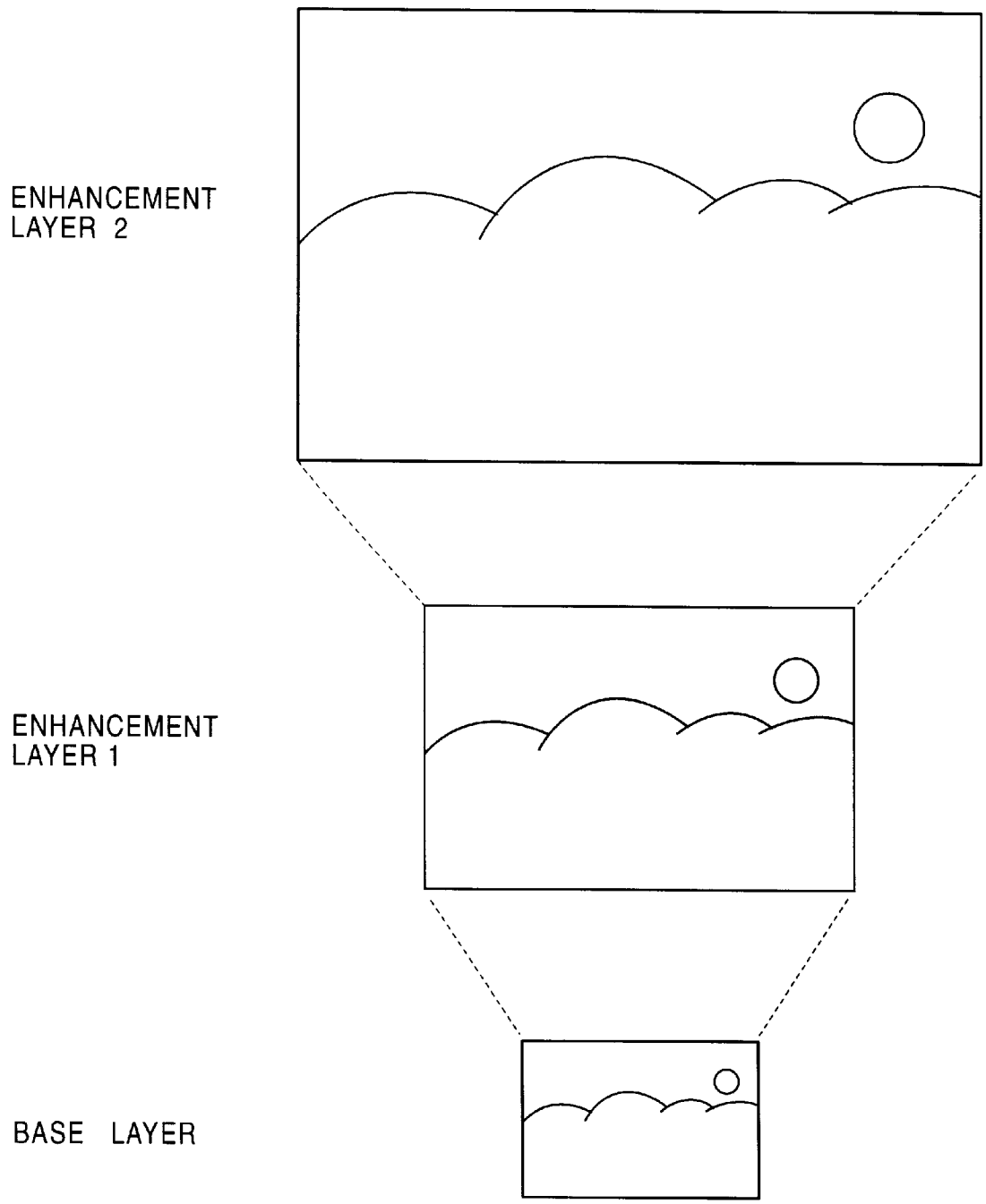
FIG. 32 is a schematic representation of an example of spatial scalability encoding.
Figure 33:
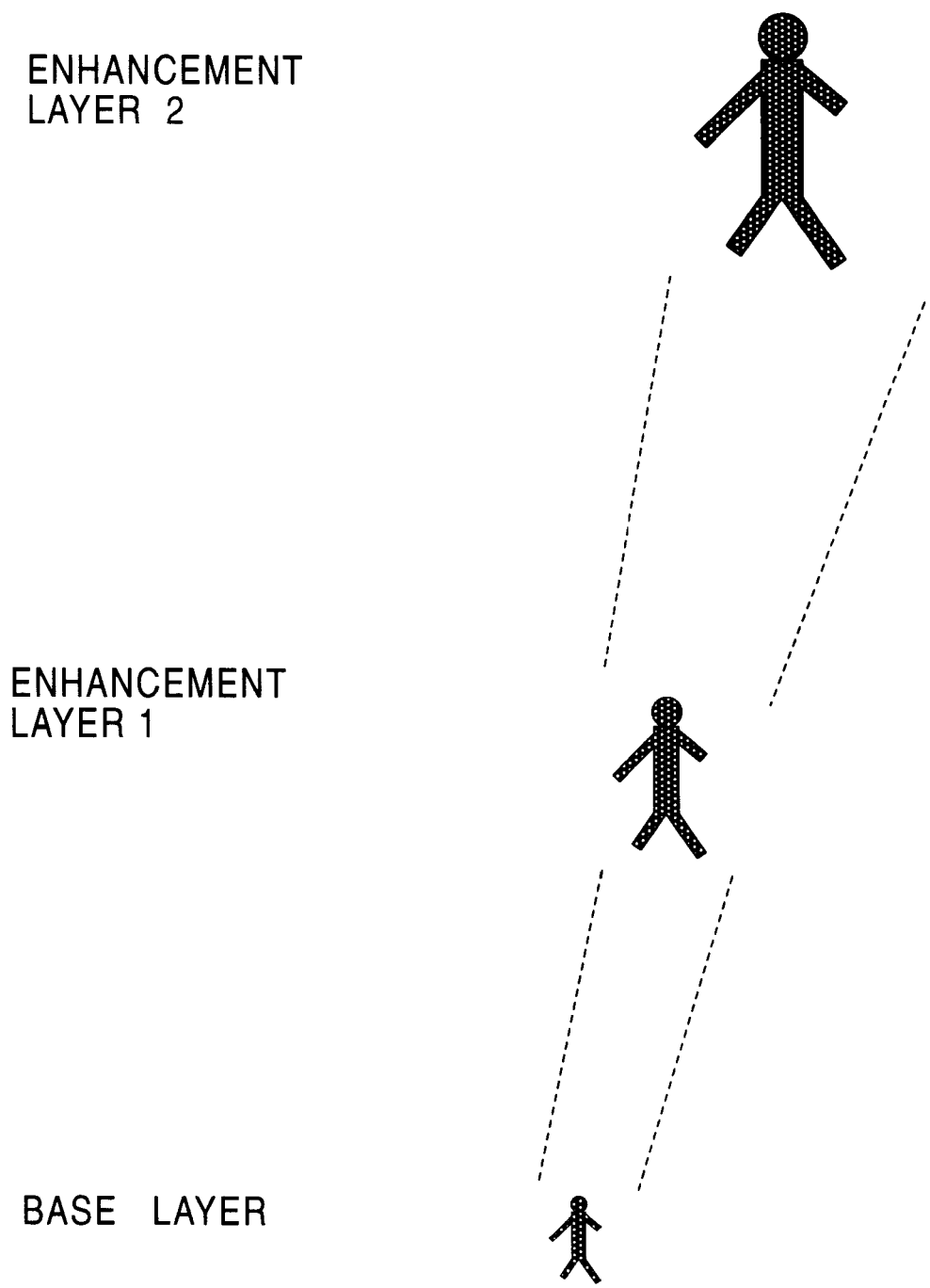
FIG. 33 is a schematic representation of an example of spatial scalability encoding.

FIGS. 32 and 33 illustrate examples in which VOPs have an arbitrary shape and spatial scalability encoding is performed in the manner corresponding to the first type of relationship described above.

Which scalable encoding mode is employed is determined in advance.

Figure 34:
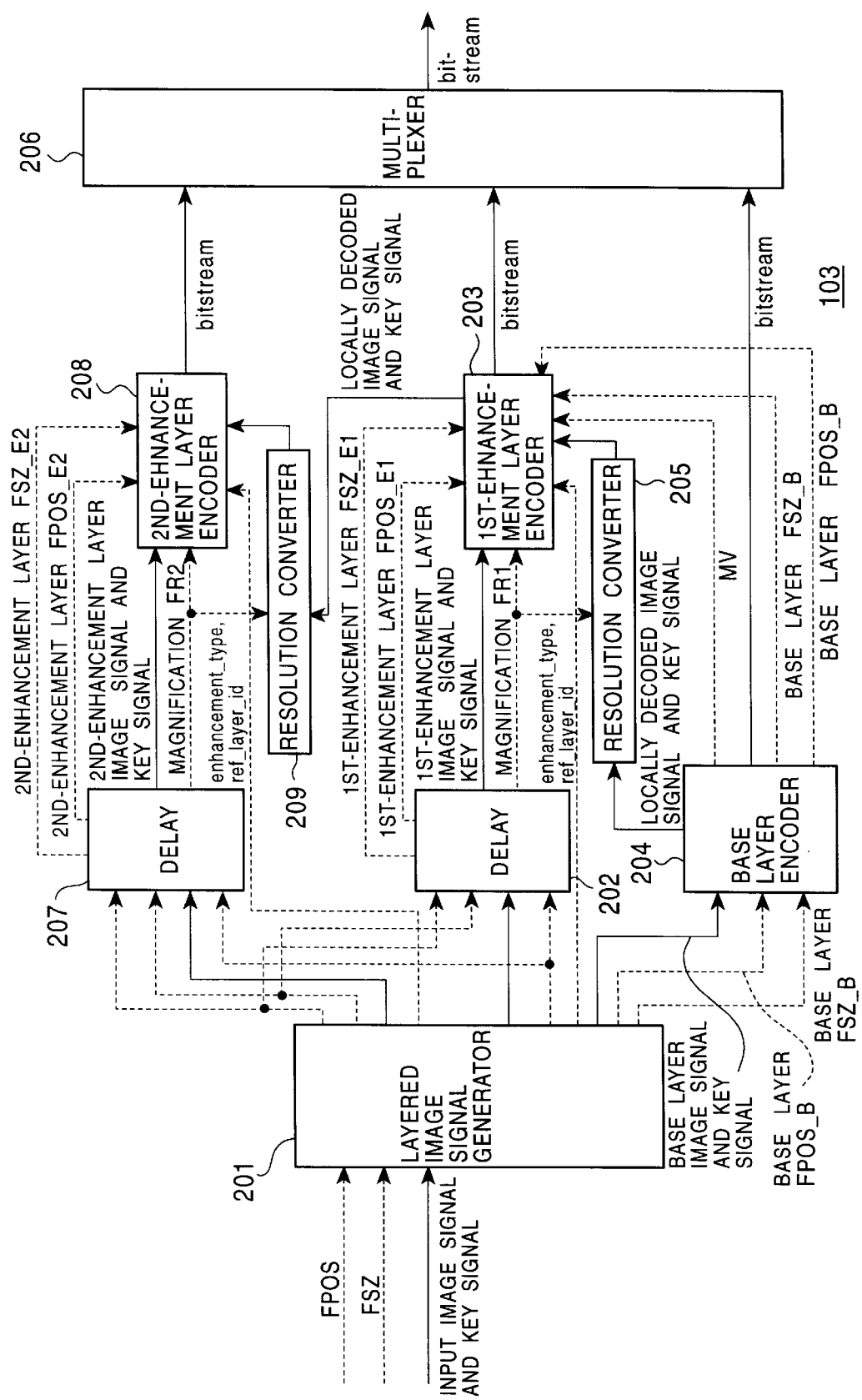
FIG. 34 is a block diagram illustrating another example of a VOP encoder used in the image signal encoding apparatus according to the present invention.

FIG. 34 illustrates an example of the circuit configuration of a VOP encoder 103 according to the second embodiment. Herein, the part used -to encode the base layer and the first enhancement layer is constructed in the same manner as the first embodiment (FIG. 1). The VOP encoder 103 of this second embodiment includes an additional part which is not included in the encoder shown in FIG. 1 and which is used to encode the second enhancement layer. The additional part includes a delay circuit 207, a second enhancement layer encoder 208, and a resolution converter 209. The first enhancement layer encoder 203 and the second enhancement layer encoder 208 have substantially the same construction.

Although the scalable encoding is performed for three layers in this embodiment, the technique used herein to expand two layers to three layers can be employed to expand to N enhancement layers to N+1 layers thereby making it possible to apply the scalable encoding technique to an arbitrary number of layers.

An image signal of each VOP, a key signal, a flag FSZ indicating the size of the VOP, and a flag FPOS indicating the absolute coordinate position thereof are input to a layered image signal generator 201. The layered image signal generator 201 generates a plurality of image signals in separate layers from the input signals. For example, in the case of the spatial scalability encoding, the layered image signal generator 201 reduces the input image signal and key signal at a proper ratio so as to generate an image signal and a key signal in the base layer. Similarly, the layered image signal generator 201 reduces the input image signal and key signal at a proper ratio so as to generate an image signal and a key signal in the first enhancement layer. Furthermore, the layered image signal generator 201 directly outputs the input image signal and key signal as an image signal and key signal in the second enhancement layer. Alternatively, the layered image signal generator 201 may perform a proper ratio of resolution conversion on the input image signal and key signal so as to generate an image signal and key signal in the second enhancement layer. In any case, the layered image signal generator 201 generates the first and second enhancement layers in accordance with predetermined method.

In the case of the temporal scalability (scalability along the time axis), the layered image signal generator 201 switches the output image signal among the base layer image and the enhancement layer images depending on the time.

In the case of the SNR (signal-to-noise ratio) scalability, the layered image signal generator 201 supplies the input image signal and key signal directly to the respective layers. That is, the same image signal and key signal are supplied to the base layer and enhancement layers.

In the case of the spatial scalability, the layered image signal generator 201 performs resolution conversion on the input image signal and key signal, and supplies the resultant image signal and key signal to the base layer and the first enhancement layer. The resolution conversion is performed by means of reduction filtering process using for example a reduction filter. Alternatively, after the layered image signal generator 201 performs resolution conversion on the input image signal and key signal, the resultant image signal and key signal may be supplied to the first and second enhancement layers. In this case, the resolution conversion is performed by means of expansion filtering process. Still alternatively, three separately generated image signals and associated key signals (which may or may not be equal in resolution) may be output from the layered image signal generator 201 to the first and second enhancement layers and the base layer, respectively. In this case, which images are output to which layers is determined in advance.

The layered image signal generator 201 also outputs flags indicating the sizes and absolute coordinate positions of VOPs in the respective layers. For example, in the case of the VOP encoder shown in FIG. 34, a flag FSZ_B indicating the size of the base layer VOP and a flag FPOS_B indicating the absolute coordinate position of the base layer VOP are output to the base layer encoder 204. On the other hand, a flag FSZ_E1 indicating the size of the first enhancement layer VOP and a flag FPOS_E1 indicating the absolute coordinate position of the first enhancement layer VOP are output to the first enhancement layer encoder 203 via the delay circuit 202. Furthermore, a flag FSZ_E2 indicating the size of the second enhancement layer VOP and a flag FPOS_E2 indicating the absolute coordinate position of the second enhancement layer VOP are output to the second enhancement layer encoder 208 via the delay circuit 207.

Furthermore, the layered image signal generator 201 outputs a flag FR1 indicating the ratio of the size of the first enhancement layer VOP relative to the size of the base layer VOP to the resolution converter 205 and the first enhancement layer encoder 203 via the delay circuit 202.

Similarly, the layered image signal generator 201 outputs a flag FR2 indicating the ratio of the size of the second enhancement layer VOP relative to the size of the first enhancement layer VOP to the resolution converter 209 and the second enhancement layer encoder 208 via the delay circuit 207.

In this second embodiment, an one-bit flag enhancement_type is set to indicate whether an image signal in the enhancement layer corresponds to either the entire area or a partial area of an image signal in a reference layer image, and the flag enhancement_type is encoded and transmitted. When the flag enhancemnt_type is equal to "0", the image signal in that layer corresponds to the entire area of the prediction reference layer image signal or corresponds to a wider area. When the flag enhancemnt_type is equal to "1", the image signal in that layer corresponds to a partial area of the prediction reference layer image signal. Whether the layers used by the respective layers in prediction and the image signals in the respective layers correspond to the entire area or a partial area of the reference layer images is determined in advance.

The layered image signal generator 201 generates image signals including particular areas with particular resolutions in the respective layers, and supplies the resultant image signals to enhancement layer encoders 203 and 208, respectively, via the delay circuits 202 and 207. Furthermore, flags ref_layer_id indicating the layers referred to by the respective layers and flags enhancement_type indicating whether the respective layer correspond to the entire area or a partial area of the reference images are supplied from the layered image signal generator 201 to the enhancement encoders 203 and 209.

In FIG. 34, the delay circuit 202 and the resolution converter 205 operate in the same manner as in the first embodiment.

Figure 35:
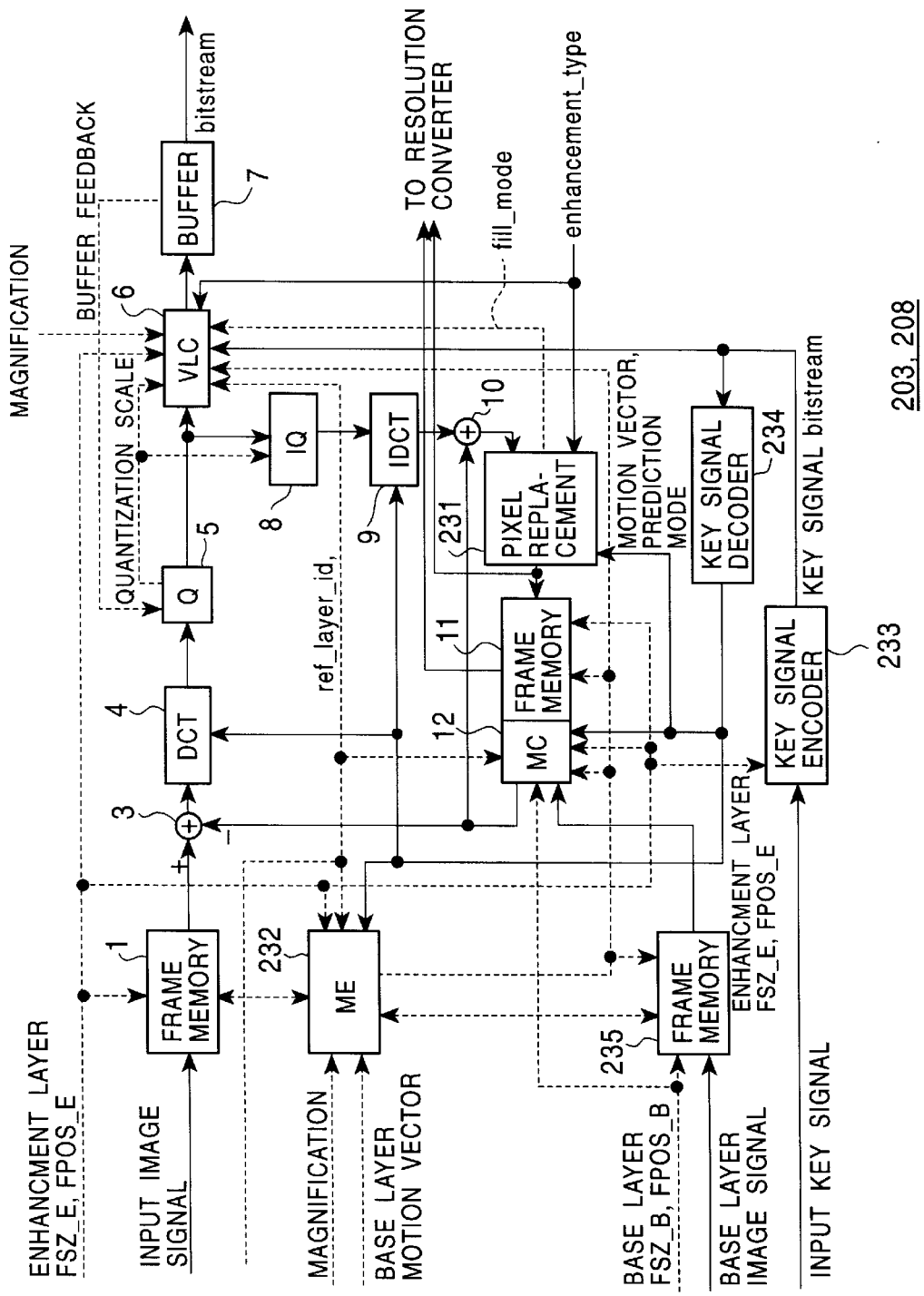
FIG. 35 is a block diagram illustrating an example of the construction of the first enhancement layer encoder 203 shown in FIG. 34.

Referring to FIG. 35, the first enhancement layer encoder 203 is described below. The second enhancement layer encoder 208 has a similar circuit construction to that of the first enhancement layer encoder 203, and thus the description about the first enhancement layer encoder 203 given herein below is also true for the second enhancement layer encoder 208.

The first enhancement layer encoder 203 according to the second embodiment is similar to the enhancement layer encoder 203 (FIG. 11) according to the first embodiment except for the pixel replacement circuit 231 shown in FIG. 35.

Figure 36:
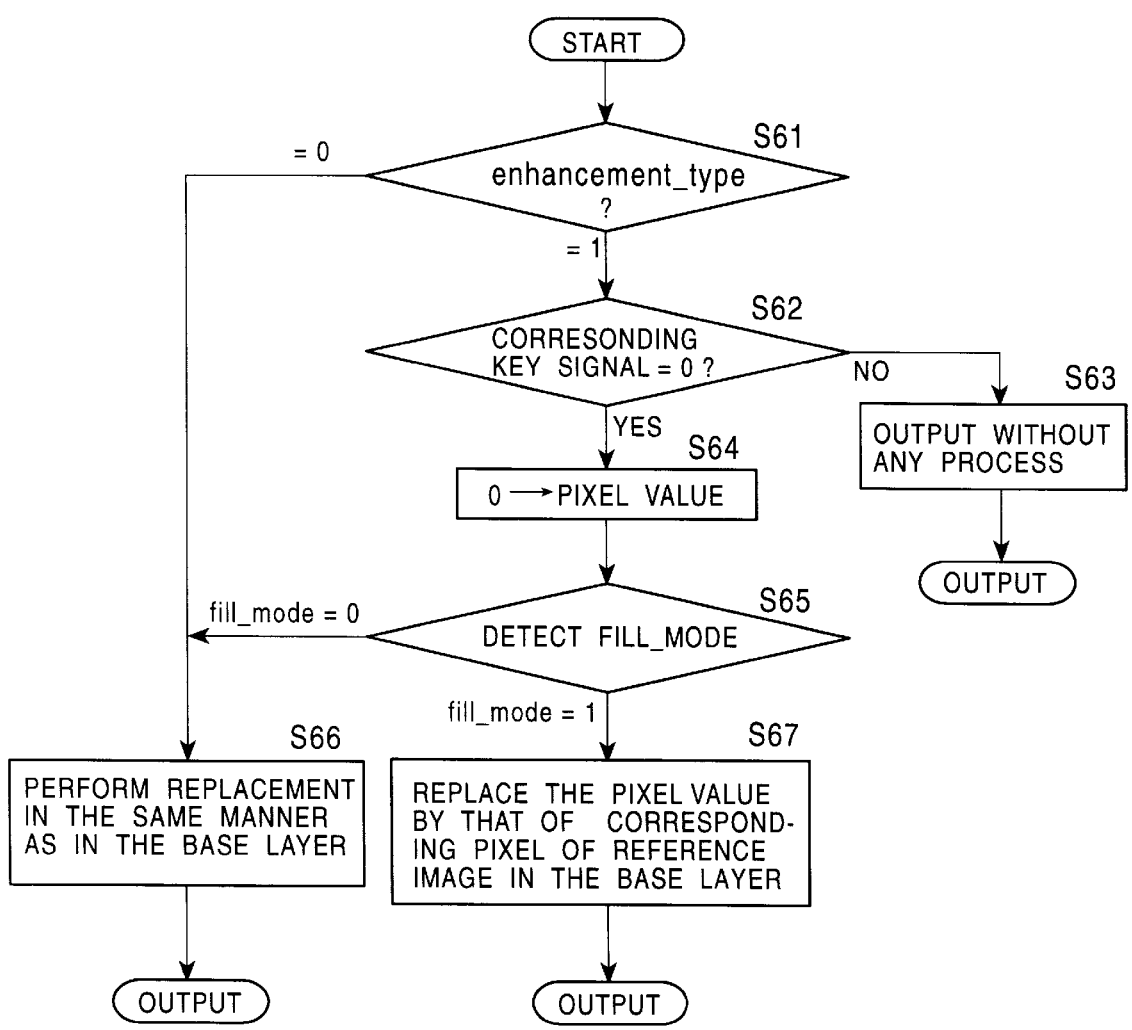
FIG. 36 is a flow chart illustrating the process performed by the pixel replacement circuit 231 shown in FIG. 35.

Referring to FIG. 36, the operation of the pixel replacement circuit 231 shown in FIG. 35 will be described below. First, in step S61, the flag enhancement_type is checked so as to determine whether each layer is a part of a reference layer. If enhancement type="0", then the process goes to step S66, and replacement is performed by meas of intraframe extrapolation in a manner similar to that for the base layer as shown in the flow chart of FIG. 9.

If enhancement_type="1", then the process goes to step S62, and it is judged whether the corresponding key signal is equal to 0. When the pixel under judgement is within an image object, it is determined in step S62 that the key signal at a corresponding position has a value not equal to 0. In this case, the process goes to step S63, and the pixel replacement circuit 231 simply outputs the received pixel value without performing any replacement on it. On the other hand, if the corresponding key signal is equal to 0, the process goes to step S64 and the pixel value is replaced with 0. When the VOP has a rectangular shape, the key signal always has a value not equal to 0 (1 in the case of a binary key, 255 in the case of a gray scale key), and thus, in this case, all pixels of the VOP are simply output without being subjected to any process. In an area in which there is no image, key signals in that area have a value equal to 0, and thus the pixel values are replaced with 0.

Then in step S65, the flag fill_mode indicating the replacement mode is checked, and replacement is performed in accordance with the replacement mode indicated by the flag. The replacement in the enhancement layer is performed in either of the following two modes. In a first mode, the replacement is performed in the same manner as in the replacement performed in the base layer. In the other mode, pixel values in the enhancement layer are replaced with values of pixels of a reference image in the base layer at corresponding locations. The latter mode is employed when the enhancement layer corresponds to a partial area of the base layer, and the encoding is performed in a spatially scalable manner. The scalability mode and the replacement mode are both determined in advance. fill_mode is an one-bit flag indicating the replacement mode and is supplied from the pixel replacement circuit 231 to the variable-length encoder 6. The flag fill_mode is encoded by the variable-length encoder 6 and transmitted.

If it is concluded that the flag fill_mode indicating the replacement mode has a value equal to 0, then the process goes to step S66 in which the pixel replacement circuit 231 performs replacement in the same manner as that (FIG. 9) performed by the pixel replacement circuit 221 (FIG. 8) in the base layer. The resultant image signal is output to the set of frame memories 11.

In the case where the flag fill_mode indicating the replacement mode has a value equal to 1, the process goes to step S67 in which the pixel replacement circuit 231 replaces the pixel values in the enhancement layer with the pixel value of the base layer reference image signal at corresponding locations. This replacement method is described in further detail below with reference to FIG. 13.

In an area containing an image in which corresponding key signals have a value not equal to 0 (for example the image object area in FIG. 13), the image in the enhancement layer is directly employed. In the other area (the area in which horizontal lines are drawn in FIG. 13), the reference image is obtained by replacing pixel values in the enhancement layer with pixel values of the base layer image which has been converted in resolution (subjected to an up-sampling process) at locations corresponding to the locations of the reference image (UVOP0 in FIG. 13).

Figure 37:
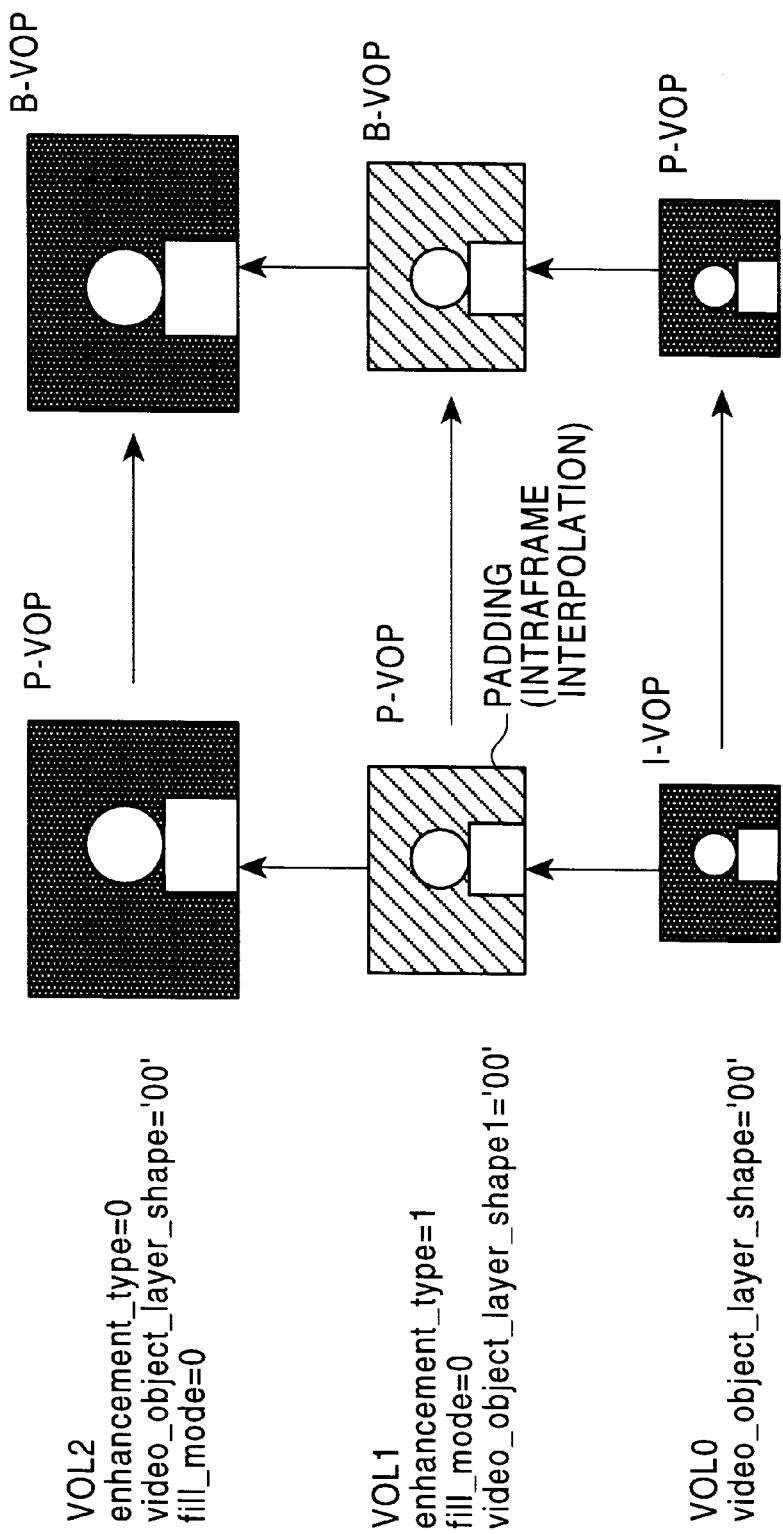
FIG. 37 is a schematic representation of the relationship among images in the base layer, the first enhancement layer, and the second enhancement layer.
Figure 38:
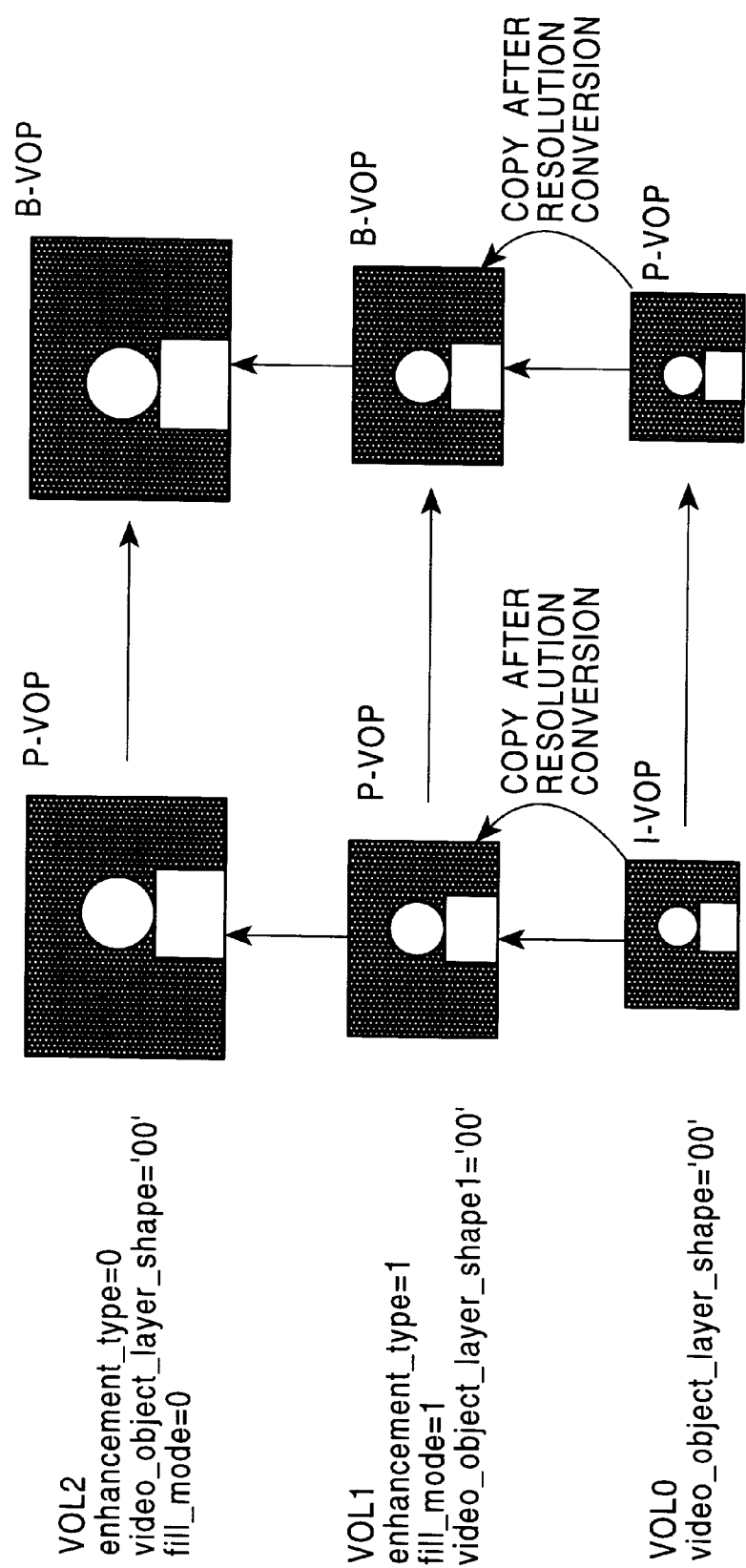
FIG. 38 is a schematic representation of the relationship among images in the base layer, the first enhancement layer, and the second enhancement layer.

Examples of pixel replacement for three layers are shown in FIGS. 37 and 38. In the example shown in FIG. 37, the VOP in the base layer (VOL0) is an image having a rectangular shape (video_object_layer_shape !=00), and the enhancement layer (VOL1) is a part of the base layer (VOL0) and furthermore the VOP in the enhancement layer has an arbitrary shape (video_object_layer_shape=00). The second enhancement layer (VOL2) has an image corresponding to the same area as the VOL0 and corresponding to an area wider than the prediction reference layer (VOL1) wherein the image of the second enhancement layer has a rectangular shape). In VOL1, the flag fill_mode indicating the pixel replacement is set to "0", and thus pixel replacement is performed in the manner (intraframe interpolation) shown in the flow chart of FIG. 9.

In the example shown in FIG. 38, the VOP in the base layer (VOL0) is an image having a rectangular shape, and the enhancement layer (VOL1) is a part of the base layer (VOL0) and furthermore the VOP in the enhancement layer has an arbitrary shape. The second enhancement layer (VOL2) has an image corresponding to the same area as the VOLO and corresponding to an area wider than the prediction reference layer (VOL) wherein the image of the second enhancement layer has a rectangular shape). In VOL2, the flag fill_mode indicating the pixel replacement is set to "0", while the flag fill_mode is set to "1" in VOL1. In this case, the pixel values in VOL1 are replaced by the corresponding pixel values in VOL0.

The difference between the examples shown in FIGS. 37 and 38 is described below. In both examples shown in FIGS. 37 and 38, the layer VOL2 is encoded with reference to the layer VOLL. However, VOL1 corresponds to a part of VOL2. In the case of the example shown in FIG. 37, the pixel replacement in the area in which there is no image and thus corresponding key signals are equal to 0 is performed by means of intraframe extrapolation as shown in FIG. 9. As a result, in the area of VOL1 in which the key signals are equal to 0, signals which have no relation with the corresponding area of VOL2 are employed as prediction reference signals.

On the other hand, in the case of the example shown in FIG. 38, the pixel values in such the area of VOL1 in which there is no image and thus corresponding key signals are equal to 0 are replaced with the pixel values in the base layer VOL0 at corresponding locations. Thus, in the area of VOL1 in which key signals are equal to 0, low-resolution image signals of VOL2 at corresponding locations are employed as prediction reference signals.

Thus, when the encoding coefficient is important in the encoding process, the flag fill_mode is set to "1".

Referring again to FIG. 35, the first enhancement layer encode 203 is further described. Flags ref_layer_id and enhancement_type are supplied from the layered image signal generator 201 (FIG. 34) to the variable-length encoder 6 and are inserted at predetermined locations in the bit stream. The bit stream is then output via the transmission buffer 7.

The flag_enhancement_type is supplied to the pixel replacement circuit 231. In accordance with the flag, the pixel replacement performs pixel replacement as described above.

The flag ref_layer_id is supplied to the motion vector extraction circuit 232 and the motion compensation circuit 12. The motion vector extraction circuit 232 sets the ref_select_code to a value depending on the predetermined picture type and supplies it to the motion compensation circuit 12 and the variable-length encoder 6.

If the layer under consideration is a layer other than the highest layer, for example the first enhancement layer of the three layers, then the image signal output from the pixel replacement circuit 231 and also the image signal output from the set of frame memories 11 are supplied to the second enhancement layer encoder 208 via the resolution converter 209 shown in FIG. 34.

When the layer under consideration is the second enhancement layer which is the highest layer of the three layers, this layer is not referred to by any other layers. Therefore, in this case, no output signal is supplied to encoders in any other layers from the set of frame memories 11 and the pixel replacement circuit 231.

Except for the point described above, the first enhancement layer encoder 203 of the second embodiment operates in a manner similar to the enhancement layer encoder 203 of the first embodiment.

Figure 39:
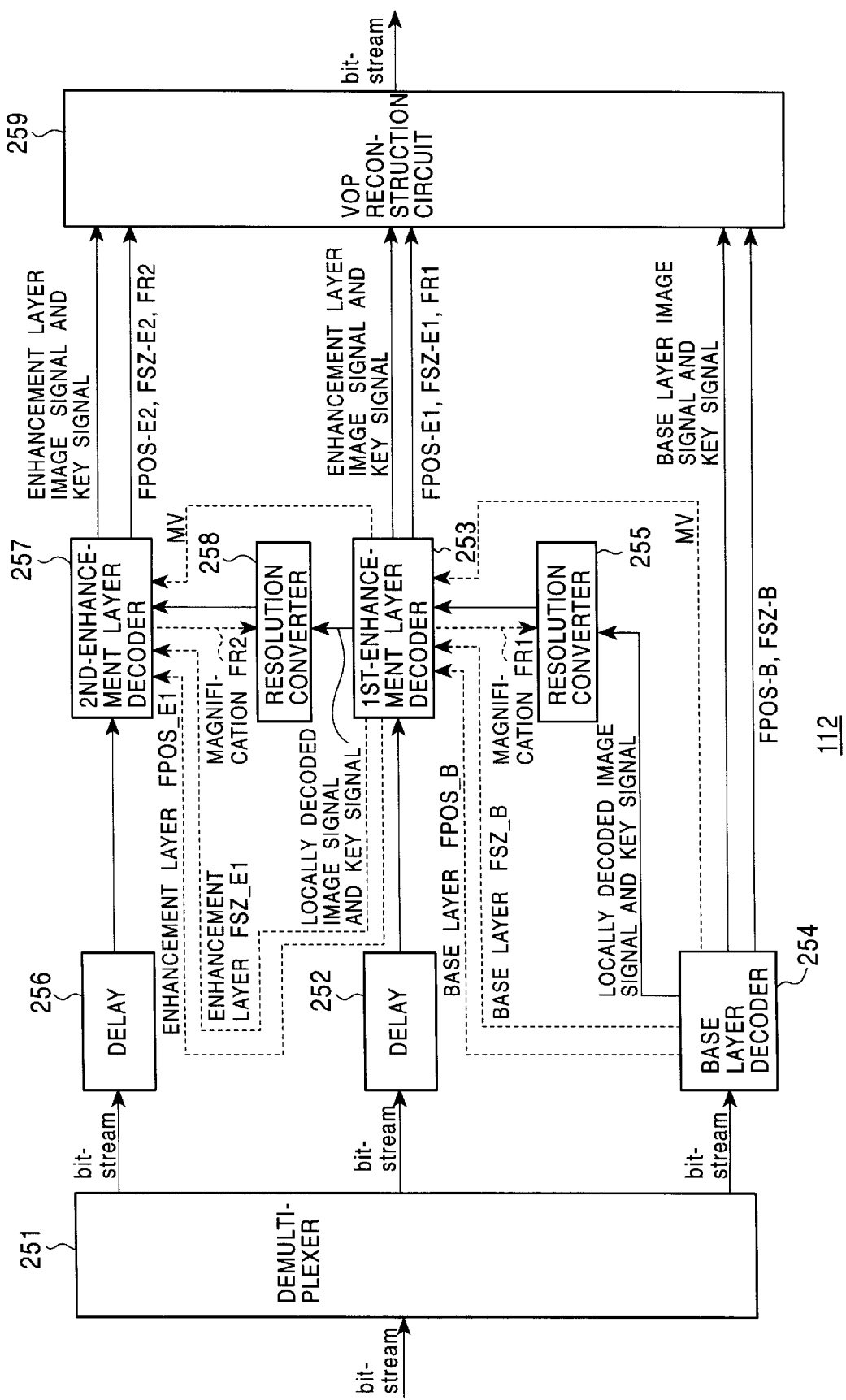
FIG. 39 is a block diagram illustrating another example of the construction of a VOP decoder used in the image signal decoding apparatus according to the present invention.

FIG. 39 illustrates an example of the circuit configuration of the VOP decoder 112 corresponding to the VOP encoder 103 shown in FIG. 34. Herein, the part used to decode the base layer and the first enhancement layer is constructed in the same manner as the first embodiment (FIG. 18). The VOP decoder 112 of this second embodiment includes an additional part which is not included in the decoder shown in FIG. 18 and which is used to decode the second enhancement layer. The additional part includes a delay circuit 256, a second enhancement layer decoder 257, and a resolution converter 258. The first enhancement layer decoder 253 and the second enhancement layer decoder 257 are substantially equal in construction to each other.

A bit stream is first input to a demultiplexer 251. The demultiplexer 251 demultiplexes the received bit stream into separate bit streams in the respective layers, and outputs the resultant bit streams. In the specific example shown in FIG. 39, the decoder is adapted to perform scalable decoding on three layers, and thus the input bit stream is separated into a second enhancement layer bit stream, an enhancement layer bit stream, and a base layer bit stream.

The base layer bit stream is directly supplied to the base layer decoder 254. On the other hand, the first enhancement layer bit stream is supplied to the first enhancement layer decoder 253 via the delay circuit 252. The second enhancement layer bit stream is supplied to the second enhancement layer decoder 257 via the delay circuit 256.

The delay circuits 252 and 256 make the first and second enhancement layer bit streams delayed by a time required for the base layer decoder 254 to decode one VOP, and then output the delayed bit streams to the first and enhancement layer decoders 253 and 257, respectively.

The base layer decoder 254 is constructed in the same manner as the base layer decoder of the first embodiment (FIG. 19). The decoded image signal and key signal output from the base layer decoder 254 are supplied to the VOP reconstruction circuit 259. On the other hand, The flags FPOS_B and FSZ_B indicating the position and the size of the VOP decoded by the base layer decoder 254 are also supplied to the VOP reconstruction circuit 259.

The decoded base layer image signal and key signal are also supplied to the resolution converter 255 and are converted in resolution. The resultant signals are supplied to the first enhancement layer decoder 253.

The flags FSZ_B and FSZ_B indicating the absolute coordinate position and the size of the decoded base layer VOP are also supplied to the first enhancement layer decoder 253.

The first enhancement layer bit stream generated by the demultiplexer 251 is supplied to the enhancement layer decoder 253 via the delay circuit 252.

On the other hand, the second enhancement layer bit stream generated by the demultiplexer 251 is supplied to the second enhancement layer decoder 257 via the delay circuit 256.

The delay circuits 252 and 256 are constructed in the same manner. Furthermore, the first enhancement layer decoder 253 and the second enhancement layer decoder 257 are constructed in the same manner.

The decoded image signal and key signal output from the first enhancement layer decoder 253 are supplied to the VOP reconstruction circuit 259 and the resolution converter 258. The flags FPOS_E1 and FSZ_E1 indicating the position and the size of the VOP decoded by the first enhancement layer decoder 253 are also supplied to the VOP reconstruction circuit 259.

The decoded first enhancement layer image signal and key signal are also supplied to the resolution converter 258 and are converted in resolution. The resultant signals are supplied to the second enhancement layer decoder 257.

The flags FSZ_E1 and FSZ_E1 indicating the absolute coordinate position and the size of the decoded first enhancement layer VOP are also supplied to the second enhancement layer decoder 257.

The flag FR1 indicating the resolution conversion ratio decoded by the first enhancement layer decoder 253 is supplied to the resolution converter 255. In accordance with the decoded flag FR1 indicating the resolution conversion ratio, resolution conversion is performed by the resolution converter 255.

The decoded image signal and key signal output from the second enhancement decoder 257 are supplied to the VOP reconstruction circuit 259. The flags FPOS_E2 and FSZ_E2 indicating the position and the size of the VOP decoded by the second enhancement layer decoder 257 are also supplied to the VOP reconstruction circuit 259.

The flag FR2 indicating the resolution conversion ratio decoded by the second enhancement layer decoder 257 is supplied to the resolution converter 258. In accordance with the decoded flag FR2 indicating the resolution conversion ratio, the resolution converter 258 performs resolution conversion.

The details of the VOP reconstruction circuit 259 will be described later.

Figure 40:
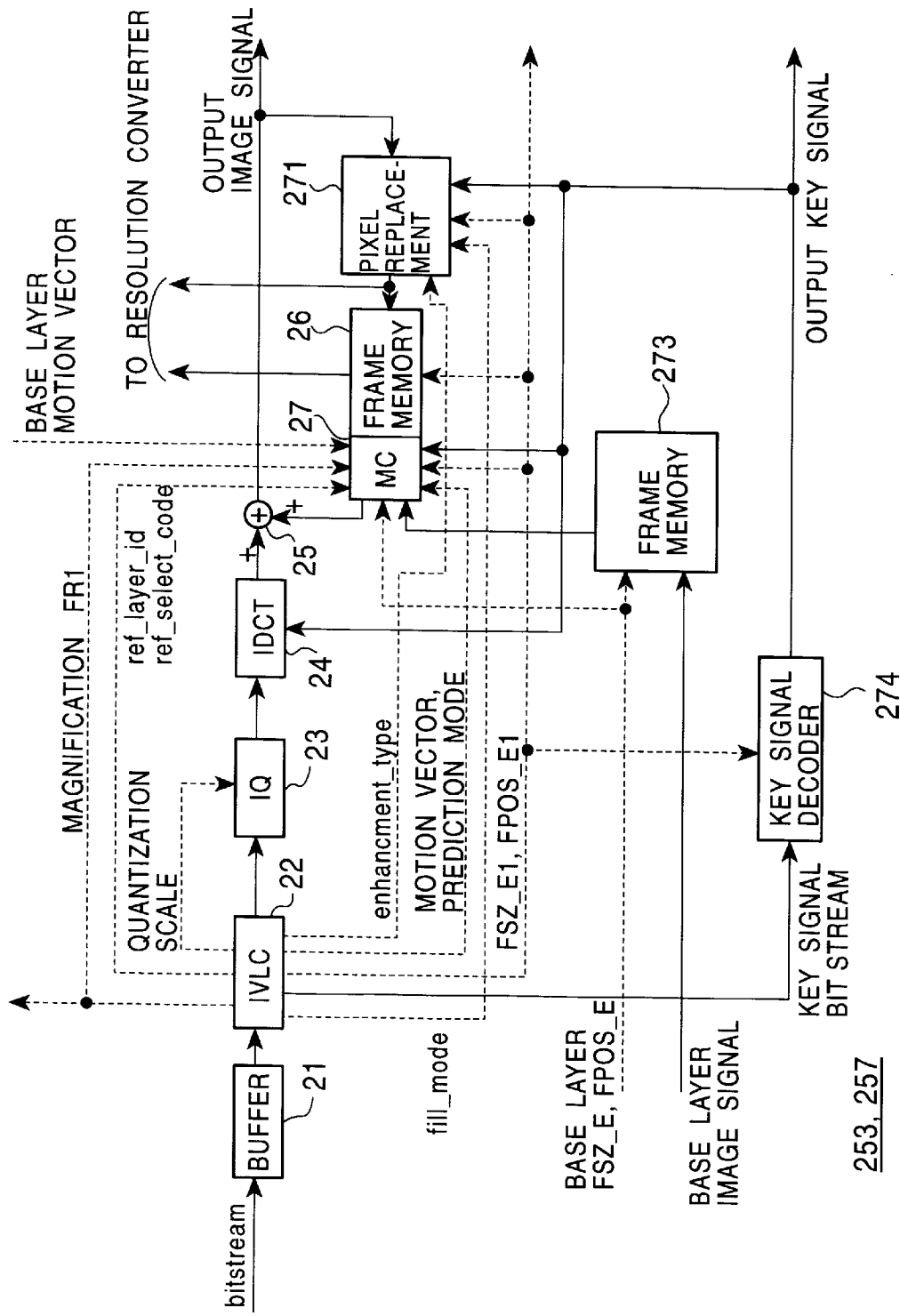
FIG. 40 is a block diagram illustrating an example of the construction of the first enhancement layer decoder 253 shown in FIG. 39.

Referring now to FIG. 40, the first enhancement layer decoder 253 is described. In FIG. 40, similar elements to those in FIG. 45 or 20 are denoted by similar reference numerals. The second enhancement layer decoder 257 has a similar circuit construction to that of the first enhancement layer decoder 253, and thus the description about the first enhancement layer decoder 257 given herein below is also true for the second enhancement layer decoder 253.

The first enhancement layer decoder 253 according to the second embodiment is similar to the enhancement layer decoder 253 (FIG. 20) according to the first embodiment except for the pixel replacement circuit 271.

After the enhancement layer bit stream is stored temporarily in a reception buffer 21, the enhancement layer bit stream is supplied to a variable-length decoder 22. The variable-length decode 22 performs variable-length decoding on the enhancement layer bit stream supplied from the reception buffer 21 thereby supplying a motion vector and information representing the prediction mode to a motion compensation circuit 27, information representing the quantized step to an inverse quantization circuit 23, and the variable-length decoded data to the inverse quantization circuit 23.

The variable-length decoder 22 also decodes the flag FSZ_E1 indicating the size of the VOP and the flag FPOS_E1 indicating the absolute coordinate position thereof, and supplies the decoded flags to the motion compensation circuit 27, a set of frame memories 26, a key signal decoder 274, and the VOP reconstruction circuit 259 shown in FIG. 39.

Furthermore, the variable-length decoder 22 also decodes the flag FR1 indicating the ratio of the size (resolution) of the enhancement layer image VOP to the size (resolution) of the base layer image VOP, and supplies the result to the motion compensation circuit 27 and the resolution converter 255 shown in FIG. 39.

According to the flag FR1 indicating the size ratio (magnification), the resolution converter 255 performs resolution conversion on the decoded base layer image signal and its associated key signal using a filter. The resultant signals are supplied to a set of frame memories 273 in the enhancement layer decoder 253.

The variable-length decoder 22 also decodes the flag ref_layer_id indicating the reference layer used in prediction, and the flag ref_select_code, and supplies the result to the motion compensation circuit 27. Still furthermore, the variable-length decoder 22 also decodes the flag fill_mode indicating the replacement mode and supplies the result to a pixel replacement circuit 271. The variable-length decoder 22 also extracts the key signal bit stream and supplies the extracted key signal bit stream to the key signal decoder 274.

The variable-length decoder 22 also decodes the flag enhancement_type indicating whether the layer under consideration corresponds to either the entire area or a partial area of the reference layer, and supplies it to the pixel replacement circuit 271 and the VOP reconstruction circuit 259 shown in FIG. 39.

The key signal decoder 274 decodes the key signal bit stream supplied from the variable-length decoder 22 in accordance with a decoding method corresponding to the encoding method employed. The decoded key signal is supplied to an IDCT circuit 24, the motion compensation circuit 27, and the pixel replacement circuit 271.

The inverse quantization circuit 23 performs inverse quantization on the data (quantized DCT coefficients) supplied from the variable-length decoder 22 bock by block in accordance with the quantization step supplied from also the variable-length decoder 22. The resultant signal is supplied to the IDCT circuit 24. The IDCT circuit 24 performs an inverse DCT process on the data (DCT coefficients) output by the inverse quantization circuit 23, and supplies the resultant data to an arithmetic operation circuit 25.

In the case where the image signal supplied from the IDCT circuit 24 is I-picture data, the image signal is directly output via the arithmetic operation circuit 25 without being subjected to any process, and is stored in the set of frame memories 26 via the pixel replacement circuit 261 for use in generating a predicted image signal of an image signal which will be input later to the arithmetic operation circuit 25. The image signal output from the arithmetic operation circuit 25 is directly output to the image reconstruction circuit 259 shown in FIG. 39.

When the image signal supplied from the IDCT circuit 24 is a P-picture or a B-picture, the motion compensation circuit 27 generates a predicted image signal from the image signal stored in the set of frame memories 26 or 273 in accordance with the motion vector, the prediction mode, the flags ref_layer_id and ref_select_code supplied from the variable-length decoder 22, and outputs the resultant signal to the arithmetic operation circuit 25. The arithmetic operation circuit 25 adds the predicted image signal supplied from the motion compensation circuit 27 to the image signal supplied from the IDCT circuit 24 thereby creating a reproduced image signal. When the image signal supplied from the IDCT circuit 24 is a P-picture, the image signal output from the arithmetic operation circuit 25 is also stored in the set of frame memories 26 via the pixel replacement circuit 271 so that it can be used as a reference image in the process of decoding a subsequent image signal. However, in the case of an intramacroblock, the arithmetic operation circuit 25 simply transfers the image signal supplied from the IDCT circuit 24 to its output without performing any process on it.

In accordance with the decoded flag flag_mode indicating the replacement mode, the pixel replacement circuit 271 performs pixel repayment in a similar manner to the pixel replacement circuit 231 (FIG. 35) in the encoder (as shown in the flow chart of FIG. 36).

If the flag FR indicating the size ratio is equal to 1 and if ref_select_code='00', then the motion compensation circuit 27 generates a predicted image signal in accordance with the motion vector and information representing the prediction mode supplied from the base layer VOP equal in time, and supplies the resultant signal to the arithmetic operation circuit 25.

In FIG. 39, the decoded enhancement layer image signal, key signal, flag FSZ_E1 indicating the size of the enhancement layer VOP, and the flag FPOS_E1 indicating the absolute coordinate position of the enhancement layer VOP are supplied to the image reconstruction circuit 259.

Figure 41:
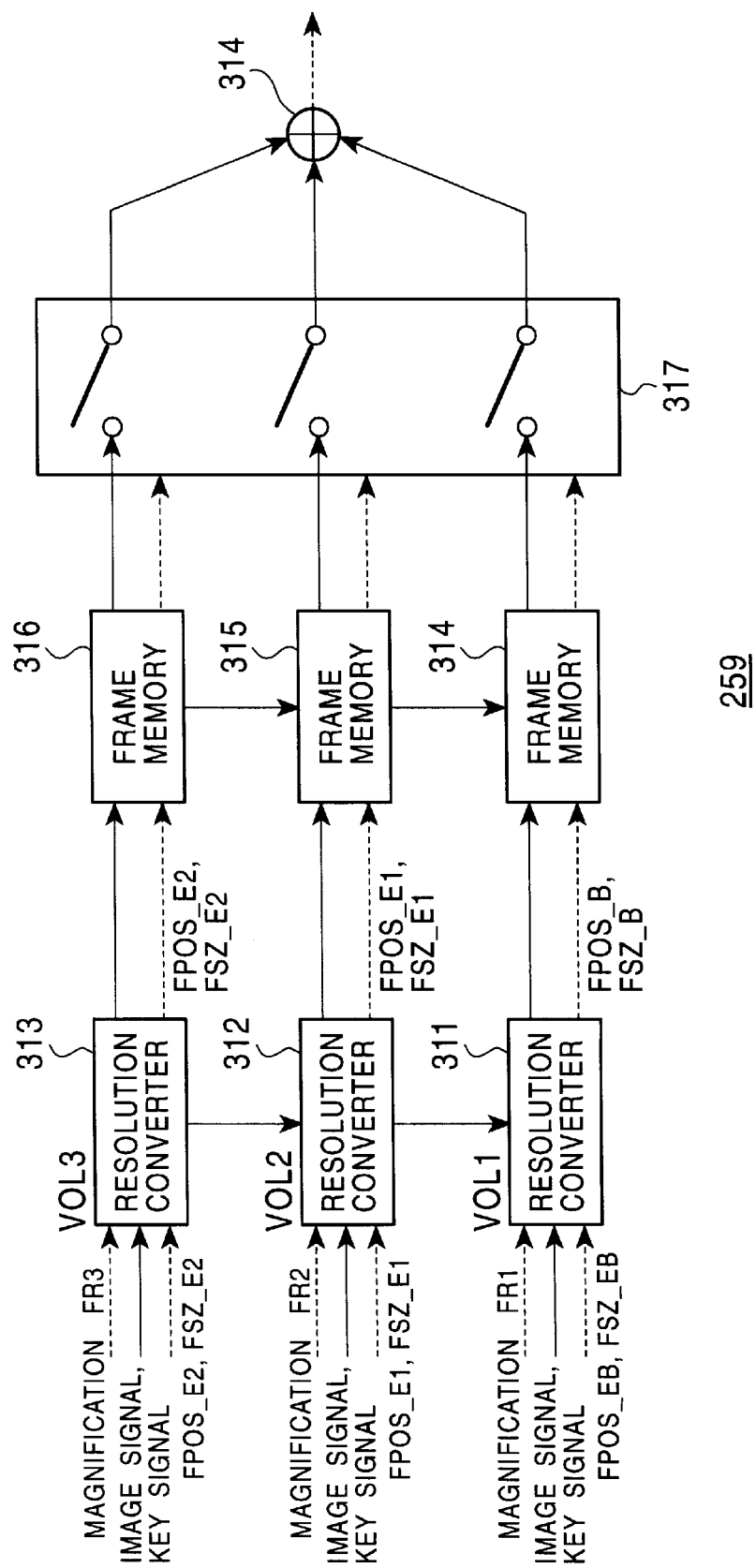
FIG. 41 is a block diagram illustrating an example of the construction of the VOP reconstruction circuit 259 shown in FIG. 39.

The VOP reconstruction circuit shown in FIG. 39 is described in further detail below. FIG. 41 illustrates an example of the circuit configuration of the VOP reconstruction circuit 259. Although in this specific example the VOP reconstruction circuit 259 is a part of the VOP decoder 112 shown in FIG. 39, the VOP reconstruction circuit 259 is also a part of the image reconstruction circuit 113 in the image signal decoder shown in FIG. 52. Image signals, key signals, flags FR indicating the size ratio relative to the prediction reference layer, flags FSZ and FPOS indicating the size and position of VOPs, which are output from the decoders in the respective layers, are first input to resolution converters 311 to 313, and converted in resolution at the specified ratio.

Which layer is employed as a final decoded output signal is specified by a flag D_M which is set in accordance with an instruction externally given by a user. The flag D_M is supplied to a layer selection circuit 317.

The resolution converters 311 to 313 determine conversion ratios in accordance with the layer to be displayed and the flag FR indicating the size ratio relative to the prediction reference layer. The conversion ratios are determined starting with the highest layer. That is, in accordance with the flag which is given by a user from the outside to indicate the layer to be displayed, the resolution conversion ratio for the highest layer to be displayed is set to 1. The conversion ratio for a layer used as a prediction reference layer by the highest layer to be displayed is then determined in accordance with the flag FR indicating the ratio relative to the prediction reference layer transmitted in the highest layer. That is, the conversion ratio is set to be equal to FR. The conversion ratio for a layer which is further referred to by the above prediction reference layer is set to the conversion ratio of this layer times FR of this layer. The conversion ratios are determined for other layers in a similar manner.

After being converted in resolution, the image signals, key signals, and signals FSZ and FPOS indicating the size and the position of VOPs are supplied to the sets of frame memories 314 to 316 and stored therein. These signals are then read out from the sets of frame memories in the predetermined order.

The flag D_M indicating which layer is to be displayed is input to the layer selection circuit 317. In accordance with the flag D_M, the layer selection circuit 317 turns on a switch corresponding to the layer to be displayed so that the signals associated with that layer are supplied to an arithmetic operation circuit 314. The switches associated with the other layers are turned off so that decoded images in those layers are not read out from the memories.

The image signals supplied via the layer selection circuit 317 are added together by the arithmetic operation circuit 314 in accordance with the respective key signals. Furthermore, in the image reconstruction circuit 113 shown in FIG. 52, an image signal is reconstructed from the image signals and key signals supplied from the respective VOP reconstruction circuits, and the resultant reconstructed image signal is output to the outside.

Figure 42:
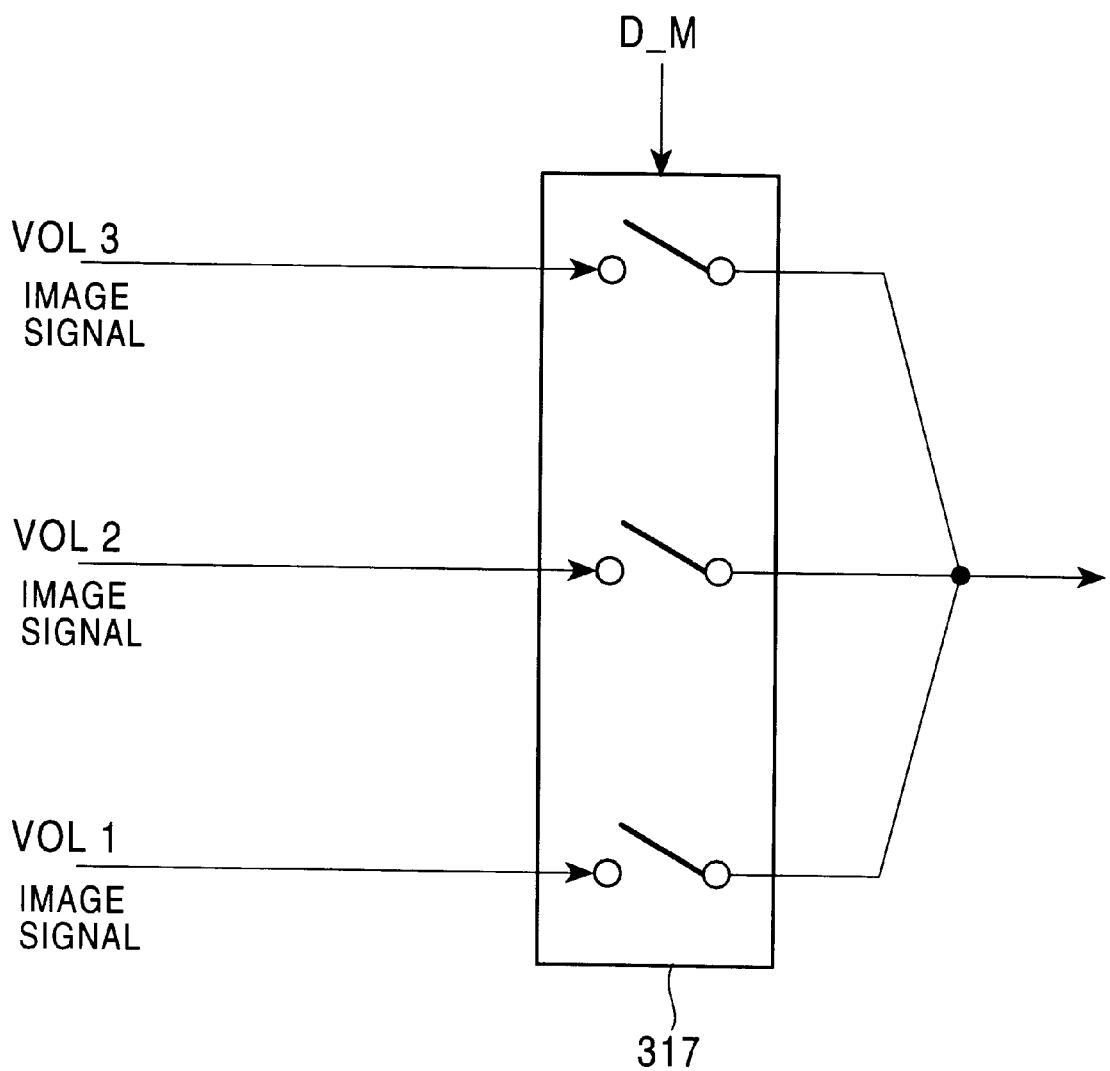
FIG. 42 is a block diagram illustrating another example of the construction of the VOP reconstruction circuit 259 shown in FIG. 39.

FIG. 42 illustrates a modification of the VOP reconstruction circuit 259. In this VOP reconstruction circuit shown in FIG. 42, it is assumed that the pixel replacement circuits 231 in the respective layers perform pixel replacement with fill_mode="0" in the encoding process. In this case, the decoders in the layers in which the flag fill_mode is set to "0" supply only image signals to the VOP reconstruction circuit 259.

The image signals input to the VOP reconstruction circuit 259 are applied to the layer selection circuit 317.

Also in this example, which layer is finally decoded and displayed is specified by the flag D_M which is set in accordance with an instruction externally given by a user. The flag D_M is supplied to the layer selection circuit 317.

In accordance with the flag D_M, the layer selection circuit 317 turns on a switch corresponding to the layer to be displayed and turns off the other switches corresponding to the layers which are not displayed so that no decoded image signals in those layers are read out. In the example shown in FIG. 42, only one switch is turned on and the other switches are turned off, in any situation.

As described above, when encoding is performed with fill_mode="0", it is possible to employ a simple VOP reconstruction circuit such as that shown in FIG. 42. This makes it possible to remove the sets of frame memories 314 to 316 shown in FIG. 41, and thus a reduction in cost can be achieved.

FIG. 38 illustrates an example in which fill_mode="0". In this case, the sets of frame memories 26 of the decoders of both enhancement layers (VOL1, VOL2) store the image signals in the same area, and pixel replacement process is performed using low-resolution image signals at the same locations. Therefore, pixel replacement can be performed by reading image signals in either one layer from the set of frame memories 26. This means that the set of frame memories 26 of the decoder (FIG. 40) and the sets of frame memories 314 to 316 of the VOP reconstruction circuit 259 (FIG. 41) may be realized by a single set of frame memories used for these purposes.

In contrast, when fill_mode="1" as is the case in the example shown in FIG. 37, the areas of the respective layers do not necessarily correspond to one another. Besides, pixel replacement is performed by means of intraframe extrapolation. For the above reasons, the set of frame memories 25 used for prediction in the decoder can not be shared by the sets of frame memories 314 to 316 of the VOP reconstruction circuit 259, and thus the construction shown in FIG. 41 is necessary.

However, when fill_mode="0", if the same memory is employed for use as a prediction memory and also as a reconstruction memory, this construction is unsuitable for use in edition of image objects. For example, to replace only the background image with another bit stream, it is more desirable to form the VOP reconstruction circuit 259 as shown in FIG. 41.

Therefore, when it is desired to achieve a high encoding efficiency or a small-scaled circuit, pixel replacement is performed with fill_mode=0, and encoding/decoding is performed in a corresponding fashion. On the other hand, when it is desired to re-edit images, encoding is performed with fill_mode="1".

The syntax of the scalable encoding according to the second embodiment is described below for the case of MPEG4VM (verification model). In the second embodiment, the syntax is similar to that of the first embodiment except for that associated with VOL.

FIG. 43 illustrates the syntax of VOL. As in the first embodiment, fill_mode is an one-bit flag used to indicate the replacement mode. When the flag fill_mode is equal to 1, pixel replacement is performed using a base layer image which has been converted in conversion. This flag is transmitted only in the enhancement layer. enhancement_type is an one-bit flag used to indicate whether the corresponding layer is a part of a prediction reference layer. When enhancement_type="1", the corresponding layer is a part of the prediction reference layer. In the other cases, enhancement_type is set to "0".

A program used to execute the above-described processes may be transmitted to a user via a transmission medium. Transmission media available for this purpose include a recoding medium such as a magnetic disk, a CD-ROM, and a solid state memory, and a communication medium such as a network and a satellite communication system.

As described above, in the image signal encoding method and the image signal encoding apparatus, an image signal decoding method and an image signal decoding apparatus, and the image signal transmission method, according to the present invention, a reference image is generated by replacing the pixels outside an image object in the enhancement layer with proper pixels in the base layer so that a motion vector is detected in a highly efficient fashion and so that encoding efficiency is improved. This technique also allows a reduction in calculation cost.

Although the present invention has been described above with reference to specific embodiments, the invention is not limited to these embodiments. Various modifications and applications are possible without departing from the sprit and scope of the invention.

What is claimed is:

1. An image signal encoding apparatus for encoding a plurality of image signals, at least one of said plurality of image signals being an image signal representing a moving image object, said at least one of the plurality of image signals including a signal used to combine it with at least one other image signal of said plurality of image signals, said apparatus comprising:

an image supplier for supplying a base layer image signal and an enhancement layer image signal scalably representing said image signal representing a moving image object;

an enhancement layer encoder for encoding said enhancement layer image signal thereby generating an encoded enhancement layer signal; and a base layer encoder for encoding said base layer image signal thereby generating an encoded base layer signal;

wherein said enhancement layer encoder comprises:

a generator for generating a reference image signal used to calculate a motion vector of the enhancement layer image signal to be encoded, said reference image signal being generated by replacing the values of pixels outside said image object of the enhancement layer image signal with the values of predetermined pixels at corresponding locations of the base layer image signal;

a detector for detecting the motion vector of said enhancement layer image signal to be encoded using said reference image signal; and an encoder for encoding said enhancement layer image signal using a predicted image signal of said enhancement layer image signal, said predicted image signal being generated by performing motion compensation using said detected motion vector.

2. An image signal encoding apparatus according to claim 1, wherein said generator replaces the values of pixels outside said image object of the enhancement layer image signal with the values of pixels at corresponding locations of a base layer image signal which is time coincident with said reference image signal thereby generating said reference image signal used to calculate the motion vector of the enhancement layer image signal to be encoded.

3. An image signal encoding apparatus according to claim 1, wherein said generator replaces the values of pixels outside said image object of the enhancement layer image signal with the values of pixels at corresponding locations of a base layer image signal which is time coincident with said image signal to be encoded thereby generating said reference image signal used to calculate the motion vector of the enhancement layer image signal to be encoded.

4. An image signal encoding apparatus according to claim 1, wherein said enhancement layer encoder generates a flag indicating an image to be replaced.

5. An image signal encoding apparatus according to claim 1, wherein said image supplier includes a layered signal generator for generating said enhancement layer image signal and said base layer image signal represented in a scalable fashion from said image signal representing a moving image object.

6. An image signal encoding apparatus according to claim 1, wherein:

said generator has a first replacement mode and a second replacement mode;

in said first replacement mode, said generator replaces the values of pixels outside said image object of the enhancement layer image signal with the values of predetermined pixels of the base layer image signal thereby generating the reference image signal used to calculate the motion vector of the enhancement layer image signal to be encoded;

in said second replacement mode, said generator replaces the values of pixels outside said image object of the enhancement layer image signal with values obtained by extrapolating pixel values inside said image object thereby generating the reference image signal used to calculate the motion vector of the enhancement layer image signal to be encoded; and said generator generates a flag indicating a replacement mode.

7. An image signal encoding apparatus according to claim 1, wherein said image supplier further supplies a flag indicating the size of said enhancement layer image signal, a flag indicating the position thereof with respect to an absolute position, a flag indicating the size of said base layer image signal, and a flag indicating the position thereof with respect to the absolute position.

8. An image signal encoding apparatus according to claim 7, wherein said image supplier further supplies a flag indicating the ratio of the resolution of said enhancement layer image signal to that of said base layer image signal.

9. An image signal encoding apparatus according to claim 1, wherein: said enhancement layer image signal is a first enhancement layer image signal, said image supplier further supplies a second enhancement layer image signal which is higher in layer than said enhancement layer image signal, said first and second enhancement layer image signals representing differently scaled versions of said image signal representing a moving image object; and said apparatus further comprises a second enhancement layer encoder for encoding said second enhancement layer image signal thereby generating a second encoded enhancement layer signal, said second enhancement layer encoder comprising:

a generator for generating a second reference image signal used to calculate a motion vector of the second enhancement layer image signal to be encoded, said second reference image signal being generated by replacing the values of pixels outside said image object of said second enhancement layer image signal with the values of predetermined pixels of the first enhancement layer image signal;

a detector for detecting the motion vector of said second enhancement layer image signal to be encoded using said second reference image signal; and a second encoder for encoding said second enhancement layer image signal using a second predicted image signal of said second enhancement layer image signal, said second predicted image signal being generated by performing motion compensation using said detected motion vector of the second enhancement layer image signal.

10. An image signal encoding method for encoding a plurality of image signals, at least one of said plurality of image signals being an image signal representing a moving image object, said at least one of the plurality of image signals including a signal used to combine it with at least one other image signal of said plurality of image signals, said method comprising the steps of:

supplying a base layer image signal and an enhancement layer image signal scalably representing said image signal representing a moving image object;

encoding said enhancement layer image signal thereby generating an encoded enhancement layer signal; and encoding said base layer image signal thereby generating an encoded base layer signal;

wherein said step of encoding said enhancement layer image signal comprises the steps of:

generating a reference image signal used to calculate a motion vector of the enhancement layer image signal to be encoded, said reference image signal being generated by replacing the values of pixels outside said image object of the enhancement layer image signal with the values of predetermined pixels at corresponding locations of the base layer image signal;

detecting the motion vector of said enhancement layer image signal to be encoded using said reference image signal; and encoding said enhancement layer image signal using a predicted image signal of said enhancement layer image signal, said predicted image signal being generated by performing motion compensation using said detected motion vector.

11. The image signal encoding method of claim 10, wherein said enhancement layer signal is a first enhancement layer signal, and said method further comprises the steps of:

supplying a second enhancement layer image signal which is higher in layer than said first enhancement layer image signal, said first and second enhancement layer image signals representing differently scaled versions of said image signal representing a moving image object;

encoding said second enhancement layer image signal thereby generating a second encoded enhancement layer signal, by:

generating a second reference image signal used to calculate a motion vector of the second enhancement image signal, said second reference image signal being generated by replacing the values of pixels outside said image object of said second enhancement layer image signal with the values of predetermined pixels of the first enhancement layer image signal;

detecting the motion vector of said second enhancement layer image signal to be encoded using said second reference image signal;

encoding said second enhancement layer image signal using a second predicted image signal of said second enhancement layer image signal, said second predicted image signal being generated by performing motion compensation using said detected motion vector of said second enhancement layer image signal; and transmitting said encoded second layer image signal.

12. An image signal transmission method for encoding a plurality of image signals, at least one of said plurality of image signals being an image signal representing a moving image object, said at least one of the plurality of image signals including a signal used to combine it with at least one other image signal of said plurality of image signals, said method comprising the steps of:

supplying a base layer image signal and an enhancement layer image signal scalably representing said image signal representing a moving image object;

encoding said enhancement layer image signal thereby generating an encoded enhancement layer signal; and encoding said base layer image signal thereby generating an encoded base layer signal;

wherein said step of encoding said enhancement layer image signal comprises the steps of:

generating a reference image signal used to calculate a motion vector of the enhancement layer image signal to be encoded, said reference image signal being generated by replacing the values of pixels outside said image object of the enhancement layer image signal with the values of predetermined pixels at corresponding locations of the base layer image signal;

detecting the motion vector of said enhancement layer image signal to be encoded using said reference image signal;

encoding said enhancement layer image signal using a predicted image signal of said enhancement layer image signal, said predicted image signal being generated by performing motion compensation using said detected motion vector; and generating a flag indicating an image to be replaced;

said method further comprising the step of transmitting said encoded enhancement layer image signal, said encoded base layer image signal, said motion vector, and said flag.

13. The image signal transmission method of claim 12, wherein said enhancement layer signal is a first enhancement layer signal, and said method further comprises the steps of:

supplying a second enhancement layer image signal which is higher in layer than said first enhancement layer image signal, said first and second enhancement layer image signals representing differently scaled versions of said image signal representing a moving image object;

encoding said second enhancement layer image signal thereby generating a second encoded enhancement layer signal, by:

generating a second reference image signal used to calculate a motion vector of the second enhancement image signal, said second reference image signal being generated by replacing the values of pixels outside said image object of said second enhancement layer image signal with the values of predetermined pixels of the first enhancement layer image signal;

detecting the motion vector of said second enhancement layer image signal to be encoded using said second reference image signal; and encoding said second enhancement layer image signal using a second predicted image signal of said second enhancement layer image signal, said second predicted image signal being generated by performing motion compensation using said detected motion vector of said second enhancement layer image signal.

* * * * *